United States Patent
Kopp et al.

(10) Patent No.: US 11,156,781 B2
(45) Date of Patent: Oct. 26, 2021

(54) PASSIVE ALIGNING OPTICAL COUPLER ARRAY

(71) Applicant: Chiral Photonics, Inc., Pine Brook, NJ (US)

(72) Inventors: Victor Il'ich Kopp, Fair Lawn, NJ (US); Daniel Neugroschl, Suffern, NY (US)

(73) Assignee: Chiral Photonics, Inc., Pine Brook, NJ (US)

( * ) Notice: Subject to any disclaimer, the term of this patent is extended or adjusted under 35 U.S.C. 154(b) by 0 days.

(21) Appl. No.: 16/600,219

(22) Filed: Oct. 11, 2019

(65) Prior Publication Data

US 2020/0041724 A1 Feb. 6, 2020

Related U.S. Application Data

(63) Continuation-in-part of application No. 16/159,310, filed on Oct. 12, 2018, now Pat. No. 10,564,348, which is a continuation-in-part of application No. 15/811,462, filed on Nov. 13, 2017, now Pat. No. 10,101,536, which is a continuation-in-part of application No. 15/459,730, filed on Mar. 15, 2017, now Pat. No. 9,817,191, which is a continuation-in-part of application No. 14/306,217, filed on Jun. 16, 2014, now Pat. No. 9,857,536, said (Continued)

(51) Int. Cl.
*G02B 6/24* (2006.01)
*G02B 6/02* (2006.01)
*G02B 6/26* (2006.01)

(52) U.S. Cl.
CPC .................. *G02B 6/262* (2013.01)

(58) Field of Classification Search
CPC ............ G02B 6/26; G02B 6/262; G02B 6/00
USPC .......................................................... 385/11
See application file for complete search history.

(56) References Cited

U.S. PATENT DOCUMENTS

| 4,045,120 A | 8/1977 | de Corlieu |
| 4,076,378 A | 2/1978 | Cole |

(Continued)

FOREIGN PATENT DOCUMENTS

| EP | 0 504 479 A2 | 9/1992 |
| JP | 2008-203496 | 9/2008 |

(Continued)

OTHER PUBLICATIONS

U.S. Appl. No. 16/159,310, Passive Aligning Optical Coupler Array, filed Oct. 12, 2018, now U.S. Pat. No. 10,564,348.

(Continued)

*Primary Examiner* — Kaveh C Kianni
(74) *Attorney, Agent, or Firm* — Knobbe, Martens, Olson & Bear, LLP

(57) ABSTRACT

An optical coupler array can include an elongated optical element having a coupler housing structure and at least one longitudinal waveguide embedded in said housing structure. The housing structure can have an outer cross sectional shape comprising a first side comprising one or more curved portions and a second side comprising one or more flat portions. The second side can be disposed at a distance from the at least one longitudinal waveguide such that waveguiding properties are preserved and not disturbed.

21 Claims, 23 Drawing Sheets

Related U.S. Application Data application No. 15/811,462 is a continuation-in-part of application No. 15/617,684, filed on Jun. 8, 2017, now Pat. No. 10,126,494, which is a continuation-in-part of application No. 15/459,730, filed on Mar. 15, 2017, now Pat. No. 9,817,191, which is a continuation-in-part of application No. 14/306,217, filed on Jun. 16, 2014, now Pat. No. 9,857,536.

(60) Provisional application No. 62/417,180, filed on Nov. 3, 2016, provisional application No. 61/834,957, filed on Jun. 14, 2013, provisional application No. 62/564,178, filed on Sep. 27, 2017.

(56) References Cited

U.S. PATENT DOCUMENTS

| | | | | |
|---|---|---|---|---|
| 4,360,248 | A | 11/1982 | Bickel et al. | |
| 4,431,261 | A | 2/1984 | Kozikowski | |
| 4,715,876 | A * | 12/1987 | Osaka | G02B 6/25 65/407 |
| 4,763,976 | A | 8/1988 | Nolan et al. | |
| 4,773,924 | A * | 9/1988 | Berkey | C03B 37/01211 65/409 |
| 4,795,228 | A | 1/1989 | Schneider | |
| 4,799,949 | A * | 1/1989 | Keck | C03B 23/0473 65/409 |
| 4,818,059 | A * | 4/1989 | Kakii | G02B 6/3839 385/65 |
| 4,867,518 | A * | 9/1989 | Stamnitz | G02B 6/262 359/341.2 |
| 4,881,790 | A * | 11/1989 | Mollenauer | H04B 10/2916 398/180 |
| 4,902,324 | A * | 2/1990 | Miller | C03B 37/15 65/407 |
| 4,931,076 | A * | 6/1990 | Berkey | G02B 6/2835 65/402 |
| 5,009,692 | A * | 4/1991 | Miller | C03B 37/15 385/50 |
| 5,078,767 | A * | 1/1992 | Berkey | G02B 6/2835 65/110 |
| 5,129,022 | A | 7/1992 | Marcus | |
| 5,268,978 | A | 12/1993 | Po et al. | |
| 5,276,745 | A * | 1/1994 | Revelli, Jr. | G02B 6/1245 369/44.12 |
| 5,337,390 | A | 8/1994 | Henson et al. | |
| 5,371,826 | A | 12/1994 | Friedman | |
| 5,379,360 | A * | 1/1995 | Ota | G02B 6/30 385/59 |
| 5,446,810 | A * | 8/1995 | Watanabe | G02B 6/3676 385/137 |
| 5,513,290 | A * | 4/1996 | Ishikawa | G02B 6/4212 385/49 |
| 5,546,488 | A * | 8/1996 | Kitamura | G02B 6/122 385/45 |
| 5,548,672 | A * | 8/1996 | Hattori | G02B 6/2835 385/43 |
| 5,579,154 | A * | 11/1996 | Mueller-Fiedler | G02B 6/4214 359/341.1 |
| 5,703,980 | A * | 12/1997 | MacElwee | G02B 6/2551 385/30 |
| 5,805,751 | A * | 9/1998 | Kewitsch | G02B 6/02114 385/37 |
| 5,854,867 | A * | 12/1998 | Lee | G02B 6/4214 385/49 |
| 5,864,644 | A * | 1/1999 | DiGiovanni | G02B 6/2856 385/43 |
| 5,898,715 | A * | 4/1999 | LeGrange | G02B 6/262 372/6 |
| 5,953,477 | A * | 9/1999 | Wach | A61B 5/14546 385/115 |
| 5,960,141 | A * | 9/1999 | Sasaki | G02B 6/421 385/88 |
| 6,049,646 | A * | 4/2000 | Boscher | G02B 6/02042 385/137 |
| 6,208,788 | B1 | 3/2001 | Nosov | |
| 6,243,518 | B1 * | 6/2001 | Lee | G02B 6/3839 385/54 |
| 6,324,326 | B1 | 11/2001 | Dejneka et al. | |
| 6,330,382 | B1 | 12/2001 | Harshbarger et al. | |
| 6,374,024 | B1 | 4/2002 | Iijima | |
| 6,396,859 | B1 | 5/2002 | Kopp et al. | |
| 6,404,789 | B1 | 6/2002 | Kopp et al. | |
| 6,411,635 | B1 | 6/2002 | Kopp et al. | |
| 6,411,762 | B1 * | 6/2002 | Anthon | C03B 37/01211 385/123 |
| 6,435,733 | B1 * | 8/2002 | Parat | G02B 6/30 385/137 |
| 6,456,637 | B1 * | 9/2002 | Holcomb | H01S 3/0675 359/341.3 |
| 6,513,994 | B1 * | 2/2003 | DiGiovanni | G01N 21/896 356/73.1 |
| 6,671,293 | B2 | 12/2003 | Kopp et al. | |
| 6,678,297 | B2 | 1/2004 | Kopp et al. | |
| 6,721,469 | B2 | 4/2004 | Kopp et al. | |
| 6,728,450 | B2 | 4/2004 | Tombling et al. | |
| 6,741,631 | B2 | 5/2004 | Kopp et al. | |
| 6,744,943 | B2 | 6/2004 | Kopp et al. | |
| 6,792,169 | B2 | 9/2004 | Kopp et al. | |
| 6,826,335 | B1 * | 11/2004 | Grudinin | B82Y 20/00 359/341.3 |
| 6,839,486 | B2 | 1/2005 | Kopp et al. | |
| 6,875,276 | B2 | 4/2005 | Shibayev et al. | |
| 6,891,992 | B2 * | 5/2005 | Kopp | G02B 6/29317 385/15 |
| 6,925,230 | B2 | 8/2005 | Kopp et al. | |
| 6,959,022 | B2 | 10/2005 | Sandrock et al. | |
| 6,961,504 | B2 * | 11/2005 | Matsumoto | G02B 6/3839 385/137 |
| 7,009,679 | B2 | 3/2006 | Kopp et al. | |
| 7,046,432 | B2 * | 5/2006 | Starodoumov | H01S 3/06708 359/341.32 |
| 7,095,911 | B2 | 8/2006 | Kopp et al. | |
| 7,142,280 | B2 | 11/2006 | Kopp et al. | |
| 7,242,702 | B2 * | 7/2007 | Kopp | G11B 7/126 348/E9.026 |
| 7,242,827 | B1 * | 7/2007 | Bochove | G02B 6/02042 385/15 |
| 7,308,173 | B2 * | 12/2007 | Kopp | C03B 37/01245 385/15 |
| 7,409,128 | B2 * | 8/2008 | Holcomb | H01S 3/094003 372/6 |
| 7,437,046 | B2 | 10/2008 | DiGiovanni | |
| 7,457,326 | B2 * | 11/2008 | Rogers | G02B 6/04 372/32 |
| 7,463,800 | B2 | 12/2008 | Kopp et al. | |
| 7,469,084 | B2 | 12/2008 | Aalto | |
| 7,500,789 | B2 * | 3/2009 | Grunberg | G02B 6/3807 385/53 |
| 7,620,084 | B1 * | 11/2009 | Jacob | H01S 5/06808 372/29.016 |
| 7,983,515 | B2 | 7/2011 | Zhang et al. | |
| 8,184,363 | B2 | 5/2012 | Rothenberg | |
| 8,218,921 | B2 | 7/2012 | Kopp et al. | |
| 8,326,099 | B2 * | 12/2012 | Singer | G02B 6/30 385/43 |
| 8,457,456 | B2 | 6/2013 | Kopp et al. | |
| 8,463,094 | B2 | 6/2013 | Kopp et al. | |
| 8,712,199 | B2 | 4/2014 | Kopp et al. | |
| 8,948,547 | B2 | 2/2015 | Kopp | |
| 9,063,289 | B1 | 6/2015 | Farmer | G02B 27/106 |
| 9,316,788 | B2 * | 4/2016 | Witzens | G02B 6/125 |
| 9,335,467 | B2 | 5/2016 | Kokubun et al. | |
| 9,335,493 | B2 * | 5/2016 | Isenhour | G02B 6/4206 |
| 9,529,155 | B2 * | 12/2016 | Bhagavatula | G02B 6/3885 |
| 9,606,300 | B2 * | 3/2017 | Sasaki | G02B 6/3885 |
| 9,739,953 | B2 * | 8/2017 | Moriyama | G02B 6/4284 |
| 9,766,407 | B2 | 9/2017 | Weiner et al. | |
| 9,810,845 | B2 | 11/2017 | Kopp | |
| 9,817,191 | B2 | 11/2017 | Kopp et al. | |
| 9,851,510 | B2 | 12/2017 | Kopp | |

(56) References Cited

U.S. PATENT DOCUMENTS

| | | |
|---|---|---|
| 9,857,536 B2 | 1/2018 | Kopp et al. |
| 9,885,825 B2 | 2/2018 | Kopp |
| 9,921,355 B2 | 3/2018 | Weiner et al. |
| 9,983,362 B2 | 5/2018 | Kopp et al. |
| 10,078,019 B2 | 9/2018 | Kopp et al. |
| 10,101,536 B2 | 10/2018 | Kopp et al. |
| 10,126,494 B2 | 11/2018 | Kopp |
| 10,191,236 B2* | 1/2019 | Yeh .................. G02B 6/4295 |
| 10,197,736 B2 | 2/2019 | Kopp |
| 10,353,227 B2 | 7/2019 | Kopp et al. |
| 10,481,324 B2 | 11/2019 | Churikov et al. |
| 10,502,898 B2 | 12/2019 | Kopp |
| 10,564,348 B2 | 2/2020 | Kopp et al. |
| 10,564,360 B2 | 2/2020 | Kopp et al. |
| 10,761,271 B2 | 9/2020 | Kopp |
| 10,838,155 B2 | 11/2020 | Kopp et al. |
| 10,914,891 B2 | 2/2021 | Kopp |
| 2002/0003827 A1 | 1/2002 | Genack et al. |
| 2002/0069676 A1 | 6/2002 | Kopp et al. |
| 2002/0071881 A1 | 6/2002 | Kopp et al. |
| 2002/0076190 A1* | 6/2002 | Matsumoto ............. G02B 6/30 385/137 |
| 2002/0118710 A1 | 8/2002 | Kopp et al. |
| 2002/0122629 A1* | 9/2002 | Grubsky ............ G02B 6/29319 385/37 |
| 2002/0150349 A1* | 10/2002 | Shahid ................ G02B 6/3885 385/65 |
| 2002/0154866 A1* | 10/2002 | Tombling ............ G02B 6/4219 385/52 |
| 2002/0154869 A1* | 10/2002 | Chan .................. G02B 6/4232 385/88 |
| 2002/0172461 A1 | 11/2002 | Singer et al. |
| 2002/0172486 A1* | 11/2002 | Fermann ............ H01S 3/06708 385/128 |
| 2002/0197037 A1* | 12/2002 | Bailey ................ G02B 6/2817 385/123 |
| 2003/0012544 A1* | 1/2003 | Matsumoto .......... G02B 6/3676 385/137 |
| 2003/0118285 A1 | 6/2003 | Kopp et al. |
| 2003/0152342 A1 | 8/2003 | Wang et al. |
| 2004/0008955 A1* | 1/2004 | Patlakh ................ G02B 6/255 385/95 |
| 2004/0145704 A1 | 7/2004 | Kopp et al. |
| 2004/0156401 A1* | 8/2004 | Sandrock .............. C03C 25/104 372/6 |
| 2004/0179765 A1* | 9/2004 | Kersey ................ G01L 1/242 385/12 |
| 2005/0013547 A1* | 1/2005 | Rossi .................. G02B 6/3862 385/53 |
| 2005/0031266 A1 | 2/2005 | Vakili et al. |
| 2005/0094952 A1* | 5/2005 | Gonthier .................. G02B 6/14 385/100 |
| 2005/0105866 A1 | 5/2005 | Grudinin et al. |
| 2005/0157998 A1* | 7/2005 | Dong ................ G02B 6/02342 385/126 |
| 2005/0205771 A1* | 9/2005 | Sherrer ................ G02B 6/4292 250/239 |
| 2005/0226560 A1 | 10/2005 | Kopp et al. |
| 2005/0254770 A1* | 11/2005 | Watanabe ............ G02B 6/3636 385/137 |
| 2006/0008219 A1* | 1/2006 | Davis ................ H01S 3/06704 385/123 |
| 2006/0045444 A1* | 3/2006 | Miller .................. G02B 6/04 385/115 |
| 2006/0098923 A1* | 5/2006 | Fujiwara ............ G02B 6/4292 385/88 |
| 2006/0186503 A1* | 8/2006 | Guidotti .............. H01L 31/0392 257/458 |
| 2006/0219673 A1* | 10/2006 | Varnham ............ B23K 26/0734 219/121.6 |
| 2007/0086707 A1* | 4/2007 | Suzuki .................. G02B 6/255 385/58 |
| 2007/0104431 A1* | 5/2007 | Di Teodoro ........ H01S 3/06754 385/123 |
| 2007/0172174 A1* | 7/2007 | Scerbak ............... G02B 6/4296 385/76 |
| 2007/0237453 A1* | 10/2007 | Nielsen ............... G02B 6/02338 385/28 |
| 2007/0280597 A1* | 12/2007 | Nakai .................. G02B 6/2835 385/43 |
| 2008/0013955 A1* | 1/2008 | Takano .................... G02B 6/32 398/85 |
| 2008/0056656 A1 | 3/2008 | Dong et al. |
| 2008/0098772 A1* | 5/2008 | Kopp .................. G02B 6/255 65/406 |
| 2008/0170823 A1 | 7/2008 | Gonthier |
| 2008/0193093 A1* | 8/2008 | DiGiovanni ......... G02B 6/0365 385/115 |
| 2008/0209952 A1* | 9/2008 | Tremblay ............. G02B 6/2835 65/402 |
| 2008/0226228 A1* | 9/2008 | Tamura ................ G02B 6/4214 385/33 |
| 2008/0285606 A1* | 11/2008 | Kippenberg ......... H04B 10/506 372/32 |
| 2009/0059966 A1* | 3/2009 | Mayer .................. G02B 6/4403 372/6 |
| 2009/0154881 A1* | 6/2009 | Salokatve ................ G02B 6/25 385/46 |
| 2009/0201575 A1* | 8/2009 | Fermann ............. H01S 3/06745 359/341.32 |
| 2009/0238523 A1* | 9/2009 | Honma ................ G02B 6/3846 385/96 |
| 2009/0245728 A1* | 10/2009 | Cherchi .................. G02B 6/305 385/28 |
| 2009/0324159 A1 | 12/2009 | Kopp et al. |
| 2010/0002983 A1 | 1/2010 | Kopp et al. |
| 2010/0158438 A1 | 6/2010 | Churikov et al. |
| 2010/0178007 A1* | 7/2010 | Thomson ............ G02B 6/30 385/55 |
| 2010/0188734 A1 | 7/2010 | Grudinin et al. |
| 2010/0237255 A1 | 9/2010 | Monro et al. |
| 2011/0026880 A1 | 2/2011 | Galli et al. |
| 2011/0211832 A1* | 9/2011 | Schunk ................ G02B 6/2821 398/41 |
| 2011/0280517 A1* | 11/2011 | Fini ..................... G02B 6/262 385/43 |
| 2011/0292676 A1 | 12/2011 | Weiner et al. |
| 2011/0293219 A1 | 12/2011 | Weiner et al. |
| 2012/0076452 A1* | 3/2012 | Kersey .................. H01S 3/0675 385/12 |
| 2012/0189241 A1 | 7/2012 | Kopp et al. |
| 2012/0251045 A1* | 10/2012 | Budd .................. G02B 13/22 385/33 |
| 2012/0257857 A1 | 10/2012 | Kopp et al. |
| 2012/0301073 A1* | 11/2012 | DeMeritt ............. G02B 6/4284 385/14 |
| 2013/0051726 A1* | 2/2013 | Wagener ............... G02B 6/32 385/18 |
| 2013/0114924 A1* | 5/2013 | Loh ..................... G02B 6/1245 385/14 |
| 2013/0121641 A1 | 5/2013 | Singer et al. |
| 2013/0163935 A1* | 6/2013 | Sasaki ................. G02B 6/4403 385/78 |
| 2013/0188174 A1 | 7/2013 | Kopp et al. |
| 2013/0188175 A1 | 7/2013 | Kopp et al. |
| 2013/0209112 A1* | 8/2013 | Witzens .................. G02B 6/423 398/214 |
| 2013/0216184 A1* | 8/2013 | Kopp ..................... G02B 6/262 385/43 |
| 2013/0223795 A1 | 8/2013 | Sasaoka et al. |
| 2013/0230274 A1* | 9/2013 | Fish ..................... G02B 6/305 385/14 |
| 2014/0099058 A1* | 4/2014 | Charbonneau-Lefort ................... G02B 6/4284 385/33 |
| 2014/0219613 A1* | 8/2014 | Nielson ............... G02B 6/3851 385/78 |
| 2014/0294345 A1 | 10/2014 | Kopp et al. |

(56) References Cited

U.S. PATENT DOCUMENTS

| | | | |
|---|---|---|---|
| 2015/0016775 A1* | 1/2015 | Ho | G02B 6/423 |
| | | | 385/33 |
| 2015/0086199 A1 | 3/2015 | Ryf et al. | |
| 2015/0212274 A1 | 7/2015 | Kopp | |
| 2015/0241635 A1* | 8/2015 | Suzuki | G02B 6/3869 |
| | | | 385/33 |
| 2016/0154189 A1* | 6/2016 | Elliott | G02B 6/3853 |
| | | | 385/79 |
| 2016/0223750 A1 | 8/2016 | Shastri et al. | |
| 2016/0245992 A1 | 8/2016 | Takenaga et al. | |
| 2017/0108650 A1 | 4/2017 | Weiner et al. | |
| 2017/0184791 A1 | 6/2017 | Kopp et al. | |
| 2017/0192176 A1 | 7/2017 | Kopp | |
| 2017/0205583 A1 | 7/2017 | Bennett et al. | |
| 2017/0219774 A1 | 8/2017 | Kopp | |
| 2017/0268937 A1 | 9/2017 | Kopp et al. | |
| 2017/0269277 A1 | 9/2017 | Weiner et al. | |
| 2017/0269293 A1 | 9/2017 | Churikov et al. | |
| 2017/0276867 A1 | 9/2017 | Kopp | |
| 2017/0299806 A1 | 10/2017 | Kopp | |
| 2017/0336570 A1 | 11/2017 | Kopp et al. | |
| 2017/0336659 A1 | 11/2017 | Kopp et al. | |
| 2017/0371114 A1* | 12/2017 | Mentovich | G02B 6/32 |
| 2018/0172916 A1 | 6/2018 | Kopp et al. | |
| 2018/0188454 A1 | 7/2018 | Lipson et al. | |
| 2018/0281108 A1* | 10/2018 | Victor | B23K 26/0648 |
| 2019/0025501 A1 | 1/2019 | Kopp | |
| 2019/0049657 A1 | 2/2019 | Kopp et al. | |
| 2019/0243069 A1 | 8/2019 | Kopp | |
| 2020/0064563 A1 | 2/2020 | Kopp et al. | |
| 2021/0041640 A1 | 2/2021 | Singer et al. | |

FOREIGN PATENT DOCUMENTS

| | | |
|---|---|---|
| WO | WO 2002/073247 A2 | 9/2002 |
| WO | WO 2005/111680 A1 | 11/2005 |
| WO | WO 2006/046947 A2 | 5/2006 |
| WO | WO 2008/080174 A1 | 7/2008 |
| WO | WO 2009/158661 A2 | 12/2009 |
| WO | WO 2010/009101 A2 | 1/2010 |
| WO | WO 2010/071861 A2 | 6/2010 |
| WO | WO 2015/009756 A1 | 1/2015 |
| WO | WO 2016/137344 A1 | 9/2016 |
| WO | WO 2017/053479 A1 | 3/2017 |
| WO | WO 2017/100667 A1 | 6/2017 |
| WO | WO 2018/085435 A1 | 5/2018 |
| WO | WO 2018/227008 A1 | 12/2018 |
| WO | WO 2020/068695 A1 | 4/2020 |
| WO | WO 2020/077285 A1 | 4/2020 |

OTHER PUBLICATIONS

U.S. Appl. No. 15/811,462, Multichannel Optical Coupler Array, filed Nov. 13, 2017, now U.S. Pat. No. 10,101,536.

U.S. Appl. No. 15/459,730, Multichannel Optical Coupler Array, filed Mar. 15, 2017, now U.S. Pat. No. 9,817,191.

U.S. Appl. No. 14/306,217, Optical Component Assembly for Use With an Optical Device, filed Jun. 16, 2014, now U.S. Pat. No. 9,857,536.

U.S. Appl. No. 15/617,684, Configurable Polarization Mode Coupler, filed Jun. 8, 2017, now U.S. Pat. No. 10,126,494.

N.K. Fontaine, "Photonic Lantern Spatial Multiplexers in Space-Division Multiplexing", IEEE Photonics Society Summer Topical Meeting Series, Jul. 8, 2013, pp. 97-98.

S. Mitani, K. Nigo, S. Karasawa, H. Endo, and T. Takahata, "Interferometric multi-core fiber optic gyroscope under temperature changing environment", International Conference on Space Optics, Proc. of SPIE 11180, 1118055, pp. 1-10 (2018).

International Search Report and Written Opinion in International Application No. PCT/US2020/055778, dated Feb. 2, 2021.

International Search Report and Written Opinion in International Application No. PCT/US2019/052481, dated Jan. 10, 2020 in 11 pages.

International Search Report and Written Opinion in International Application No. PCT/US2019/055965, dated Jan. 31, 2020 in 10 pages.

International Preliminary Report on Patentability in International Application No. PCT/US2018/036539, dated Dec. 19, 2019 in 5 pages.

International Search Report and Written Opinion in International Application No. PCT/US2018/036539, dated Sep. 28, 2018 in 7 pages.

International Search Report and Written Opinion in International Application No. PCT/US2017/059578, dated Feb. 19, 2018 in 9 pages.

International Preliminary Report on Patentability in International Application No. PCT/US2017/059578, dated May 16, 2019 in 6 pages.

A. Z. Genack, V. I. Kopp, V. M. Churikov, J. Singer, N. Chao, and D. Neugroschl, "Chiral fiber Bragg gratings", Proceedings of SPIE 5508, 57, pp. 1-8 (2004).

A. Z. Genack, V. I. Kopp, V. M. Churikov, J. Singer, N. Chao, and D. Neugroschl, "From planar to fiber chiral gratings", (Invited Paper), Proceedings of SPIE 5741, 90-97 (2005).

B.G. Lee, F.E.Doany, S. Assefa, W.M.J. Green, M. Yang, C.L. Schow, C.V. Jahnes, S. Zhang, J. Singer, V.I. Kopp, J.A. Kash, and Y.A. Vlasov, "20-um-Pitch Eight-Channel Monolithic Fiber Array Coupling 160 Gb/s/Channel to Silicon Nanophotonic Chip", Proc. OFC, PDPA4, Optical Society of America, pp. 1-3, (2010).

Bin Huang et al., "All-fiber mode-group-selective photonic lantern using graded-index multimode fibers", Optics Express, Optical Society of America, pp. 224-234 (2015).

C. R. Doerr, L. Zhang, P. J. Winzer, "Monolithic InP Multi-Wavelength Coherent Receiver", Proc. OFC, paper PDPB1, Optical Society of America, pp. 1-3, (2010).

C.R. Doerr, L. Zhang, L. Buhl, V.I. Kopp, D. Neugroschl, and G. Weiner, "Tapered Dual-Core Fiber for Efficient and Robust Coupling to InP Photonic Integrated Circuits", Proc. OFC, Optical Society of America, pp. 1-3 (2009).

D. Neugroschl, J. Park, M. Wlodawski, J. Singer, and V.I. Kopp, "High-efficiency (6+1)×1 combiner for high power fiber lasers and amplifiers", Proc. SPIE 8601, Fiber Lasers X: Technology, Systems, and Applications, 860139, pp. 1-6 (2013).

D. Neugroschl, V.I. Kopp, J. Singer, and G. Zhang, "Vanishing-core tapered coupler for interconnect applications", Proceedings of SPIE 7221, 72210G, pp. 1-8 (2009).

F.E. Doany, B.G. Lee, S.Assefa, W.M.J. Green, M. Yang, C.L. Schow, C.V. Jahnes, S. Zhang, J. Singer, V.I. Kopp, J.A. Kash, and Y.A. Vlasov, "Multichannel High-Bandwidth Coupling of Ultra-Dense Silicon Photonic Waveguide Array to Standard-Pitch Fiber Array", IEEE J. of Lightwave Technology, 29, 4, 475-482 (2011).

G. Shvets, S. Trendafilov, V.I. Kopp, D. Neugroschl, and A.Z. Genack, "Polarization properties of chiral fiber gratings", J. Opt. A: Pure Appl. Opt. 11, 074007, pp. 1-10 (2009).

H. Henschel, S.K. Hoeffgen, J. Kuhnhenn and U. Weinand, "High Radiation Sensitivity of Chiral Long Period Gratings", IEEE Transaction on Nuclear Science, 57, 5, 2915-2922 (2010).

J. Park, M.S. Wlodawski, J. Singer, D. Neugroschl, A.Z. Genack, V.I. Kopp, "Temperature and Pressure Sensors Based on Chiral Fibers", Proc. of SPIE 8370, 837008, pp. 1-8 (2012).

M. Wlodawski, V.I. Kopp, J. Park, J. Singer, E. Hubner, D. Neugroschl, N. Chao, and A.Z. Genack, "A new generation of ultra-dense optical I/O for silicon photonics," Proceedings of SPIE—The International Society for Optical Engineering. vol. 8990, 899006, pp. 1-12 (2014).

Monica L. Minden, "Passive Coherent Combining of Fiber Oscillators", Fiber Lasers IV: Technology, Systems, and Applications, Proc. of SPIE vol. 6453, 64530P, pp. 1-8—(2007).

P. De Heyn, V.I. Kopp, S. A. Srinivasan, P. Verheyen, J. Park, M.S. Wlodawski, J. Singer, D. Neugroschl, B. Snyder, S. Balakrishnan, G. Lepage, M. Pantouvaki, P. Absil, and J. Van Campenhout, "Ultra-dense 16×56Gb/s NRZ GeSi EAM-PD arrays coupled to multicore fiber for short-reach 896Gb/s optical links," 2017 Optical Fiber Communications Conference and Exhibition (OFC), Los Angeles, CA, Optical Society of America, pp. 1-3 (2017).

(56) References Cited

OTHER PUBLICATIONS

P. Liao, M. Sakib, F. Lou, J. Park, M. Wlodawski, V.I. Kopp, D. Neugroschl, and O. Liboiron-Ladouceur, "Ultradense Silicon Photonic Interface for Optical Interconnection," in IEEE Photonics Technology Letters, vol. 27, No. 7, pp. 725-728 (2015).

P.V. Shibaev, K. Tang, A.Z. Genack, V. Kopp, and M. M. Green, "Lasing from a stiff chain polymeric lyotropic cholesteric liquid crystal", Macromolecules 35(8), 3022-3025 (2002).

P.V. Shibaev, V.I. Kopp, and A.Z. Genack, "Photonic materials based on mixtures of cholesteric liquid crystals with polymers", J. Phys. Chem. B.107, 6961-6964 (2003).

S. Guillemet, D. Kinet, A. Bertrand, Y. Hernandez, and D. Giannone, "Experimental study and comparison of three innovative high power CW polarised all-in-fibre laser designs", IEEE Photonics Benelux Chapter, 141-144 (2010).

S. Guillemet, D. Kinet, A. Bertrand, Y. Hernandez, and D. Giannone, "High Power All-In-Fibre Linearly Polarized Laser Using Chiral Grating-Based Polarizer", 4th EPS-QEOD Europhoton Conference, 1 page (2010).

S. Zhang, V.I. Kopp, V. Churikov, and G. Zhang, "PANDA-based chiral in-fiber polarizer", Proceedings of SPIE 7212, 72120D, pp. 1-8 (2009).

T. J. Seok, V. Kopp, D. Neugroschl, J. Henriksson, J. Luo, and M. C. Wu, "High density optical packaging of high radix silicon photonic switches," 2017 Optical Fiber Communications Conference and Exhibition (OFC), Los Angeles, CA, Optical Society of America, pp. 1-3 (2017).

V. I. Kopp and A. Z. Genack, "Chiral fibers", Chapter 12 in Specialty Optical Fibers Handbook edited by Alexis Mendez and T. F. Morse. Academic Press, 401-427 (2007).

V. I. Kopp and A. Z. Genack, "Density of states and lasing at the edge of a photonic stop band in dye-doped cholesteric liquid crystals", Proceedings of SPIE 3623, 71-79 (1999).

V. I. Kopp, A. Z. Genack, V. M. Churikov, Jonathan Singer and Norman Chao, "Chiral Fiber Gratings Polarize Light", Photonics Spectra 38, 78-79 (2004).

V. I. Kopp, J. Park, M. S. Wlodawski, E. Hubner, J. Singer, D. Neugroschl, and A. Z. Genack, "Vanishing Core Optical Waveguides for Coupling, Amplification, Sensing, and Polarization Control," in Advanced Photonics, OSA Technical Digest (online), paper SoW1B.3, Optical Society of America, pp. 1-3 (2014).

V. I. Kopp, J. Park, M. Wlodawski, J. Singer, D. Neugroschl and A. Z. Genack, "Chiral Fibers: Microformed Optical Waveguides for Polarization Control, Sensing, Coupling, Amplification, and Switching," in Journal of Lightwave Technology, vol. 32, No. 4, pp. 605-613 (2014).

V. I. Kopp, J. Park, M. Wlodawski, J. Singer, D. Neugroschl and A. Z. Genack, "Pitch Reducing Optical Fiber Array and multicore fiber for space-division multiplexing," 2013 IEEE Photonics Society Summer Topical Meeting Series, Waikoloa, HI, pp. 99-100 (2013).

V. I. Kopp, J. Park, M. Wlodawski, J. Singer, D. Neugroschl and A. Z. Genack, "Pitch Reducing Optical Fiber Array for dense optical interconnect," IEEE Avionics, Fiber-Optics and Photonics Digest CD, Cocoa Beach, FL, 2012, pp. 48-49.

V. I. Kopp, P. V. Shibaev, R. Bose, and A. Z. Genack, "Anisotropic photonic-bandgap structures", Proceedings of SPIE 4655, 141-149 (2002).

V. I. Kopp, V. M. Churikov, and A. Z. Genack, "Chiral Fiber Gratings Sense the Environment", Laser Focus World, 76-79 (2008).

V. I. Kopp, V. M. Churikov, and A. Z. Genack, "Synchronization of optical polarization conversion and scattering in chiral fibers", Optics Letters 31(5), 571-573 (2006).

V. I. Kopp, V. M. Churikov, G. Zhang, J. Singer, C. W. Draper, N. Chao, D. Neugroschl, and A.Z. Genack, "Chiral fiber gratings: perspectives and challenges for sensing applications", (Invited Paper), Proceedings of SPIE 6619, 66190B, pp. 1-8 (2007).

V. I. Kopp, V. M. Churikov, G. Zhang, J. Singer, C. W. Draper, N. Chao, D. Neugroschl, and A.Z. Genack, "Single- and double-helix chiral fiber sensors", J. Opt. Soc. Am. B 24(10), A48-A52 (2007).

V.I. Kopp and A.Z. Genack, "Chiral Fibres: Adding Twist", Nature Photonics 5, 470-472 (2011).

V.I. Kopp and A.Z. Genack, "Double-helix chiral fibers", Optics Letters 28(20), 1876-1878 (2003).

V.I. Kopp and A.Z. Genack, "Lasing at the edge of a photonic stop band in cholesteric liquid crystals", IEEE LEOS 13, No. 2, 8-10 (1999).

V.I. Kopp and A.Z. Genack, "Twist defect in chiral photonic structures", Physical Review Letters 89(3), 033901, pp. 1-4 (2002).

V.I. Kopp, B.Fan, H.K.M. Vithana, and A.Z. Genack, "Low-threshold lasing at the edge of a photonic stop band in cholesteric liquid crystals", Optics Letters 23(21), 1707-1709 (1998).

V.I. Kopp, G. Zhang, S. Zhang, A.Z. Genack, and D. Neugroschl, "Chiral fiber optical isolator", Proceedings of SPIE 7195, 71950B, pp. 1-8 (2009).

V.I. Kopp, J. Park, M. Wlodawski, E. Hubner, J. Singer, D. Neugroschl, A. Z. Genack, P. Dumon, J. Van Campenhout, and P. Absil, "Two-Dimensional, 37-Channel, High-Bandwidth, Ultra-Dense Silicon Photonics Optical Interface," Journal of Lightwave Technology, vol. 33, No. 3, pp. 653-656 (2015).

V.I. Kopp, J. Park, M. Wlodawski, J. Singer, and D. Neugroschl, "Polarization maintaining, high-power and high-efficiency (6+1)×1 pump/signal combiner", Proc. SPIE 8961, Fiber Lasers XI: Technology, Systems, and Applications, 89612N, pp. 1-6 (2014).

V.I. Kopp, J. Park, M.S. Wlodawski, J. Singer, D. Neugroschl, P. de Heyn, B. Snyder, J. Van Campenhout, and P. Absil, "Flexible, Multi-channel, Ultra-dense Optical Interface for Silicon Photonics," ECOC 2016; 42nd European Conference on Optical Communications, Dusseldorf, Germany, 755-757 (2016).

V.I. Kopp, J. Singer, D. Neugroschl, and A.Z. Genack, "Chiral fiber sensors for harsh environments", Proc. SPIE 8028, Fiber Optic Sensors and Applications VIII, 802803, pp. 1-8 (2011).

V.I. Kopp, R. Bose, and A.Z. Genack, "Transmission through chiral twist defects in anisotropic periodic structures", Optics Letters 28(5), 349-351 (2003).

V.I. Kopp, V.M. Churikov, J. Singer, D. Neugroschl, and A.Z. Genack, "Chiral fiber sensors," Proc. SPIE 7677, Fiber Optic Sensors and Applications VII, 76770U, pp. 1-6 (2010).

V.I. Kopp, V.M. Churikov, J. Singer, N. Chao, D. Neugroschl, and A. Z. Genack, "Chiral fiber gratings", Science 305, 74-75 (2004).

V.I. Kopp, Z.-Q. Zhang and A.Z. Genack, "Large coherence area thin-film photonic stop-band lasers", Physical Review Letters 86(9), 1753-1756 (2001).

V.I. Kopp, Z.-Q. Zhang and A.Z. Genack, "Lasing in chiral photonic structures", Progress in Quantum Electronics 27, 369-416 (2003).

V.M. Churikov, V.I. Kopp, A.Z. Genack, "Dual-twist fiber long period gratings", Proceedings of SPIE 7212, 72120H, pp. 1-9 (2009).

V.M. Churikov, V.I. Kopp, and A.Z. Genack, "Chiral diffraction gratings in twisted microstructured fibers", Opt. Lett. 35(3), 342-344 (2010).

\* cited by examiner

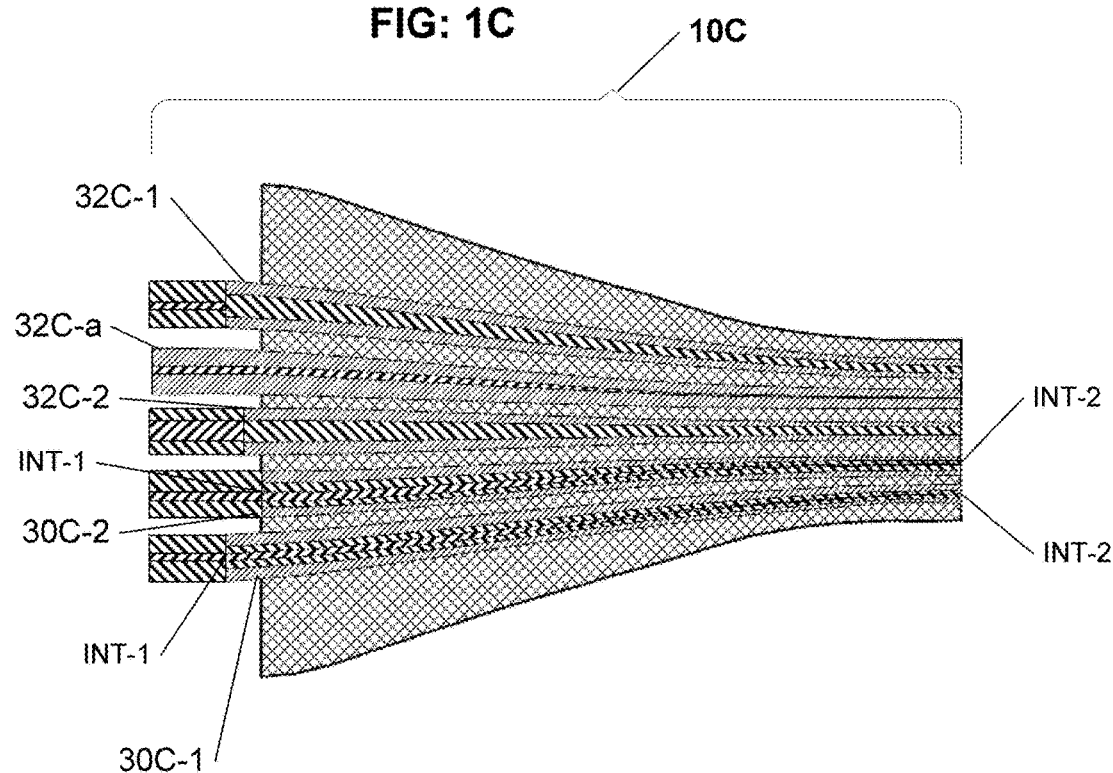
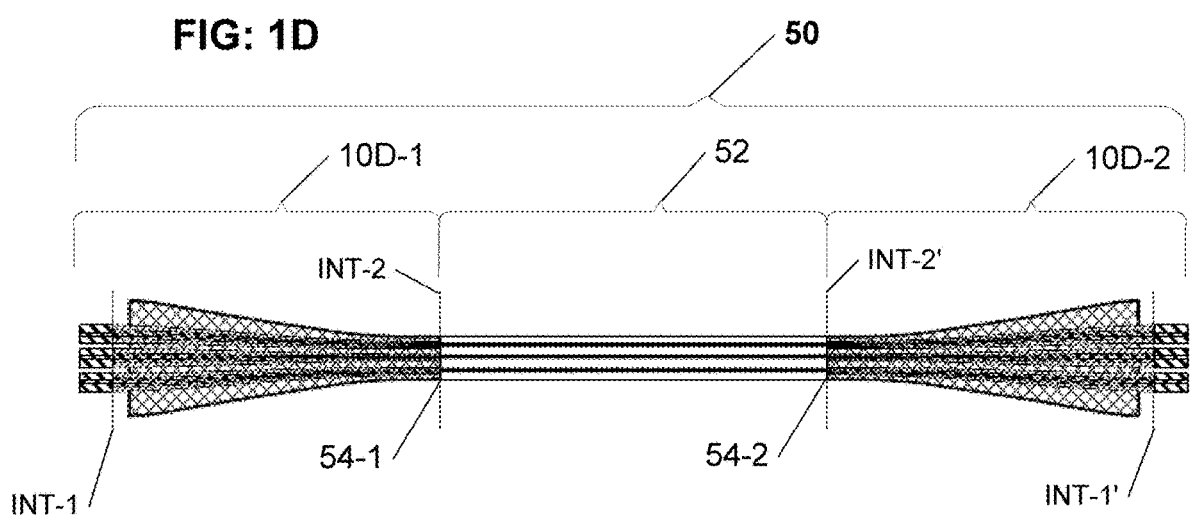

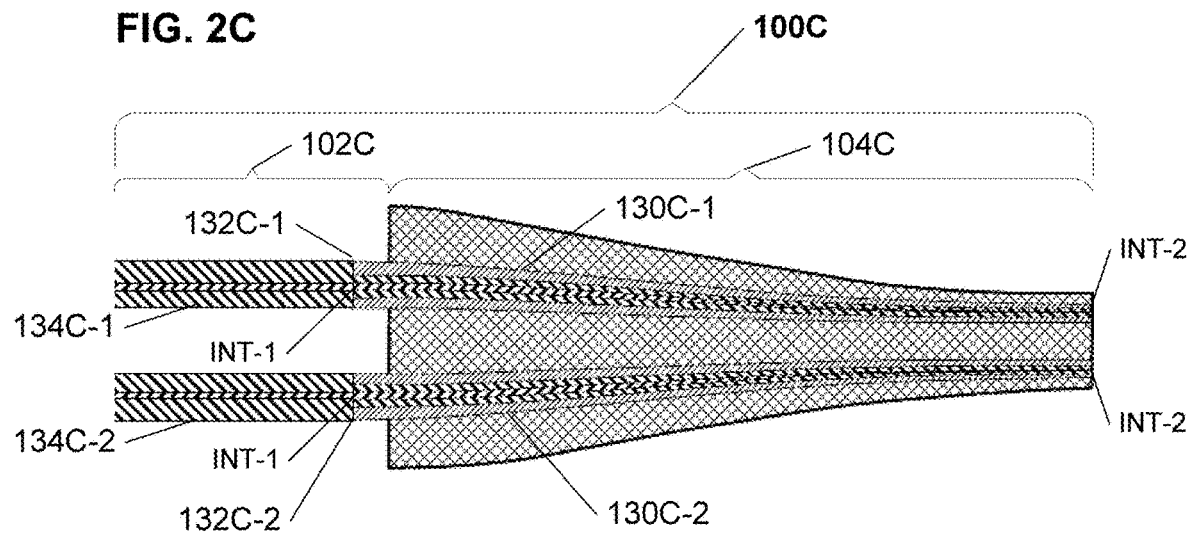
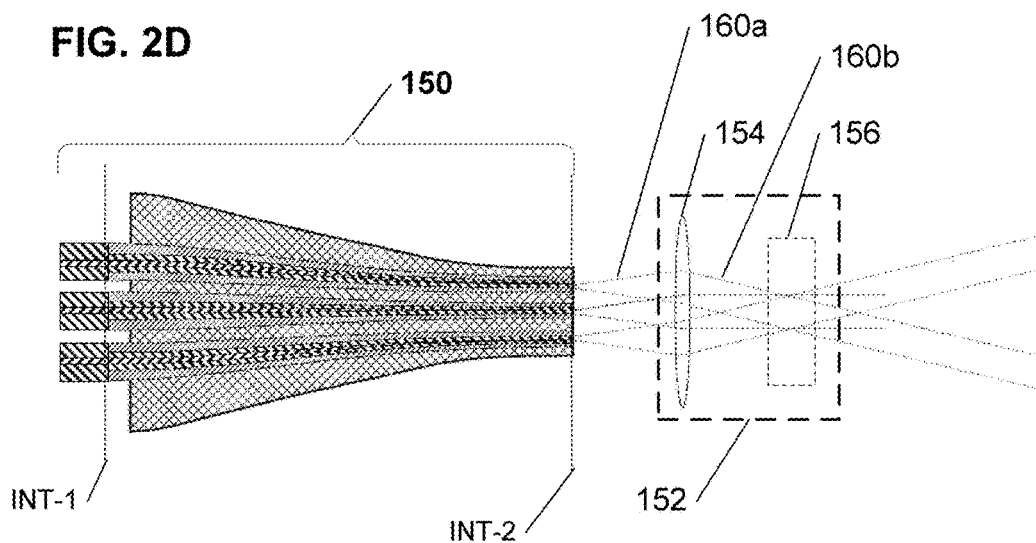

PASSIVE ALIGNING OPTICAL COUPLER ARRAY

CROSS-REFERENCE TO RELATED APPLICATIONS

This application is a continuation-in-part of U.S. application Ser. No. 16/159,310, entitled "PASSIVE ALIGNING OPTICAL COUPLER ARRAY," filed Oct. 12, 2018, which is a continuation-in-part of U.S. application Ser. No. 15/811,462, entitled "MULTICHANNEL OPTICAL COUPLER ARRAY," filed Nov. 13, 2017, which is a continuation-in-part of U.S. application Ser. No. 15/459,730, entitled "MULTICHANNEL OPTICAL COUPLER ARRAY," filed Mar. 15, 2017, which claims the benefit of U.S. Provisional Application No. 62/417,180, entitled "MULTICHANNEL OPTICAL COUPLER ARRAY," filed Nov. 3, 2016 and which is a continuation-in-part of U.S. application Ser. No. 14/306,217, entitled "OPTICAL COMPONENT ASSEMBLY FOR USE WITH AN OPTICAL DEVICE," filed Jun. 16, 2014, which claims the benefit of U.S. Provisional Application No. 61/834,957, entitled "OPTICAL COMPONENT ASSEMBLY FOR USE WITH AN OPTICAL DEVICE," filed Jun. 14, 2013. U.S. application Ser. No. 15/811,462 also claims the benefit of U.S. Provisional Application No. 62/564,178, entitled "MULTICHANNEL OPTICAL COUPLER ARRAY," filed Sep. 27, 2017 and is a continuation-in-part of U.S. application Ser. No. 15/617,684, entitled "CONFIGURABLE POLARIZATION MODE COUPLER," filed Jun. 8, 2017, which is a continuation-in-part of U.S. application Ser. No. 15/459,730, entitled "MULTICHANNEL OPTICAL COUPLER ARRAY," filed Mar. 15, 2017, which claims the benefit of U.S. Provisional Application No. 62/417,180, entitled "MULTICHANNEL OPTICAL COUPLER ARRAY," filed Nov. 3, 2016 and which is a continuation-in-part of U.S. application Ser. No. 14/306,217, entitled "OPTICAL COMPONENT ASSEMBLY FOR USE WITH AN OPTICAL DEVICE," filed Jun. 16, 2014, which claims the benefit of U.S. Provisional Application No. 61/834,957, entitled "OPTICAL COMPONENT ASSEMBLY FOR USE WITH AN OPTICAL DEVICE," filed Jun. 14, 2013. The entirety of each application referenced in this paragraph is expressly incorporated herein by reference.

BACKGROUND

Field of the Invention

The present disclosure relates generally to an optical coupler array, e.g., a multichannel optical coupler array, for coupling, e.g., a plurality of optical fibers to at least one optical device. Some embodiments can relate to coupling light to and from a plurality of fibers, such as to and from one or more single mode fibers, few-mode fibers, multimode fibers, multicore single mode fibers, multicore few-mode fibers, and/or multicore multimode fibers. Some embodiments can relate to coupling light to and from photonic integrated circuits (PICs) and to and from multicore fibers (MCFs). Some embodiments can include passive coupling of one or more MCFs to a PIC device (e.g., to one or more waveguides at the edge of a PIC). Some embodiments can relate generally to high power single mode laser sources, and to devices for coherent combining of multiple optical fiber lasers to produce multi-kilowatt single mode laser sources. Some embodiments may relate to phase locked optical fiber components of a monolithic design that may be fabricated with a very high degree of control over precise positioning (e.g. transverse or cross-sectional positioning) of even large quantities of plural waveguides, and that may potentially be configurable for increasing or optimization of the components' fill factor (which can be related to the ratio of the mode field diameter of each waveguide at the "output" end thereof, to the distance between neighboring waveguides).

Description of the Related Art

Optical waveguide devices are useful in various high technology industrial applications, and especially in telecommunications. In recent years, these devices, including planar waveguides, two or three dimensional photonic crystals, multi-mode fibers, multicore single-mode fibers, multicore few-mode fibers, and multicore multi-mode fibers are being employed increasingly in conjunction with conventional optical fibers. In particular, optical waveguide devices based on refractive index contrast or numerical aperture (NA) waveguides that are different from that of conventional optical fibers and multichannel devices are advantageous and desirable in applications in which conventional optical fibers are also utilized. However, there are significant challenges in interfacing dissimilar NA waveguide devices and multichannel devices with channel spacing less than a diameter of conventional fibers, with conventional optical fibers. For example, in some cases, at least some of the following obstacles may be encountered: (1) the difference between the sizes of the optical waveguide device and the conventional fiber (especially with respect to the differences in core sizes), (2) the difference between the NAs of the optical waveguide device and the conventional fiber, and (3) the channel spacing smaller than the diameter of conventional fibers. Failure to properly address these obstacles can result in increased insertion losses and a decreased coupling coefficient at each interface.

For example, conventional optical fiber based optical couplers, such as shown in FIG. 6 (Prior Art) can be configured by inserting standard optical fibers (used as input fibers) into a capillary tube comprised of a material with a refractive index lower than the cladding of the input fibers. However, there are a number of disadvantages to this approach. For example, a fiber cladding-capillary tube interface becomes a light guiding interface of a lower quality than interfaces inside standard optical fibers and, therefore, can be expected to introduce optical loss. Furthermore, the capillary tube must be fabricated using a costly fluorine-doped material, greatly increasing the expense of the coupler.

U.S. Pat. No. 7,308,173, entitled "OPTICAL FIBER COUPLER WITH LOW LOSS AND HIGH COUPLING COEFFICIENT AND METHOD OF FABRICATION THEREOF", which is hereby incorporated herein in its entirety, advantageously addressed some of the issues discussed above by providing various embodiments of an optical fiber coupler capable of providing a low-loss, high-coupling coefficient interface between conventional optical fibers and optical waveguide devices.

Nevertheless, a number of challenges still remained. With the proliferation of multichannel optical devices (e.g., waveguide arrays), establishing low-loss high-accuracy connections to arrays of low or high NA waveguides often was problematic, especially because the spacing between the waveguides is very small making coupling thereto all the more difficult. U.S. Pat. No. 8,326,099, entitled "OPTICAL FIBER COUPLER ARRAY", issued Dec. 4, 2012, which is hereby incorporated herein by reference in its entirety, endeavors to address the above challenge by providing, in at least a portion of the embodiments thereof, an optical fiber coupler array that provides a high-coupling coefficient interface with high accuracy and easy alignment between an optical waveguide device having a plurality of closely spaced waveguides, and a plurality of optical fibers separated by at least a fiber diameter.

U.S. Pat. No. 8,712,199, entitled "CONFIGURABLE PITCH REDUCING OPTICAL FIBER ARRAY", which is expressly incorporated by reference herein, discusses the importance of cross sectional or transverse positioning accuracy (precise cross sectional positioning in some cases) of the individual waveguides. Improved cross sectional positioning accuracy of the waveguides remains desirable.

It is also desirable to improve and/or optimize optical coupling between a set of isolated fibers (e.g., single mode fibers) at one end and individual modes (e.g., of a few-mode or multimode fiber) and/or cores (e.g., of a multicore fiber) at another end. Further coupling improvements can be desirable.

SUMMARY

Example embodiments described herein have innovative features, no single one of which is indispensable or solely responsible for their desirable attributes. Without limiting the scope of the claims, some of the advantageous features will now be summarized.

Example Set I

1. A multifiber array comprising:
    a plurality of optical couplers, individual ones of the plurality of optical couplers configured to optically couple at least one optical fiber waveguide to at least one waveguide of an optical device and comprising:
        an elongated optical element having a first end operable to optically couple with said at least one optical fiber waveguide and a second end operable to optically couple with said optical device, and comprising:
            a common single coupler housing structure; and
            at least one longitudinal waveguide having a capacity for at least one optical mode embedded in said common single housing structure, wherein said common single coupler housing structure has an outer cross sectional shape having a first side and a second side; and
    an alignment carrier comprising one or more flat portions configured to be coupled with said second side of said housing structure such that said alignment carrier couples the plurality of optical couplers.

2. The multifiber array of Example 1, wherein said second side of said housing structure comprises one or more flat portions configured to couple with said one or more flat portions of said alignment carrier.

3. The multifiber array of any of the preceding Examples, wherein said first side of said housing structure comprises one or more curved portions.

4. The multifiber array of any of the preceding Examples, wherein said one or more flat portions of said alignment carrier comprises a v-groove and said second side of said housing structure comprises one or more curved portions.

5. The multifiber array of any of the preceding Examples, wherein said alignment carrier comprise at least two flat portions configured to be coupled with at least two flat portions of one of said second sides of one of said housing structures.

6. The multifiber array of any of the preceding Examples, wherein said alignment carrier extends beyond second side of one of said housing structures in the transverse direction on at least one side.

7. The multifiber array of any of the preceding Examples, wherein said alignment carrier extends beyond said second side of one of said housing structures in the transverse direction on both sides.

8. The multifiber array of any of the preceding Examples, wherein said alignment carrier comprises a carrier plate.

9. The multifiber array of any of the preceding Examples, wherein said first side of said common single coupler housing structure is configured to be positioned in a v-groove of said optical device or a carrier of said optical device such that said first side contacts with walls of the v-groove.

10. The multifiber array of Example 9, wherein said alignment carrier is configured to be disposed over a top surface of the v-groove.

11. The multifiber array of Example 9 or 10, wherein said alignment carrier is configured not to sit on the top surface of the v-groove.

12. The multifiber array of any of Examples 9-11, wherein a position of said v-groove is registered relative to a position of said at least one waveguide of said optical device.

13. The multifiber array of Example 12, wherein the position of said v-groove is registered relative to the position of said at least one waveguide of said optical device such that said at least one waveguide of said optical device is aligned with said at least one longitudinal waveguide of one of said optical couplers with an optical coupling efficiency between 50% and 100%.

14. The multifiber array of Example 13, wherein the optical coupling efficiency is between 80% and 100%.

15. The multifiber array of any of the preceding Examples, wherein the optical coupler is configured to optically couple one end of at least one multicore optical fiber waveguide to at least one waveguide of an optical device.

16. The multifiber array of any of the preceding Examples, wherein said second side of said housing structure is disposed at a distance from the least one longitudinal waveguide of one of said optical couplers such that insertion loss is low from the first end to the second end.

17. The multifiber array of any of the preceding Examples, wherein said second side of said housing structure is disposed at a distance from the least one longitudinal waveguide of one of said optical couplers such that waveguiding properties are preserved from the first end to the second end.

18. The multifiber array of any of the preceding Examples, wherein said at least one longitudinal waveguide of one of said optical couplers comprises cores of a multicore fiber and the common single coupler housing structure comprises cladding.

19. The multifiber array of Example 18, wherein said multicore fiber is flexible.

20. The multifiber array of any of the preceding Examples, wherein at least one of the optical couplers is configured to optically couple a plurality of optical fibers to the optical device,
    the elongated optical element having the first end operable to optically couple with said plurality of optical fibers, an intermediate cross section, and the second end operable to optically couple with said optical device, and comprising:
        a plurality of longitudinal waveguides each positioned at a spacing from one another, each having a capacity for at least one optical mode, each embedded in said common single housing structure proximally to said second end, wherein at least one of said plurality of longitudinal waveguides is a vanishing core waveguide, each said at least one vanishing core waveguide comprising:
- an inner vanishing core, having a first refractive index (N-1), and having a first inner core size (ICS-1) at said first end, an intermediate inner core size (ICS-IN) at said intermediate cross section, and a second inner core size (ICS-2) at said second end; and
- an outer core, longitudinally surrounding said inner core, having a second refractive index (N-2), and having a first outer core size (OCS-1) at said first end, an intermediate outer core size (OCS-IN) at said intermediate cross section, and a second outer core size (OCS-2) at said second end; and an outer cladding, longitudinally surrounding said outer core, having a third refractive index (N-3), a first cladding size at said first end, and a second cladding size at said second end, wherein said common single coupler housing structure comprises a transversely contiguous medium having a fourth refractive index (N-4) surrounding said plurality of longitudinal waveguides, wherein a relative magnitude relationship between said first, second, third and fourth refractive indices (N-1, N-2, N-3, and N-4, respectively), comprises the following magnitude relationship: (N-1>N-2>N-3), wherein a total volume of said medium of said common single coupler housing structure is greater than a total volume of all said vanishing core waveguides inner cores and said outer cores confined within said common single coupler housing structure, and wherein said first inner vanishing core size (ICS-1), said first outer core size (OCS-1), and said spacing between said plurality of longitudinal waveguides, are simultaneously and gradually reduced, in accordance with a reduction profile, between said first end and said second end along said optical element, until said second inner vanishing core size (ICS-2) and said second outer core size (OCS-2) are reached, wherein said intermediate inner vanishing core size (ICS-IN) is selected to be insufficient to guide light therethrough, and said intermediate outer core size (OCS-IN) is selected to be sufficient to guide at least one optical mode, and said second outer core size (OCS-2) is selected to be insufficient to guide light therethrough such that:

- light traveling from said first end to said second end escapes from said inner vanishing core into said corresponding outer core proximally to said intermediate cross section, and escapes from said outer core into a combined waveguide formed by at least two outer cores proximally to said second end, and
- at least one waveguide mode of light traveling from said second end to said first end moves from the combined waveguide formed by at least two outer cores into said outer core proximally to said intermediate cross section, and moves from said outer core into said corresponding inner vanishing core proximally to said first end,
- and wherein said common single coupler housing structure has the outer cross sectional shape comprising the first side comprising one or more curved portions, wherein said second side is disposed at a distance from said plurality of longitudinal waveguides such that waveguiding properties are preserved and not disturbed.

Example Set II

1. An optical coupler array for optical coupling of a plurality of optical fibers to an optical device, comprising:
an elongated optical element having a first end operable to optically couple with said plurality of optical fibers, an intermediate cross section, and a second end operable to optically couple with said optical device, and comprising:
a common single coupler housing structure; a plurality of longitudinal waveguides each positioned at a predetermined spacing from one another, each having a capacity for at least one optical mode of a predetermined mode field profile, each embedded in said common single housing structure proximally to said second end, wherein at least one of said plurality of longitudinal waveguides is a vanishing core waveguide, each said at least one vanishing core waveguide comprising:
an inner vanishing core, having a first refractive index (N-1), and having a first inner core size (ICS-1) at said first end, an intermediate inner core size (ICS-IN) at said intermediate cross section, and a second inner core size (ICS-2) at said second end; an outer core, longitudinally surrounding said inner core, having a second refractive index (N-2), and having a first outer core size (OCS-1) at said first end, an intermediate outer core size (OCS-IN) at said intermediate cross section, and a second outer core size (OCS-2) at said second end, and an outer cladding, longitudinally surrounding said outer core, having a third refractive index (N-3), a first cladding size at said first end, and a second cladding size at said second end; and wherein said common single coupler housing structure comprises a transversely contiguous medium having a fourth refractive index (N-4) surrounding said plurality of longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3), wherein a total volume of said medium of said common single coupler housing structure is greater than a total volume of all said vanishing core waveguides inner cores and said outer cores confined within said common single coupler housing structure, and wherein said first inner vanishing core size (ICS-1), said first outer core size (OCS-1), and said predetermined spacing between said plurality of longitudinal waveguides, are simultaneously and gradually reduced, in accordance with a predetermined reduction profile, between said first end and said second end along said optical element, until said second inner vanishing core size (ICS-2) and said second outer core size (OCS-2) are reached, wherein said intermediate inner vanishing core size (ICS-IN) is selected to be insufficient to guide light therethrough, and said intermediate outer core size (OCS-IN) is selected to be sufficient to guide at least one optical mode, and said second outer core size (OCS-2) is selected to be insufficient to guide light therethrough such that:

light traveling from said first end to said second end escapes from said inner vanishing core into said corresponding outer core proximally to said intermediate cross section, and escapes from said outer core into a combined waveguide formed by at least two neighboring outer cores proximally to said second end, and at least one waveguide mode of light traveling from said second end to said first end moves from the combined waveguide formed by at least two neighboring outer cores into said outer core proximally to said intermediate cross section, and moves from said outer core into said corresponding inner vanishing core proximally to said first end, and wherein said common single coupler housing structure has an outer cross sectional shape comprising a first side comprising one or more curved portions and a second side comprising one or more flat portions, wherein said second side is disposed at a distance from said plurality of longitudinal waveguides such that waveguiding properties are preserved and not disturbed.

2. The optical coupler array of Example 1, wherein said outer cross sectional shape comprises a D-shape.

3. The optical coupler array of Example 1 or 2, further comprising an alignment carrier comprising one or more flat portions configured to be coupled with said second side such that said alignment carrier extends beyond said second side in the transverse direction on at least one side.

4. The optical coupler array of Example 3, wherein said alignment carrier extends beyond said second side in the transverse direction on both sides.

5. The optical coupler array of any of the preceding Examples, wherein said first side is configured to be positioned in a v-groove such that said first side contacts with walls of the v-groove.

6. The optical coupler array of Example 5, wherein said alignment carrier is configured to be disposed over or sit on a top surface of the v-groove.

7. The optical coupler array of any of Examples 3-6, wherein said alignment carrier comprises a carrier plate.

8. An optical coupler for optical coupling of at least one optical fiber waveguide to a at least one waveguide of an optical device, comprising:
   an elongated optical element having a first end operable to optically couple with said at least one optical fiber waveguide and a second end operable to optically couple with said optical device, and comprising:
      a common single coupler housing structure; and
      at least one longitudinal waveguide having a capacity for at least one optical mode, each embedded in said common single housing structure,
      wherein said common single coupler housing structure has an outer cross sectional shape comprising a first side and a second side, and
   an alignment carrier comprising one or more portions complementary with said second side of said housing structure and configured to be coupled with said second side of said housing structure such that said alignment carrier extends beyond said second side in the transverse direction on at least one side.

9. The optical coupler of Example 8, wherein said first side of said housing structure comprises one or more curved portions and said second side of said housing structure comprises one or more flat portions, and wherein said one or more portions of said alignment carrier comprise one or more flat portions.

10. The optical coupler of Example 8 or 9, wherein said outer cross sectional shape comprises a D-shape.

11. The optical coupler of Example 8, wherein said outer cross sectional shape comprises a polygonal shape.

12. The optical coupler of any of Examples 8-11, wherein said alignment carrier extends beyond said second side in the transverse direction on both sides.

13. The optical coupler of any of Examples 8-12, wherein said first side is configured to be positioned in a v-groove such that said first side contacts with walls of the v-groove.

14. The optical coupler of Example 13, wherein said alignment carrier is configured to be disposed over or sit on a top surface of the v-groove.

15. The optical coupler of any of Examples 8-14, wherein said alignment carrier comprises a carrier plate.

16. The optical coupler of any of Examples 13-15, where said v-groove is part of said optical device or a carrier of said optical device and a position of said v-groove is registered relative to a position of said at least one waveguide of said optical device.

17. The optical coupler of Example 16, wherein the position of said v-groove is registered relative to the position of said at least one waveguide of said optical device such that said at least one waveguide of said optical device is aligned with said at least one longitudinal waveguide with an optical coupling efficiency between 50% and 100%.

18. The optical coupler of Example 17, wherein the optical coupling efficiency is between 80% and 100%.

19. The optical coupler of Example 8, wherein the second side of the housing structure comprises one or more curved portions, and the one or more portions of the alignment carrier comprise a v-groove.

20. The optical coupler of Example 8, wherein the second side of the housing structure comprises one or more curved portions, and the one or more portions of the alignment carrier comprise one or more curved portions.

21. The optical coupler of any of Examples 8-20, wherein the first end of said elongated optical element is operable to optically couple with a multicore fiber operable to optically couple with said at least one optical fiber waveguide.

22. The optical coupler of Example 21, wherein the multicore fiber is operable to optically couple with a second optical coupler operable to optically couple with said at least one optical fiber waveguide.

23. The optical coupler of any of Examples 8-22, wherein the first end of said elongated optical element is optically coupled with a multicore fiber operable to optically couple with said at least one optical fiber waveguide.

24. The optical coupler of Example 23, wherein the multicore fiber is optically coupled with a second optical coupler operable to optically couple with said at least one optical fiber waveguide.

Example Set III

1. A multichannel optical coupler array for optical coupling of a plurality of optical fibers to an optical device, comprising:
   an elongated optical element having a first end operable to optically couple with said plurality optical fibers and a second end operable to optically couple with said optical device, and comprising:
      a common single coupler housing structure; a plurality of longitudinal waveguides each positioned at a predetermined spacing from one another, each having a capacity for at least one optical mode of a predetermined mode field profile, each embedded in said common single housing structure proximally to said second end, wherein at, least one of said plural longitudinal waveguides is a vanishing core waveguide, each said at least one vanishing core waveguide comprising:

an inner vanishing core, having a first refractive index (N-1), and having a first inner core size (ICS-I) at said first end, and a second inner core size (ICS-2) at said second end; an outer core, longitudinally surrounding said inner core, having a second refractive index (N-2), and having a first outer core size (OCS-I) at said first end, and a second outer core size (OCS-2) at said second end, and an outer cladding, longitudinally surrounding said outer core, having a third refractive index (N-3), a first cladding size at said first end, and a second cladding size at said second end; and wherein said common single coupler housing structure comprises a transversely contiguous medium having a fourth refractive index (N-4) surrounding said plural longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3), wherein a total volume of said medium or said common single coupler housing structure, is greater than a total volume or all said vanishing core waveguides inner cores and said outer cores confined within said common single coupler housing structure, and wherein said first inner vanishing core size (ICS-I), said first outer core size (OCS-I), and said predetermined spacing between said plural longitudinal waveguides, are simultaneously and gradually reduced, in accordance with a predetermined reduction profile, between said first end and said second end along said optical element, until said second inner vanishing core size (ICS-2) and said second outer core size (OCS-2) are reached, wherein said second inner vanishing core size (ICS-2) is selected to be insufficient to guide light therethrough, and said second outer core size (OCS-2) is selected to be sufficient to guide at least one optical mode, such that:

light traveling from said first end to said second end escapes from said inner vanishing core into said corresponding outer core proximally to said second end, and light traveling from said second end to said first end moves from said outer core into said corresponding inner vanishing core proximally to said first end, and wherein said common single coupler housing structure proximally to said first end has one of the following cross sectional configurations: a ring surrounding said plurality of longitudinal waveguides, a transversely contiguous structure with plurality of holes, wherein at least one said hole contains at least one of said plurality of longitudinal waveguides.

2. A multichannel optical coupler array, comprising:

an elongated optical element having a first end and a second end, wherein said first and second ends are operable to optically couple with a plurality of optical fibers, an optical device, or combinations thereof, the optical element further comprising:

a coupler housing structure; and a plurality of longitudinal waveguides arranged with respect to one another, each having a capacity for at least one optical mode, the plurality of longitudinal waveguides embedded in said housing structure, wherein said plurality of longitudinal waveguides comprises at least one vanishing core waveguide, each said at least one vanishing core waveguide, said at least one vanishing core waveguide comprising:

an inner vanishing core, having a first refractive index (N-1), and having an inner core size;

an outer core, longitudinally surrounding said inner core, having a second refractive index (N-2), and having an outer core size; and an outer cladding, longitudinally surrounding said outer core, having a third refractive index (N-3), and having a cladding size;

wherein said coupler housing structure comprises a medium having a fourth refractive index (N-4) surrounding said plurality of longitudinal waveguides, wherein N-1>N-2>N-3, wherein said inner core size, said outer core size, and spacing between said plurality of longitudinal waveguides reduces along said optical element from said first end to said second end such that at said second end, said inner core size is insufficient to guide light therethrough, and said outer core size is sufficient to guide at least one optical mode, and wherein said coupler housing structure at a proximity to the first end has one of the following cross sectional configurations: a ring surrounding said plurality of longitudinal waveguides with a gap between said ring and said plurality of longitudinal waveguides, or a structure with a plurality of holes, at least one hole containing at least one of said plurality of longitudinal waveguides.

3. The optical coupler array of Example 2, wherein the coupler housing structure comprises a common single coupler housing structure.

4. The optical coupler array of any of the preceding Examples, wherein proximate the first end, one of the plurality of longitudinal waveguides extends outside the coupler housing structure.

5. The optical coupler array of any of the preceding Examples, wherein proximate the first end, one of the plurality of longitudinal waveguides is disposed within the coupler housing structure and does not extends beyond the coupler housing structure.

6. The optical coupler array of any of the preceding Examples, wherein proximate the first end, one of the plurality of longitudinal waveguides is disposed at an outer cross sectional boundary region of the coupler housing structure and does not extends beyond the coupler housing structure.

7. The optical coupler array of any of Examples 2-6, wherein the medium is a transversely contiguous medium.

8. The optical coupler array of any of Examples 2-7, wherein a total volume of said medium of said coupler housing structure is greater than a total volume of all the inner and outer cores of the at least one vanishing core waveguide confined within said coupler housing structure.

9. The optical coupler array of any of Examples 2-8, wherein said inner core size, said outer core size, and spacing between said plurality of longitudinal waveguides simultaneously and gradually reduces from said first end to said second end.

10. The optical coupler array of any of the preceding Examples, wherein proximate the second end, the coupler array comprises substantially no gap between the coupler housing structure and the plurality of longitudinal waveguides.

11. The optical coupler array of any of the preceding Examples, wherein the one of the cross sectional configurations is the ring surrounding said plurality of longitudinal waveguides.

12. The optical coupler array of Example 11, wherein the plurality of longitudinal waveguides are in a hexagonal arrangement.

13. The optical coupler array of any of Examples 11-12, wherein the ring has a circular inner cross section.

14. The optical coupler array of any of Examples 11-12, wherein the ring has a non-circular inner cross section.

15. The optical coupler array of Example 14, wherein the inner cross section is hexagonal.

16. The optical coupler array of Example 14, wherein the inner cross section is D-shaped.

17. The optical coupler array of any of Examples 11-16, wherein the ring has a circular outer cross section.

18. The optical coupler array of any of Examples 11-16, wherein the ring has a non-circular outer cross section.

19. The optical coupler array of Example 18, wherein the outer cross section is hexagonal.

20. The optical coupler array of Example 18, wherein the outer cross section is D-shaped.

21. The optical coupler array of any of Examples 1-10, wherein the one of the cross sectional configurations is the structure with the plurality of holes.

22. The optical coupler array of Example 21, wherein the holes are in a hexagonal arrangement.

23. The optical coupler array of Example 21, wherein the holes are in a rectangular arrangement.

24. The optical coupler array of Example 21, wherein said plurality of holes is defined in an XY array.

25. The optical coupler array of any of Examples 21-24, wherein at least one hole comprises non-waveguide material.

26. The optical coupler array of any of Examples 21-25, wherein at least one hole has a circular cross section.

27. The optical coupler array of any of Examples 21-26, wherein at least one hole has a non-circular cross section.

28. The optical coupler array of Example 27, wherein the non-circular cross section is D-shaped.

29. The optical coupler array of any of Examples 21-28, wherein at least one of the holes has a different dimension than another one of the holes.

30. The optical coupler array of any of Examples 21-29, wherein at least one of the holes has a different shape than another one of the holes.

31. The optical coupler array of any of Examples 21-30, wherein the holes are isolated.

32. The optical coupler array of any of Examples 21-30, wherein some of the holes are connected.

33. The optical coupler array of any of the preceding Examples, wherein the at least one vanishing core waveguide comprises a single mode fiber.

34. The optical coupler array of any of the preceding Examples, wherein the at least one vanishing core waveguide comprises a multi-mode fiber.

35. The optical coupler array of any of the preceding Examples, wherein the at least one vanishing core waveguide comprises a polarization maintaining fiber.

36. A multichannel optical coupler array, comprising:
an elongated optical element having a first end and a second end, wherein said first and second ends are operable to optically couple with a plurality of optical fibers, an optical device, or combinations thereof, the optical element further comprising:
a coupler housing structure; and
a plurality of longitudinal waveguides arranged with respect to one another, each having a capacity for at least one optical mode, the plurality of longitudinal waveguides embedded in said housing structure, wherein said plurality of longitudinal waveguides comprises at least one vanishing core waveguide, each said at least one vanishing core waveguide, said at least one vanishing core waveguide comprising:
an inner vanishing core having a first refractive index (N-1), and having an inner core size;
an outer core, longitudinally surrounding said inner core, having a second refractive index (N-2) and having an outer core size; and
an outer cladding, longitudinally surrounding said outer core, having a third refractive index (N-3), and having a cladding size;
wherein said coupler housing structure comprises a medium having a fourth refractive index (N-4) surrounding said plurality of longitudinal waveguides, wherein N-1>N-2>N-3,
wherein said inner core size, said outer core size, and spacing between said plurality of longitudinal waveguides reduces along said elongated optical element from said first end to said second end such that at said second end, said inner core size is insufficient to guide light therethrough, and said outer core size is sufficient to guide at least one optical mode, and
wherein said coupler housing structure at a proximity to the first end has a cross sectional configuration comprising at least one hole, the at least one hole containing at least one of said plurality of longitudinal waveguides, wherein the hole is larger than the at least one of said plurality of longitudinal waveguides such that the at least one of said plurality of longitudinal waveguides is movable with respect to the coupler housing structure in a lateral direction.

37. The optical coupler array of Example 36, wherein the coupler housing structure comprises a common single coupler housing structure.

38. The optical coupler array of any of Examples 36-37, wherein proximate the first end, one of the plurality of longitudinal waveguides extends outside the coupler housing structure.

39. The optical coupler array of any of Examples 36-38, wherein proximate the first end, one of the plurality of longitudinal waveguides is disposed within the coupler housing structure.

40. The optical coupler array of any of Examples 36-39, wherein the medium is a transversely contiguous medium.

41. The optical coupler array of any of Examples 36-40, wherein a total volume of said medium of said coupler housing structure is greater than a total volume of all the inner and outer cores of the at least one vanishing core waveguide confined within said coupler housing structure.

42. The optical coupler array of any of Examples 36-41, wherein said inner core size, said outer core size, and spacing between said plurality of longitudinal waveguides simultaneously and gradually reduces from said first end to said second end.

43. The optical coupler array of any of Examples 36-42, wherein proximate the second end, the coupler array comprises substantially no gap between the coupler housing structure and the plurality of longitudinal waveguides.

44. The optical coupler array of any Examples 36-43, wherein the at least one hole comprises a single hole and the at least one of said plurality of longitudinal waveguides comprises a plurality of longitudinal waveguides.

45. The optical coupler array of Example 44, wherein the plurality of longitudinal waveguides are in a hexagonal arrangement.

46. The optical coupler array of any of Examples 44-45, wherein the single hole as a circular cross section.

47. The optical coupler array of any of Examples 44-45, wherein the single hole has a non-circular cross section.

48. The optical coupler array of Example 47, wherein the non-circular cross section is hexagonal.

49. The optical coupler array of Example 47, wherein the non-circular cross section is D-shaped.

50. The optical coupler array of any of Examples 44-49, wherein the coupler housing structure has a circular outer cross section.

51. The optical coupler array of any of Examples 44-49, wherein the coupler housing structure has a non-circular outer cross section.

52. The optical coupler array of Example 51, wherein the outer cross section is hexagonal.

53. The optical coupler array of Example 51, wherein the outer cross section is D-shaped.

54. The optical coupler array of any of Examples 36-43, wherein the at least one hole comprises a plurality of holes.

55. The optical coupler array of Example 54, wherein the plurality of holes are in a hexagonal arrangement.

56. The optical coupler array of Example 54, wherein the plurality of holes are in a rectangular arrangement.

57. The optical coupler array of Example 54, wherein said plurality of holes is defined by an XY array.

58. The optical coupler array of any of Examples 54-57, wherein one or more of the plurality of holes comprises non-waveguide material.

59. The optical coupler array of any of Examples 54-58, wherein one or more of the plurality of holes has a circular cross section.

60. The optical coupler array of any of Examples 54-59, wherein one or more of the plurality of holes has a non-circular cross section.

61. The optical coupler array of Example 60, wherein the non-circular cross section is D-shaped.

62. The optical coupler array of any of Examples 54-61, wherein one or more of the plurality of holes has a different dimension than another one of the holes.

63. The optical coupler array of any of Examples 54-62, wherein one or more of the plurality of holes has a different shape than another one of the holes.

64. The optical coupler array of any of Examples 54-63, wherein the holes are isolated.

65. The optical coupler array of any of Examples 54-63, wherein some of the holes are connected.

66. The optical coupler array of any of Examples 54-65, wherein the at least one vanishing core waveguide comprises a single mode fiber.

67. The optical coupler array of any of Examples 54-66, wherein the at least one vanishing core waveguide comprises a multi-mode fiber.

68. The optical coupler array of any of Examples 54-67, wherein the at least one vanishing core waveguide comprises a polarization maintaining fiber.

Example Set IV

1. A multichannel optical coupler array for optical coupling a plurality of optical fibers to an optical device, comprising:

an elongated optical element having a first end operable to optically couple with said plurality optical fibers and a second end operable to optically couple with said optical device, and comprising:

a common single coupler housing structure; a plurality of longitudinal waveguides each positioned at a predetermined spacing from one another, each having a capacity for at least one optical mode of a predetermined mode field profile, each embedded in said common single housing structure, wherein at, least one of said plural longitudinal waveguides is a vanishing core waveguide, each said at least one vanishing core waveguide comprising:

an inner vanishing core, having a first refractive index (N-1), and having a first inner core size (ICS-I) at said first end, and a second inner core size (ICS-2) at said second end; an outer core, longitudinally surrounding said inner core, having a second refractive index (N-2), and having a first outer core size (OCS-I) at said first end, and a second outer core size (OCS-2) at said second end, and an outer cladding, longitudinally surrounding said outer core, having a third refractive index (N-3), a first cladding size at said first end, and a second cladding size at said second end; and wherein said common single coupler housing structure comprises a transversely contiguous medium having a fourth refractive index (N-4) surrounding said plural longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3), wherein a total volume of said medium or said common single coupler housing structure, is greater than a total volume or all said vanishing core waveguides inner cores and said outer cores confined within said common single coupler housing structure, and wherein said first inner vanishing core size (ICS-I), said first outer core size (OCS-I), and said predetermined spacing between said plural longitudinal waveguides, are simultaneously and gradually reduced, in accordance with a predetermined reduction profile, between said first end and said second end along said optical element, until said second inner vanishing core size (ICS-2) and said second outer core size (OCS-2) are reached, wherein said second inner vanishing core size (ICS-2) is selected to be insufficient to guide light therethrough, and said second outer core size (OCS-2) is selected to be sufficient to guide at least one optical mode, such that:

light traveling from said first end to said second end escapes from said inner vanishing core into said corresponding outer core proximally to said second end, and light traveling from said second end to said first end moves from said outer core into said corresponding inner vanishing core proximally to said first end, and wherein said common single coupler housing structure at a close proximity to the first end has one of the following cross sectional configurations: a ring surrounding said plurality of longitudinal waveguides, a contiguous structure with plurality of holes, at least one hole containing at least one of said plurality of longitudinal waveguides.

2. A multichannel optical coupler array for optical coupling a plurality of optical fibers to an optical device, comprising:

an elongated optical element having a first end operable to optically couple with said plurality optical fibers and a second end operable to optically couple with said optical device, and comprising:
a coupler housing structure; a plurality of longitudinal waveguides each positioned at a spacing from one another, each having a capacity for at least one optical mode, each embedded in said housing structure, wherein at, least one of said plural longitudinal waveguides is a vanishing core waveguide, each said at least one vanishing core waveguide comprising:
an inner vanishing core, having a first refractive index (N-1), and having a first inner core size (ICS-I) at said first end, and a second inner core size (ICS-2) at said second end; an outer core, longitudinally surrounding said inner core, having a second refractive index (N-2), and having a first outer core size (OCS-I) at said first end, and a second outer core size (OCS-2) at said second end, and an outer cladding, longitudinally surrounding said outer core, having a third refractive index (N-3), a first cladding size at said first end, and a second cladding size at said second end; and wherein said coupler housing structure comprises a medium having a fourth refractive index (N-4) surrounding said plural longitudinal waveguides, wherein a relative magnitude relationship between said first, second, third and fourth refractive indices (N-1, N-2, N-3, and N-4, respectively), comprises the following magnitude relationship: (N-1>N-2>N-3),
wherein said first inner vanishing core size (ICS-I), said first outer core size (OCS-I), and said spacing between said plural longitudinal waveguides, reduces between said first end and said second end along said optical element, until said second inner vanishing core size (ICS-2) and said second outer core size (OCS-2) are reached, wherein said second inner vanishing core size (ICS-2) is insufficient to guide light therethrough, and said second outer core size (OCS-2) is sufficient to guide at least one optical mode, such that:
light traveling from said first end to said second end escapes from said inner vanishing core into said corresponding outer core proximally to said second end, and light traveling from said second end to said first end moves from said outer core into said corresponding inner vanishing core proximally to said first end,
and wherein said coupler housing structure at a close proximity to the first end has one of the following cross sectional configurations: a ring surrounding said plurality of longitudinal waveguides, or a structure with plurality of holes, at least one hole containing at least one of said plurality of longitudinal waveguides.

Example Set V

1. A multichannel optical coupler array for optical coupling of a plurality of optical fibers to an optical device, comprising:
an elongated optical element having a first end operable to optically couple with said plurality optical fibers, an intermediate cross section, and a second end operable to optically couple with said optical device, and comprising:
a common single coupler housing structure; a plurality of longitudinal waveguides each positioned at a predetermined spacing from one another, each having a capacity for at least one optical mode of a predetermined mode field profile, each embedded in said common single housing structure proximally to said second end, wherein at least one of said plural longitudinal waveguides is a vanishing core waveguide, each said at least one vanishing core waveguide comprising:
an inner vanishing core, having a first refractive index (N-1), and having a first inner core size (ICS-I) at said first end, an intermediate inner core size (ICS-IN) at said intermediate cross section, and a second inner core size (ICS-2) at said second end; an outer core, longitudinally surrounding said inner core, having a second refractive index (N-2), and having a first outer core size (OCS-I) at said first end, an intermediate outer core size (OCS-IN) at said intermediate cross section, and a second outer core size (OCS-2) at said second end, and an outer cladding, longitudinally surrounding said outer core, having a third refractive index (N-3), a first cladding size at said first end, and a second cladding size at said second end; and wherein said common single coupler housing structure comprises a transversely contiguous medium having a fourth refractive index (N-4) surrounding said plural longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3), wherein a total volume of said medium or said common single coupler housing structure, is greater than a total volume or all said vanishing core waveguides inner cores and said outer cores confined within said common single coupler housing structure, and wherein said first inner vanishing core size (ICS-I), said first outer core size (OCS-I), and said predetermined spacing between said plural longitudinal waveguides, are simultaneously and gradually reduced, in accordance with a predetermined reduction profile, between said first end and said second end along said optical element, until said second inner vanishing core size (ICS-2) and said second outer core size (OCS-2) are reached, wherein said intermediate inner vanishing core size (ICS-IN) is selected to be insufficient to guide light therethrough, and said intermediate outer core size (OCS-IN) is selected to be sufficient to guide at least one optical mode, and said second outer core size (OCS-2) is selected to be insufficient to guide light therethrough such that:
light traveling from said first end to said second end escapes from said inner vanishing core into said corresponding outer core proximally to said intermediate cross section, and escapes from said outer core into a combined waveguide formed by at least two neighboring outer cores proximally to said second end, and
at least one waveguide mode of light traveling from said second end to said first end moves from the combined waveguide formed by at least two neighboring outer cores into said outer core proximally to said intermediate cross section, and moves from said outer core into said corresponding inner vanishing core proximally to said first end,
and wherein said common single coupler housing structure proximally to said first end has a cross sectional configuration comprising a transversely contiguous structure with at least one hole, wherein the at least one hole contains at least one of said plurality of longitudinal waveguides creating a gap between the coupler housing structure and the at least one of said plurality of longitudinal waveguides.

2. A multichannel optical coupler array comprising:
an elongated optical element having a first end, an intermediate cross section, and a second end, and comprising:
a coupler housing structure; a plurality of longitudinal waveguides each positioned at a spacing from one another, each having a capacity for at least one optical mode, each disposed in said housing structure, wherein at least one of said plural longitudinal waveguides is a vanishing core waveguide, each said at least one vanishing core waveguide comprising:
an inner vanishing core, having a first refractive index (N-1), and having a first inner core size (ICS-I) at said first end, an intermediate inner core size (ICS-IN) at said intermediate cross section, and a second inner core size (ICS-2) at said second end; an outer core, longitudinally surrounding said inner core, having a second refractive index (N-2), and having a first outer core size (OCS-I) at said first end, an intermediate outer core size (OCS-IN) at said intermediate cross section, and a second outer core size (OCS-2) at said second end, and an outer cladding, longitudinally surrounding said outer core, having a third refractive index (N-3), a first cladding size at said first end, and a second cladding size at said second end; and wherein said coupler housing structure comprises a medium having a fourth refractive index (N-4) surrounding said plural longitudinal waveguides, wherein a relative magnitude relationship between said first, second, third and fourth refractive indices (N-1, N-2, N-3, and N-4, respectively), comprises the following magnitude relationship: (N-1>N-2>N-3), and wherein said first inner vanishing core size (ICS-I), said first outer core size (OCS-I), and said spacing between said plural longitudinal waveguides are reduced between said first end and said second end along said optical element, wherein said intermediate inner vanishing core size (ICS-IN) is insufficient to guide light therethrough, and said intermediate outer core size (OCS-IN) is sufficient to guide at least one optical mode, and said second outer core size (OCS-2) is insufficient to guide light therethrough such that:
light traveling from said first end to said second end escapes from said inner vanishing core into said corresponding outer core proximally to said intermediate cross section, and escapes from said outer core into a combined waveguide formed by at least two neighboring outer cores proximally to said second end, and
at least one waveguide mode of light traveling from said second end to said first end moves from the combined waveguide formed by at least two neighboring outer cores into said outer core proximally to said intermediate cross section, and moves from said outer core into corresponding inner vanishing core proximally to said first end.

BRIEF DESCRIPTION OF THE DRAWINGS

In the drawings, wherein like reference characters denote corresponding or similar elements throughout the various figures:

FIG. 1C is a schematic diagram of a side view of a third example embodiment of an optical fiber coupler array, which comprises a plurality of VC waveguides, and a plurality of Non-VC waveguides, disposed longitudinally and asymmetrically to one another, and where at least a portion of the plural Non-VC waveguides are of different types and/or different characteristics;

FIG. 1D is a schematic diagram of a side view of a fourth example embodiment of an optical fiber coupler array, configured for fan-in and fan-out connectivity and comprising a pair of optical fiber coupler components with a multi-core optical fiber element connected between the second (smaller sized) ends of the two optical fiber coupler components;

FIG. 2C is a schematic diagram of a side view of a seventh example embodiment of an optical fiber coupler array, which comprises a plurality of longitudinally proximal VC waveguides at least partially embedded in a single common housing structure, wherein each plural VC waveguide is spliced, at a particular third splice location, to a corresponding elongated optical device (such as an optical fiber), at least a portion of which extends outside the single common housing structure by a predetermined length, and wherein each particular third splice location is disposed outside the single common housing structure;

FIG. 2D is a schematic diagram of a side view of an alternative embodiment of an optical fiber coupler array, comprising a plurality of longitudinally proximal VC waveguides at least partially embedded in a single common housing structure, that is configured at its second end, to increase, improve, and/or optimize optical coupling to a free-space-based optical device, wherein a free-space-based device may include (1) a standalone device, e.g., a lens followed by other optical components as shown in FIG. 2D, or (2) a device, which is fusion spliceable to the second coupler's end, e.g. a coreless glass element, which can serve as an end cup for power density redaction at the glass-air interface, or as a Talbot mirror for phase synchronization of coupler's waveguides in a Talbot cavity geometry;

DETAILED DESCRIPTION

Packaging of photonic integrated circuits (PICs) uses optical and electronic interfaces as well thermomechanical management. One primary challenge in PIC packaging, both technically and financially, includes fiber coupling from a fiber optic infrastructure to an individual optical waveguide, or multiple waveguides, of a particular PIC. Various embodiments described herein relate to optical coupler arrays configured to couple light from one or more optical fibers to waveguides at the edge of a PIC. In some instances, the optical coupler array can be configured to passively align with one or more waveguides of the PIC.

Figure 8:
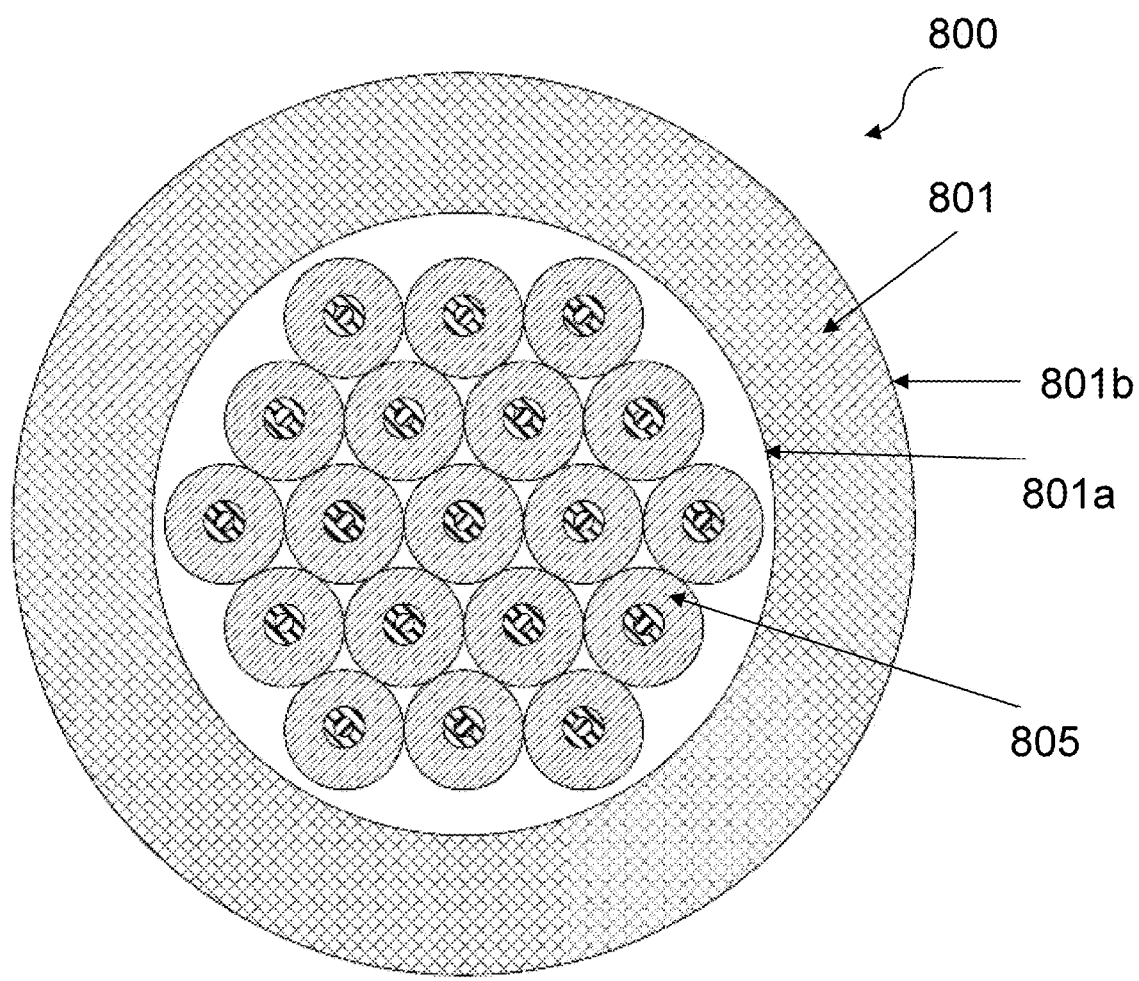
FIG. 8 is a schematic diagram of a cross-sectional view of an example configuration of the housing structure at a proximity to a first end of the optical coupler array. The cross-sectional view is orthogonal to the longitudinal direction or length of the optical coupler array.

In some instances, improved cross sectional (or transverse) positioning of waveguides is desirable in many multichannel optical coupler arrays. In the present disclosure, some embodiments of the housing structure (e.g., a common single coupler housing structure in some cases) can allow for self-aligning waveguide arrangement at a close proximity to a first end (e.g., hexagonal close packed arrangement in a housing structure having circular (as shown in FIG. 8) or hexagonal inner cross section) and improved (precise or near precise in some cases) cross sectional positioning of the waveguides at a second end.

Packaging of photonic integrated circuits (PICs) with low vertical profile (perpendicular to the PIC plane) can also be desirable for a variety of applications, including optical communications and sensing. While this is easily achievable for edge couplers, surface couplers may require substantial vertical length.

Accordingly, it may be advantageous to provide various embodiments of a pitch reducing optical fiber array (PROFA)-based flexible optical fiber array component that may be configured and possibly optimized to comprise a structure that maintains all channels discretely with sufficiently low crosstalk, while providing enough flexibility to accommodate low profile packaging. It may further be desirable to provide a PROFA-based flexible optical fiber array component comprising a flexible portion to provide mechanical isolation of a "PROFA-PIC interface" from the rest of the PROFA, resulting in increased stability with respect to environmental fluctuations, including temperature variations and mechanical shock and vibration. It may be additionally desirable to provide a PROFA-based flexible optical fiber array comprising multiple coupling arrays, each having multiple optical channels, combined together to form an optical multi-port input/output (IO) interface.

Certain embodiments are directed to an optical fiber coupler array capable of providing a low-loss, high-coupling coefficient interface with high accuracy and easy alignment between a plurality of optical fibers (or other optical devices) with a first channel-to-channel spacing, and an optical device having a plurality of waveguide interfaces with a second, smaller channel-to-channel spacing. Advantageously, in various embodiments, each of a larger size end and a smaller size end of the optical fiber coupler array is configurable to have a correspondingly different (i.e., larger vs. smaller) channel-to-channel spacing, where the respective channel-to-channel spacing at each of the optical coupler array's larger and smaller ends may be readily matched to a corresponding respective first channel-to-channel spacing of the plural optical fibers at the larger optical coupler array end, and to a second channel-to-channel spacing of the optical device plural waveguide interfaces at the smaller optical coupler array end.

In various embodiments thereof, the optical coupler array includes a plurality of waveguides (at least one of which may optionally be polarization maintaining), that comprises at least one gradually reduced "vanishing core fiber", at least in part embedded within a common housing structure. Alternatively, in various additional embodiments thereof, the coupler array may be configured for utilization with at least one of an optical fiber amplifier and an optical fiber laser.

Each of the various embodiments of the optical coupler array advantageously comprises at least one "vanishing core" (VC) fiber waveguide, described, for example, below in connection with a VC waveguide 30A of the optical coupler array 10A of FIG. 1A.

It should also be noted that the term "optical device" as generally used herein, applies to virtually any single channel or multi-channel optical device, or to any type of optical fiber, including, but not being limited to, standard/conventional optical fibers. For example, optical devices with which the coupler array may advantageously couple may include, but are not limited to, one or more of the following:

a free-space-based optical device,
an optical circuit having at least one input/output edge coupling port,
an optical circuit having at least one optical port comprising vertical coupling elements,
a multi-mode (MM) optical fiber,
a double-clad optical fiber,
a multi-core (MC) optical fiber,
a large mode area (LMA) fiber,
a double-clad multi-core optical fiber,
a standard/conventional optical fiber,
a custom optical fiber, and/or
an additional optical coupler array.

In addition, while the term "fusion splice" is utilized in the various descriptions of the example embodiments of the coupler array provided below, in reference to interconnections between various optical coupler array components, and connections between various optical coupler array components and optical device(s), it should be noted, that any other form of waveguide or other coupler array component connectivity technique or methodology may be readily selected and utilized as a matter of design choice or necessity, without departing from the spirit of the invention, including but not limited to mechanical connections.

Figure 1A:
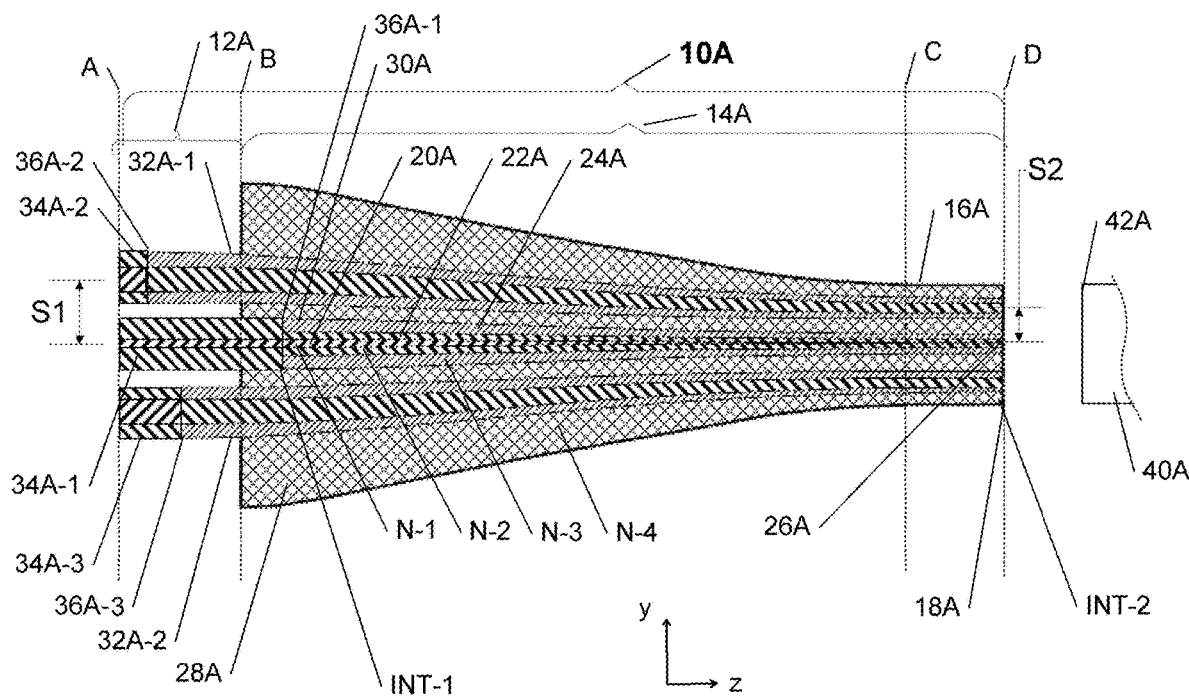
FIG. 1A is a schematic diagram of a side view of a first example embodiment of an optical fiber coupler array, which comprises at least one vanishing core waveguide (VC waveguide), illustrated therein by way of example as a single VC waveguide, and at least one Non-VC waveguide, illustrated therein by way of example as a plurality of Non-VC waveguides, disposed symmetrically proximally to the example single VC waveguide.

Referring now to FIG. 1A, a first example embodiment of an optical fiber coupler array is shown as an optical coupler array 10A, which comprises a common housing structure 14A (described below), at least one VC waveguide, shown in FIG. 1A by way of example, as a single VC waveguide 30A, and at least one Non-VC waveguide, shown in FIG. 1A by way of example, as a pair of Non-VC waveguides 32A-1, 32A-2, each positioned symmetrically proximally to one of the sides of the example single VC waveguide 30A, wherein the section of the VC waveguide 30A, located between positions B and D of FIG. 1A is embedded in the common housing structure 14A.

Before describing the coupler array 10A and its components in greater detail, it would be useful to provide a detailed overview of the VC waveguide 30A, the example embodiments and alternative embodiments of which, are advantageously utilized in each of the various embodiments of the coupler arrays of FIGS. 1A to 5.

The VC waveguide 30A has a larger end (proximal to position B shown in FIG. 1A), and a tapered, smaller end (proximal to position C shown in FIG. 1A), and comprises an inner core 20A (comprising a material with an effective refractive index of N-1), an outer core 22A (comprising a material with an effective refractive index of N-2, smaller than N-1), and a cladding 24A (comprising a material with an effective refractive index of N-3, smaller than N-2).

Advantageously, the outer core 22A serves as the effective cladding at the VC waveguide 30A large end at which the VC waveguide 30A supports "M1" spatial propagating modes within the inner core 20A, where M1 is larger than 0. The indices of refraction N-1 and N-2, are preferably chosen so that the numerical aperture (NA) at the VC waveguide 30A large end matches the NA of an optical device (e.g. an optical fiber) to which it is connected (such as an optical device 34A-1, for example, comprising a standard/conventional optical fiber connected to the VC waveguide 30A at a connection position 36A-1 (e.g., by a fusion splice, a mechanical connection, or by other fiber connection designs), while the dimensions of the inner and outer cores (20A, 22A), are preferably chosen so that the connected optical device (e.g., the optical device 34A-1), has substantially the same mode field dimensions (MFD). Here and below we use mode field dimensions instead of commonly used mode field diameter (also MFD) due to the case that the cross section of the VC or Non-VC waveguides may not be circular, resulting in a non-circular mode profile. Thus, the mode field dimensions include both the mode size and the mode shape and equal to the mode field diameter in the case of a circularly symmetrical mode.

During fabrication of the coupler array 10A from an appropriately configured preform (comprising the VC waveguide 30A preform having the corresponding inner and outer cores 20A, 22A, and cladding 24A), as the coupler array 10A preform is tapered in accordance with at least one predetermined reduction profile, the inner core 20A becomes too small to support all M1 modes. The number of spatial modes, supported by the inner core at the second (tapered) end is M2, where M2<M1. In the case of a single mode waveguide, where M1=1 (corresponding to 2 polarization modes), M2=0, meaning that inner core is too small to support light propagation. The VC waveguide 30A then acts as if comprised a fiber with a single core of an effective refractive index close to N-2, surrounded by a cladding of lower index N-3.

During fabrication of the coupler array 10A, a channel-to-channel spacing S-1 at the coupler array 10A larger end (at position B, FIG. 1A), decreases in value to a channel-to-channel spacing S-2 at the coupler array 10A smaller end (at position C, FIG. 1A), in proportion to a draw ratio selected for fabrication, while the MFD value (or the inversed NA value of the VC waveguide 30A) can be either reduced, increased or preserved depending on a selected differences in refractive indices, (N-1–N-2) and (N-2–N-3), which depends upon the desired application for the optical coupler array 10A, as described below.

The capability of independently controlling the channel-to-channel spacing and the MFD values at each end of the optical coupler array is a highly advantageous feature of certain embodiments. Additionally, the capability to match MFD and NA values through a corresponding selection of the sizes and shapes of inner 20A and outer 22A cores and values of N-1, N-2, and N-3, makes it possible to utilize the optical coupler array to couple to various waveguides without the need to use a lens.

In various embodiments thereof, the property of the VC waveguide permitting light to continue to propagate through the waveguide core along the length thereof when its diameter is significantly reduced, advantageously, reduces optical loss from interfacial imperfection or contamination, and allows the use of a wide range of materials for a medium 28A of the common housing structure 14A (described below), including, but not limited to:

(a) non-optical materials (since the light is concentrated inside the waveguide core),
(b) absorbing or scattering materials or materials with refractive index larger than the refractive index of standard/conventional fibers for reducing or increasing the crosstalk between the channels, and
(c) pure-silica (e.g., the same material as is used in most standard/conventional fiber claddings, to facilitate splicing to multi-core, double-clad, or multi-mode fiber.

Preferably, in accordance with certain embodiments, the desired relative values of NA-1 and NA-2 (each at a corresponding end of the coupler array 10A, for example, NA-1 corresponding to the coupler array 10A large end, and NA-2 corresponding to the coupler array 10A small end), and, optionally, the desired value of each of NA-1 and NA-2), may be determined by selecting the values of the refractive indices N1, N2, and N3 of the coupler array 10A, and configuring them in accordance with at least one of the following relationships, selected based on the desired relative numerical aperture magnitudes at each end of the coupler array 10A:

| Desired NA-1/NA-2 Relative Magnitude | Corresponding Relationship bet. N1, N2, N3 |
|---|---|
| NA-1 (lrg. end) > NA-2 (sm. end) | (N1 − N2 > N2 − N3) |
| NA-1 (lrg. end) = NA-2 (sm. end) | (N1 − N2 = N2 − N3) |
| NA-1 (lrg. end) < NA-2 (sm. end) | (N1 − N2 < N2 − N3) |

Commonly the NA of any type of fiber is determined by the following expression:

$$NA=\sqrt{n_{core}^2-n_{clad}^2},$$

where $n_{core}$ and $n_{clad}$ are the refractive indices of fiber core and cladding respectively.

It should be noted that when the above expression is used, the connection between the NA and the acceptance angle of the fiber is only an approximation. In particular, fiber manufacturers often quote "NA" for single-mode (SM) fibers based on the above expression, even though the acceptance angle for a single-mode fiber is quite different and cannot be determined from the indices of refraction alone.

In accordance with certain embodiments, as used herein, the various NA values are preferably determined utilizing effective indices of refraction for both $n_{core}$ and $n_{cladding}$, because the effective indices determine the light propagation and are more meaningful in the case of structured waveguides utilized in various embodiments. Also, a transverse refractive index profile inside a waveguide may not be flat, but rather varying around the value N1, N2, N3, or N4. In addition, the transition between regions having refractive indices N1, N2, N3, and N4 may not be as sharp as a step function due to dopant diffusion or some other intentional or non-intentional factors, and may be a smooth function, connecting the values of N1, N2, N3, and N4. Coupling design or optimization may involve changing both the values of N1, N2, N3, and N4 and the sizes and shapes of the regions having respective indices.

Returning now to FIG. 1A, the common coupling structure 14A, comprises the medium 28A, in which the section of the VC waveguide 30A located between positions B and D of FIG. 1A is embedded, and which may include, but is not limited to, at least one of the following materials:
 a material, having properties prohibiting propagation of light therethrough,
 a material having light-absorbing optical properties,
 a material having light scattering optical properties,
 a material having optical properties selected such that said fourth refractive index (N-4) is greater than said third refractive index (N-3), and/or
 a material having optical properties selected such that said fourth refractive index (N-4) is substantially equal to said third refractive index (N-3).

At the optical coupler array 10A large end (proximally to position B in FIG. 1A), the VC waveguide 30A is spliced, at a particular splice location 36A-1 (shown by way of example as positioned inside the common housing structure 14A), to a corresponding respective elongated optical device 34A-1 (for example, such as an optical fiber), at least a portion of which extends outside the common housing structure 14A by a predetermined length 12A, while the Non-VC waveguides 32A-1, 32A-2 are spliced, at particular splice locations 36A-2, 36A-3, respectively (disposed outside of the common housing structure 14A), to corresponding respective elongated optical devices 34A-2, 34A-3 (such as optical fibers), and extending outside the common housing structure 14A by a predetermined length 12A.

Optionally, the coupler array 10A may also include a substantially uniform diameter tip 16A (shown between positions C and D in FIG. 1A) for coupling, at an array interface 18A with the interface 42A of an optical waveguide device 40A. The uniform diameter tip 16A may be useful in certain interface applications, such as for example shown in FIGS. 1D, 4 and 5. Alternatively, the coupler array 10A may be fabricated without the tip 16A (or have the tip 16A removed after fabrication), such that coupling with the optical device interface 42A, occurs at a coupler array 10A interface at position C of FIG. 1A.

In an alternative embodiment, if the optical device 40A comprises a double-clad fiber, when the small end of the coupler array 10A is coupled (for example, fusion spliced) to the optical device interface 42A, at least a portion of the common housing structure 14A proximal to the splice position (such as at least a portion of the tip 16A), may be coated with a low index medium (not shown), extending over the splice position and up to the double-clad fiber optical device 40A outer cladding (and optionally extending over a portion of the double-clad fiber optical device 40A outer cladding that is proximal to the splice position).

Figure 1B:
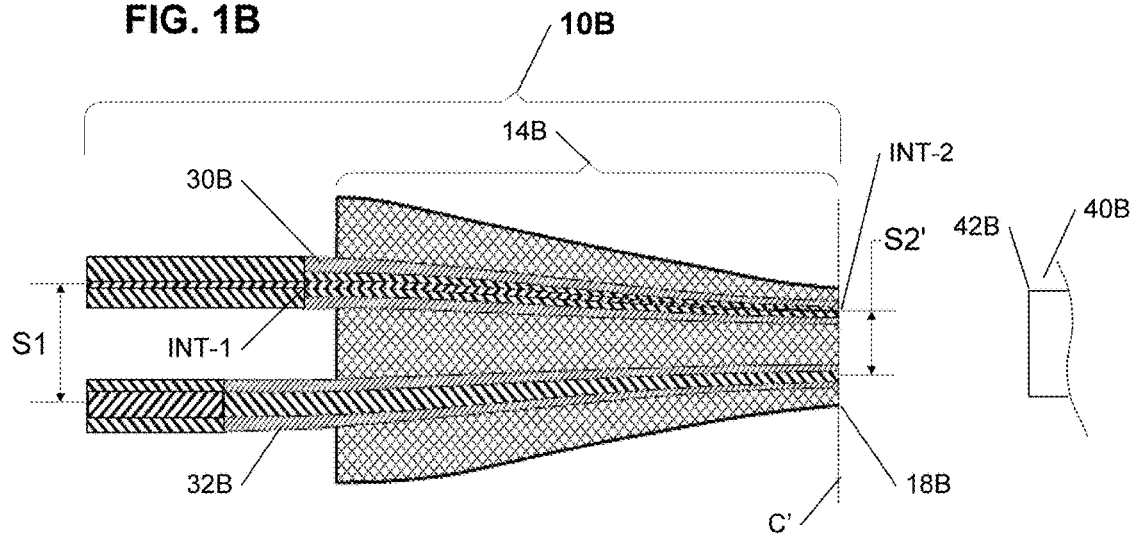
FIG. 1B is a schematic diagram of a side view of a second example embodiment of an optical fiber coupler array, which comprises at least one vanishing core waveguide (VC waveguide), illustrated therein by way of example as a single VC waveguide, and at least one Non-VC waveguide, illustrated therein by way of example as a single Non-VC waveguide, disposed in parallel proximity to the example single VC waveguide, where a portion of the optical fiber coupler array has been configured to comprise a higher channel-to-channel spacing magnitude at its second (smaller) end than the corresponding channel-to-channel spacing magnitude at the second end of the optical fiber coupler array of FIG. 1A.

Referring now to FIG. 1B, a second example embodiment of the optical fiber coupler array, is shown as a coupler array 10B. The coupler array 10B comprises a common housing structure 14B, at least one VC waveguide, shown in FIG. 1B by way of example, as a single VC waveguide 30B, and at least one Non-VC waveguide, shown in FIG. 1B by way of example, as a single Non-VC waveguide 32B, disposed in parallel proximity to the VC waveguide 30B, where a portion of the optical coupler array 10B, has been configured to comprise a larger channel-to-channel spacing value S2' at its small end, than the corresponding channel-to-channel spacing value S2 at the small end of the optical coupler array 10A, of FIG. 1A. This configuration may be readily implemented by transversely cutting the optical fiber array 10A at a position C', thus producing the common housing structure 14B that is shorter than the common housing structure 14A and resulting in a new, larger diameter array interface 18B, having the larger channel-to-channel spacing value S2'.

Referring now to FIG. 1C, a third example embodiment of the optical fiber coupler array, is shown as a coupler array 10C. The coupler array 10C comprises a plurality of VC waveguides, shown in FIG. 1C as VC waveguides 30C-1, and 30C-2, and a plurality of Non-VC waveguides, shown in FIG. 1C as Non-VC waveguides 32C-1, 32C-2, and 32C-a, all disposed longitudinally and asymmetrically to one another, wherein at least a portion of the plural Non-VC waveguides are of different types and/or different characteristics (such as single mode or multimode or polarization maintaining etc.)—for example, Non-VC waveguides 32C-1, 32C-2 are of a different type, or comprise different characteristics from the Non-VC waveguide 32C-a. Additionally, any of the VC or Non-VC waveguides (such as, for example, the Non-VC waveguide 32C-a) can readily extend beyond the coupler array 10C common housing structure by any desired length, and need to be spliced to an optical device proximally thereto.

Referring now to FIG. 1D, a fourth example embodiment of the optical fiber coupler array that is configured for multi-core fan-in and fan-out connectivity, and shown as a coupler array 50. The coupler array 50 comprises a pair of optical fiber coupler array components (10D-1 and 10D-2), with a multi-core optical fiber element 52 connected (e.g., by fusion splicing at positions 54-1 and 54-2) between the second (smaller sized) ends of the two optical fiber coupler array components (10D-1, 10D-2). Preferably, at least one of the VC waveguides in each of the coupler array components (10D-1, 10D-2) is configured to increase or maximize optical coupling to a corresponding selected core of the multi-core optical fiber element 52, while decreasing or minimizing optical coupling to all other cores thereof.

Figure 2A:
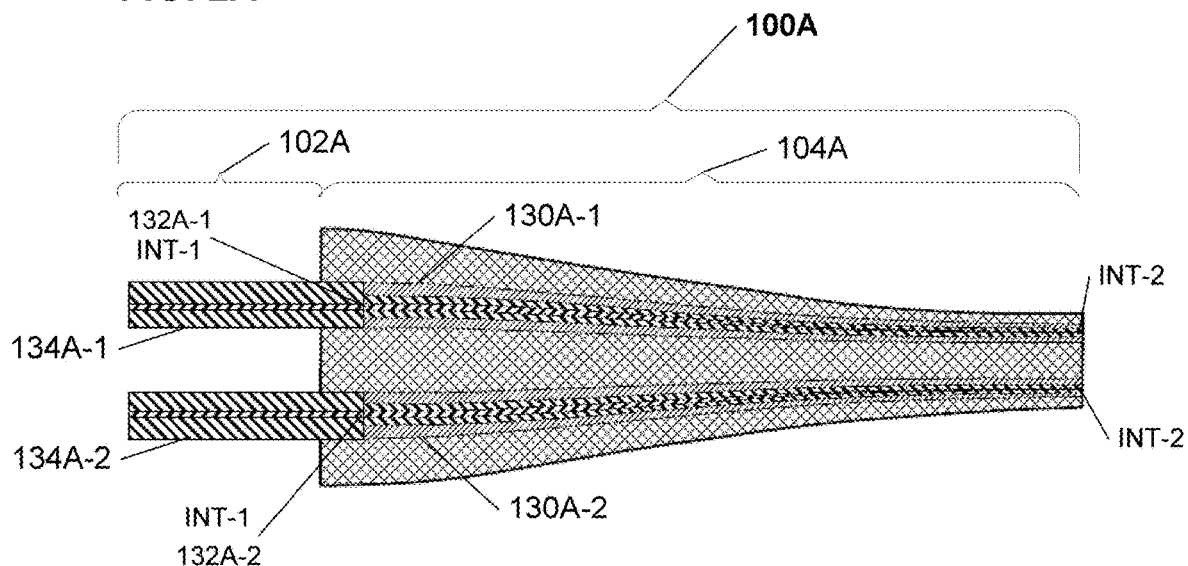
FIG. 2A is a schematic diagram of a side view of a fifth example embodiment of an optical fiber coupler array, which comprises a plurality of longitudinally proximal VC waveguides at least partially embedded in a single common housing structure, wherein each plural VC waveguide is spliced, at a particular first splice location, to a corresponding elongated optical device (such as an optical fiber), at least a portion of which extends outside the single common housing structure by a predetermined length, and wherein each particular first splice location is disposed within the single common housing structure.

Referring now to FIG. 2A, a fifth example embodiment of the optical fiber coupler array, is shown as a coupler array 100A. The coupler array 100A comprises a plurality of longitudinally proximal VC waveguides at least partially embedded in a single common housing structure 104A, shown by way of example only, as plural VC waveguides 130A-1, 130A-2. Each plural VC waveguide 130A-1, 130A-2 is spliced, at a particular splice location 132A-1, 132A-2, respectively, to a corresponding respective elongated optical device 134A-1, 134A-2 (such as an optical fiber), at least a portion of which extends outside the common housing structure 104A by a predetermined length 102A, and wherein each particular splice location 132A-1, 132A-2 is disposed within the common housing structure 104A.

Figure 2B:
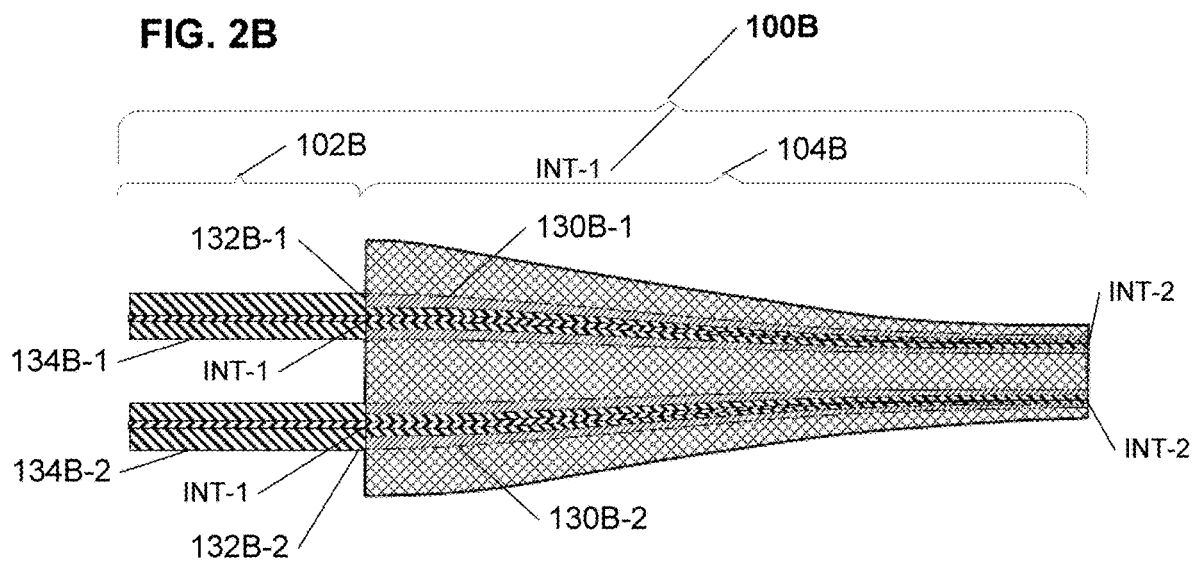
FIG. 2B is a schematic diagram of a side view of a sixth example embodiment of an optical fiber coupler array, which comprises a plurality of longitudinally proximal VC waveguides at least partially embedded in a single common housing structure, wherein each plural VC waveguide is spliced, at a particular second splice location, to a corresponding elongated optical device (such as an optical fiber), at least a portion of which extends outside the single common housing structure by a predetermined length, and wherein each particular second splice location is disposed at an outer cross-sectional boundary region of the single common housing structure.

Referring now to FIG. 2B, a sixth example embodiment of the optical fiber coupler array, is shown as a coupler array 100B.

The coupler array 100B comprises a plurality of longitudinally proximal VC waveguides at least partially embedded in a single common housing structure 104B, shown by way of example only, as plural VC waveguides 130B-1, 130B-2. Each plural VC waveguide 130B-1, 130B-2 is spliced, at a particular splice location 132B-1, 132B-2, respectively, to a corresponding respective elongated optical device 134B-1, 134B-2 (such as an optical fiber), at least a portion of which extends outside the common housing structure 104B by a predetermined length 102B, and wherein each particular splice location 132B-1, 132B-2 is disposed at an outer cross-sectional boundary region of the common housing structure 104B.

Referring now to FIG. 2C, a seventh example embodiment of the optical fiber coupler array, is shown as a coupler array 100C.

The coupler array 100C comprises a plurality of longitudinally proximal VC waveguides at least partially embedded in a single common housing structure 104C, shown by way of example only, as plural VC waveguides 130C-1, 130C-2. Each plural VC waveguide 130C-1, 130C-2 is spliced, at a particular splice location 132C-1, 132C-2, respectively, to a corresponding respective elongated optical device 134C-1, 134C-2 (such as an optical fiber), at least a portion of which extends outside the common housing structure 104C by a predetermined length 102C, and wherein each particular splice location 132C-1, 132C-2 is disposed outside of the common housing structure 104C.

Referring now to FIG. 2D, an alternative embodiment of the optical fiber coupler array, is shown as a coupler array 150. The coupler array 150 comprises a plurality of longitudinally proximal VC waveguides at least partially embedded in a single common housing structure, that is configured at its second end, to increase or optimize optical coupling to a free-space-based optical device 152. The free-space-based optical device 152 may comprise a lens 154 followed by an additional optical device component 156, which may comprise, by way of example, a MEMS mirror or volume Bragg grating. The combination of the coupler and the free-space-based optical device 152 may be used as an optical switch or WDM device for spectral combining or splitting of light signals 160b (representative of the light coupler array 150 output light signals 160a after they have passed through the lens 154.) In this case, one of the fibers may be used as an input and all others for an output or vice versa. In another embodiment, a free-space-based device 152 can be fusion spliceable to the second coupler's end. This device may be a coreless glass element, which can serve as an end cup for power density redaction at the glass-air interface. In another modification, the coreless element can serve as a Talbot mirror for phase synchronization of coupler's waveguides in a Talbot cavity geometry Prior to describing the various embodiments shown in FIGS. 3A to 3L in greater detail, it should be understood that whenever a "plurality" or "at least one" coupler component/element is indicated below, the specific quantity of such coupler components/elements that may be provided in the corresponding embodiment of the coupler array, may be selected as a matter of necessity, or design choice (for example, based on the intended industrial application of the coupler array), without departing from the spirit of the present invention. Accordingly, in the various FIGS. 3A to 3L, single or individual coupler array components/elements are identified by a single reference number, while each plurality of the coupler component/elements is identified by a reference number followed by a "(1 . . . n)" designation, with "n" being a desired number of plural coupler elements/components (and which may have a different value in any particular coupler array embodiment described below).

Also, all the waveguides VC and Non-VC are shown with a circular cross-section of the inner and outer core and cladding only by example. Other shapes of the cross-sections of the inner and outer core and cladding (for example, hexagonal, rectangular or squared) may be utilized without departure from the current invention. The specific choice of shape is based on various requirements, such as channel shape of the optical device, channel positional geometry (for example, hexagonal, rectangular or square lattice), or axial polarization alignment mode.

Similarly, unless otherwise indicated below, as long as various relationships set forth below (for example, the relative volume relationship set forth below with respect to optical coupler arrays 200C and 200D of FIGS. 3C and 3D, respectively, and the feature, set forth below in connection with the coupler array 200H of FIG. 3H, that the PM VC waveguide 204H is positioned longitudinally off-centered transversely from the coupler array 200H central longitudinal axis), are adhered to, the sizes, relative sizes, relative positions and choices of composition materials, are not limited to the example sizes, relative sizes, relative positions and choices of composition materials, indicated below in connection with the detailed descriptions of the coupler array embodiments of FIGS. 3A to 3L, but rather they may be selected by one skilled in the art as a matter of convenience or design choice, without departing from the spirit of the present invention.

Finally, it should be noted that each of the various single common housing structure components 202A to 202L, of the various coupler arrays 200A to 200L of FIGS. 3A to 3L, respectively, may be composed of a medium having the refractive index N-4 value in accordance with an applicable one of the above-described relationships with the values of other coupler array component refractive indices N-1, N-2, and N-3, and having properties and characteristics selected from the various contemplated example medium composition parameters described above in connection with medium 28A of FIG. 1A.

Figure 3A:
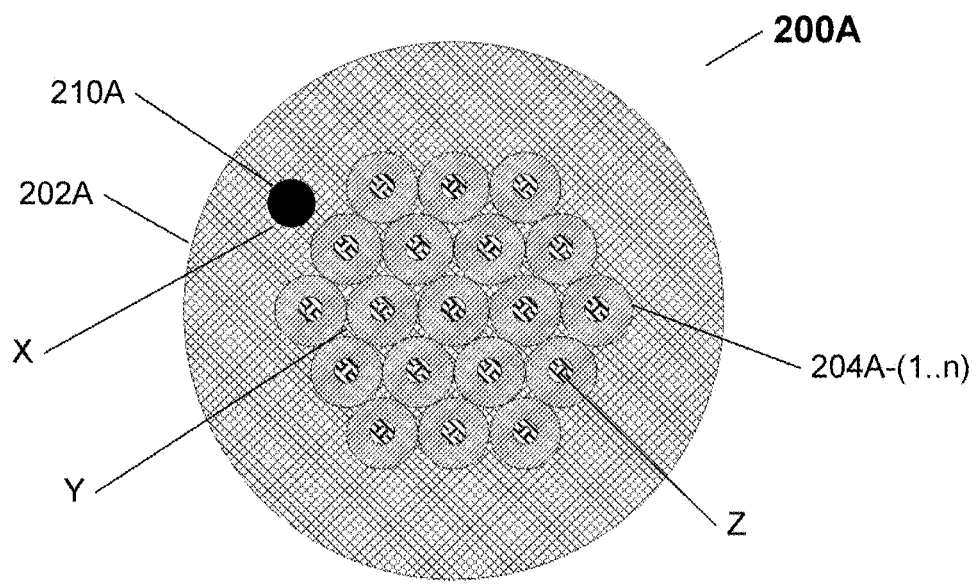
FIG. 3A is a schematic diagram of a cross-sectional view of a first alternative embodiment of the optical fiber coupler arrays of FIGS. 1D to 2D, above, and optionally comprising a fiducial element operable to provide a visual identification of waveguide arrangement/characteristics (such as alignment), which may be disposed in one of several categories of cross-sectional regions.

Referring now to FIG. 3A, a first alternative embodiment of the optical fiber coupler array embodiments of FIGS. 1D to 2D, is shown as a coupler array 200A in which all waveguides are VC waveguides. The coupler array 200A comprises a single common housing 202A, and plurality of VC waveguides 204A-(1 ... n), with n being equal to 19 by way of example only, disposed centrally along the central longitudinal axis of the housing 202A. The coupler array 200A may also comprise an optional at least one fiducial element 210A, operable to provide one or more useful properties to the coupler array, including, but not limited to:

enabling visual identification (at at least one of the coupler array's ends) of the coupler array waveguide arrangement; and facilitating passive alignment of at least one of the coupler array ends to at least one optical device.

Furthermore, when deployed in optical coupler array embodiments that comprise at least one polarization maintaining VC waveguide (such as the optical coupler array embodiments described below in connection with FIGS. 3H-3L), a fiducial element is further operable to:

enable visual identification of the optical coupler array's particular polarization axes alignment mode (such as described below in connection with FIGS. 3H-3L); and serve as a geometrically positioned reference point for alignment thereto, of one or more polarization axis of PM waveguides in a particular optical coupler array.

The fiducial element 210A may comprise any of the various types of fiducial elements known in the art, selected as a matter of design choice or convenience without departing from the spirit of the invention—for example, it may be a dedicated elongated element positioned longitudinally within the common housing structure 202A in one of various cross-sectional positions (such as positions X or Y, shown in FIG. 3A. Alternatively, the fiducial element 210A may comprise a dedicated channel not used for non-fiducial purposes, for example, replacing one of the waveguides 204A-(1 ... n), shown by way of example only at position Z in FIG. 3A.

Figure 3B:
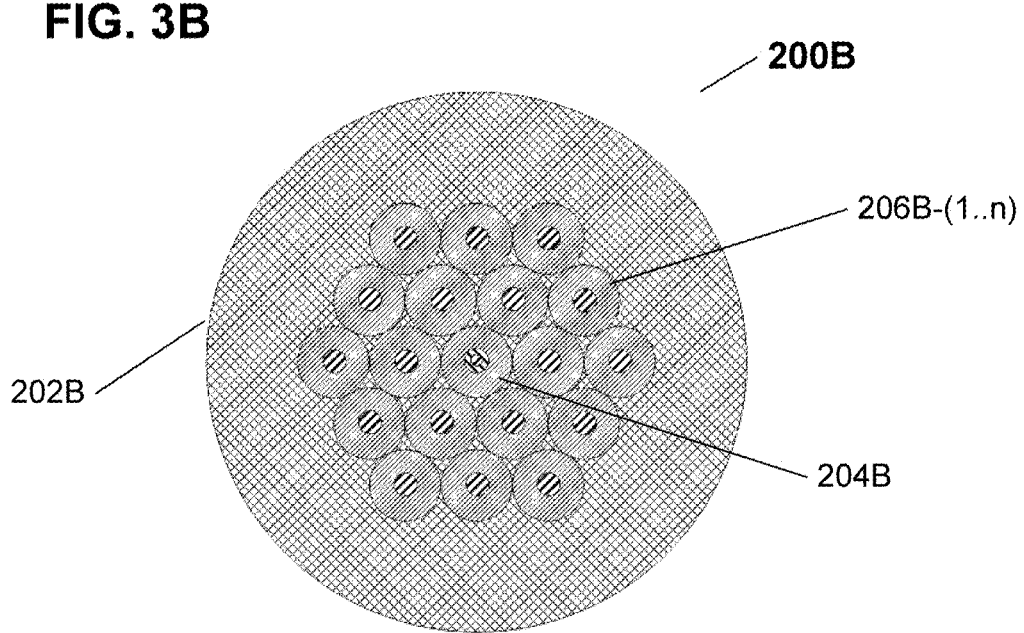
FIG. 3B is a schematic diagram of a cross-sectional view of a first alternative embodiment of the optical fiber coupler array of FIG. 1A, above, in which at least one VC waveguide, illustrated therein by way of example as a single VC waveguide, is positioned along a central longitudinal axis of the single common housing structure, and surrounded by a plurality of parallel proximal symmetrically positioned Non-VC waveguides.

Referring now to FIG. 3B, a first alternative embodiment of the optical fiber coupler array 10A of FIG. 1A, above, is shown as a coupler array 200B, that comprises a single housing structure 202B, and at least one VC waveguide, shown in FIG. 3B by way of example as a VC waveguide 204B, and a plurality of Non-VC waveguides 206B-(1 ... n), with n being equal to 18 by way of example only. The VC waveguide 204B is positioned along a central longitudinal axis of the common housing structure 202B, and circumferentially and symmetrically surrounded by proximal parallel plural Non-VC waveguides 206B-(1 ... n).

Figure 3C:
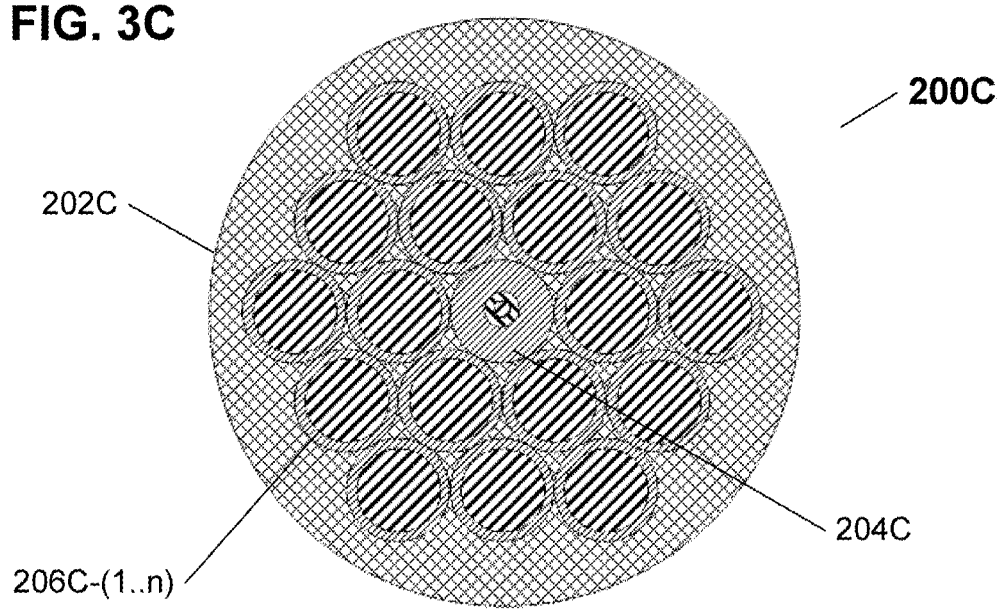
FIG. 3C is a schematic diagram of a cross-sectional view of a first alternative embodiment of the optical fiber coupler array of FIG. 3B above, in which a volume of the single common housing structure medium surrounding the sections of all of the waveguides embedded therein, exceeds a total volume of the inner and outer cores of the section of the VC waveguide that is embedded within the single common housing structure.

Referring now to FIG. 3C, a first alternative embodiment of the optical fiber coupler array 200B of FIG. 3B, above, is shown as a coupler array 200C that comprises a single housing structure 202C, a VC waveguide 204C, and a plurality of Non-VC waveguides 206C-(1 ... n), with n being equal to 18 by way of example only. The VC waveguide 204C is positioned along a central longitudinal axis of the common housing structure 202C, and circumferentially and symmetrically surrounded by proximal parallel plural Non-VC waveguides 206C-(1 ... n). The coupler array 200C is configured such that a volume of the common housing structure 202C medium, surrounding the sections of all of the waveguides embedded therein (i.e., the VC waveguide 204C and the plural Non-VC waveguides 206C-(1 ... n)), exceeds a total volume of the inner and outer cores of the section of the VC waveguide 204C that is embedded within the single common housing structure 202C.

Figure 3D:
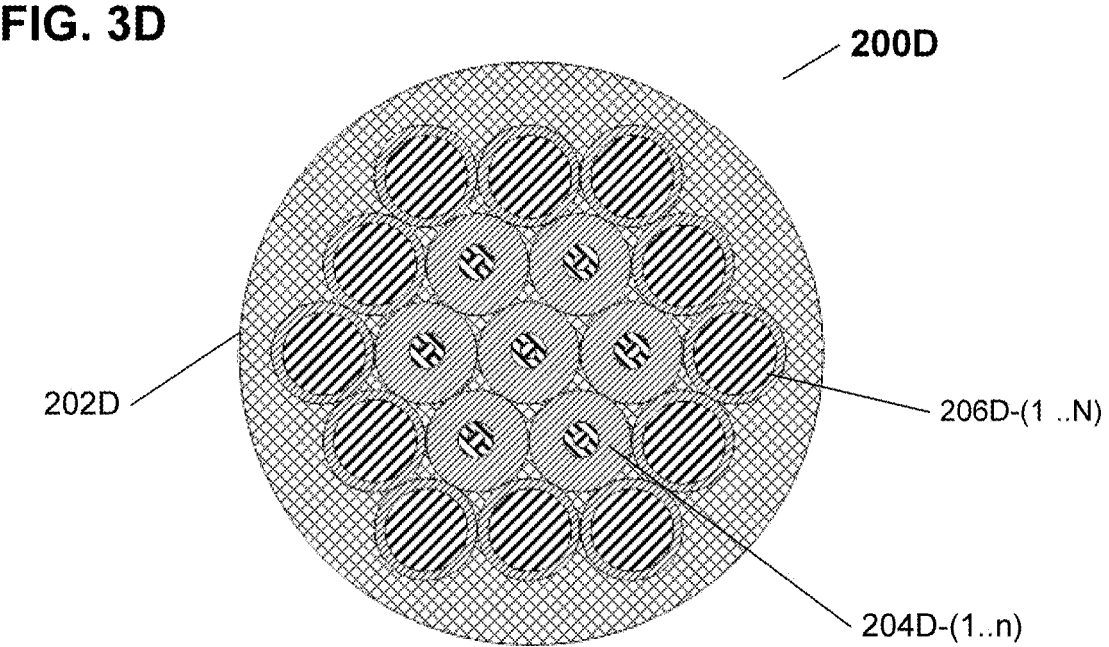
FIG. 3D is a schematic diagram of a cross-sectional view of a second alternative embodiment of the optical fiber coupler array of FIG. 3B above, in which the at least one VC waveguide positioned along the central longitudinal axis of the single common housing structure comprises a plurality of VC waveguides, and wherein a volume of the single common housing structure medium surrounding the sections of all of the waveguides embedded therein, exceeds a total volume of the inner and outer cores of the sections of the plural VC waveguides that are embedded within the single common housing structure.

Referring now to FIG. 3D, a first alternative embodiment of the optical fiber coupler array 200C of FIG. 3C, above, is shown as a coupler array 200D that comprises a single housing structure 202D, a plurality of VC waveguides 204D-(1 ... N), with N being equal to 7 by way of example only, and a plurality of Non-VC waveguides 206D-(1 ... n), with n being equal to 12 by way of example only. The plural VC waveguides 204D-(1 ... N) are positioned along a central longitudinal axis of the common housing structure 202D, and circumferentially and symmetrically surrounded by proximal parallel plural Non-VC waveguides 206D-(1 ... n). The coupler array 200D is configured such that a volume of the common housing structure 202D medium, surrounding the sections of all of the waveguides embedded therein (e.g., the plural VC waveguides 204D-(1 ... N), and the plural Non-VC waveguides 206D-(1 ... n)), exceeds a total volume of the inner and outer cores of the section of the plural VC waveguides 204D-(1 ... N) that are embedded within the single common housing structure 202D.

Figure 3E:
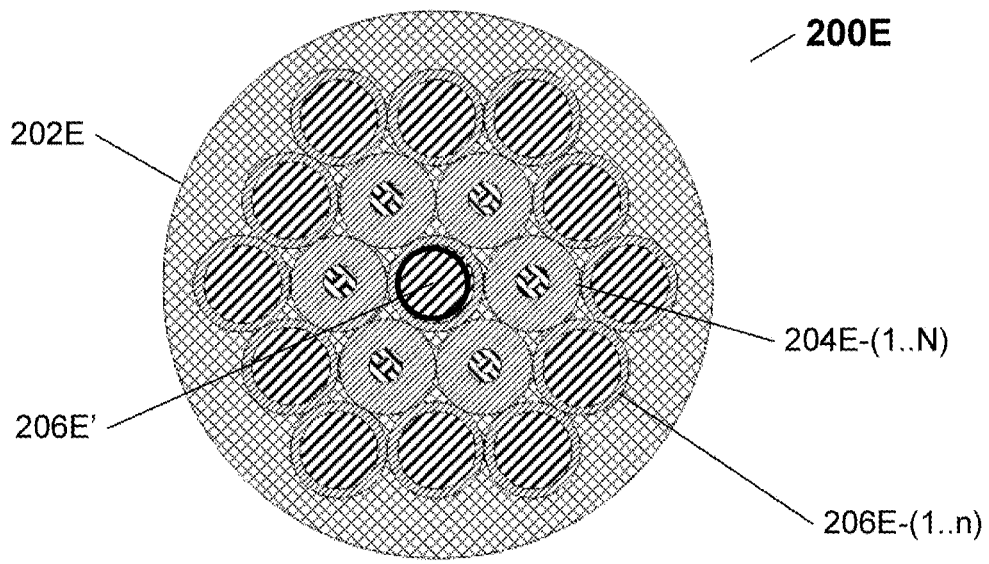
FIG. 3E is a schematic diagram of a cross-sectional view of a first alternative embodiment of the optical fiber coupler array of FIG. 3D, further comprising a central waveguide channel operable to provide optical pumping functionality therethrough.

Referring now to FIG. 3E, a first alternative embodiment of the optical fiber coupler array 200D of FIG. 3D, above, is shown as a coupler array 200E, that comprises a single housing structure 202E, a plurality of VC waveguides 204E-(1 ... N), with N being equal to 6 by way of example only, a plurality of Non-VC waveguides 206E-(1 ... n), with n being equal to 12 by way of example only, and a separate single Non-VC waveguide 206E'. The Non-VC waveguide 206E', is preferably operable to provide optical pumping functionality therethrough, and is positioned along a central longitudinal axis of the common housing structure 202E and circumferentially and symmetrically surrounded by proximal parallel plural VC waveguides 204E-(1 ... N), that are in turn circumferentially and symmetrically surrounded by proximal parallel plural Non-VC waveguides 206E-(1 ... n).

Figure 3F:
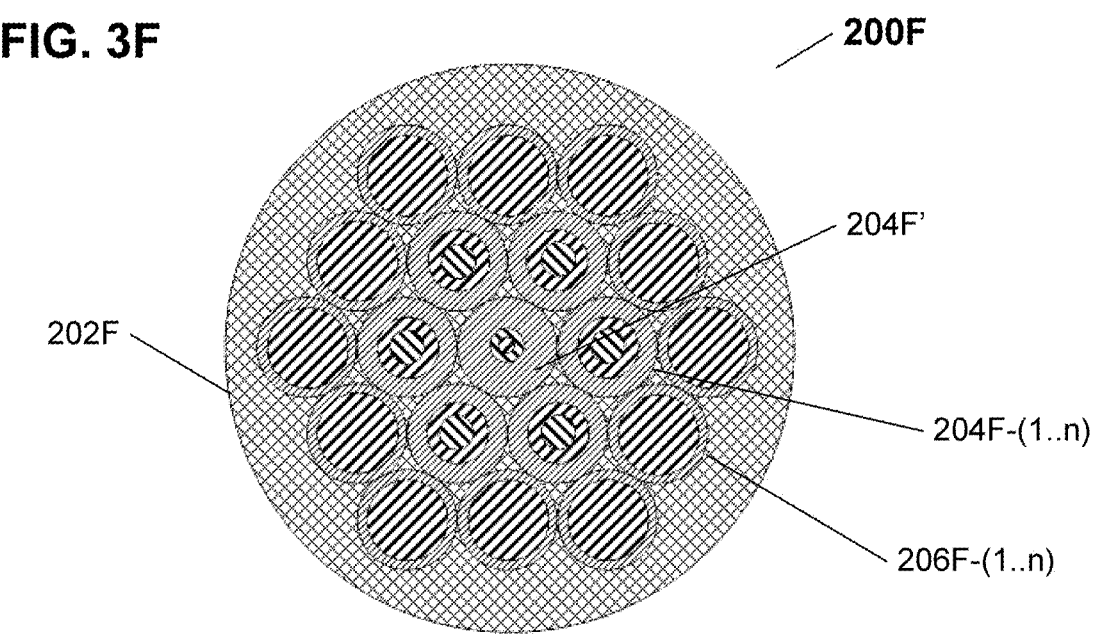
FIG. 3F is a schematic diagram of a cross-sectional view of a second alternative embodiment of the optical fiber coupler array of FIG. 3D, in which the VC waveguide that is positioned along the central longitudinal axis of the single common housing structure, is of a different type, and/or comprises different characteristics from the remaining plural VC waveguides, which, if selected to comprise enlarged inner cores, may be advantageously utilized for increasing or optimizing optical coupling to different types of optical pump channels of various optical devices.

Referring now to FIG. 3F, a second alternative embodiment of the optical fiber coupler array 200B of FIG. 3B, above, is shown as a coupler array 200F, that comprises a single housing structure 202F, a plurality of VC waveguides 204F-(1 ... N), with N being equal to 6 by way of example only, a separate single VC waveguide 204F', and a plurality of Non-VC waveguides 206F-(1 ... n), with n being equal to 12 by way of example only, that preferably each comprise enlarged inner cores of sufficient diameter to increase or optimize optical coupling to different types of optical pump channels of various optical devices, to which the coupler array 200F may be advantageously coupled. The VC waveguide 204F', is positioned along a central longitudinal axis of the common housing structure 202F, and circumferentially and symmetrically surrounded by proximal parallel plural VC waveguides 204F-(1 ... N), that are in turn circumferentially and symmetrically surrounded by proximal parallel plural Non-VC waveguides 206F-(1 ... n).

Figure 3G:
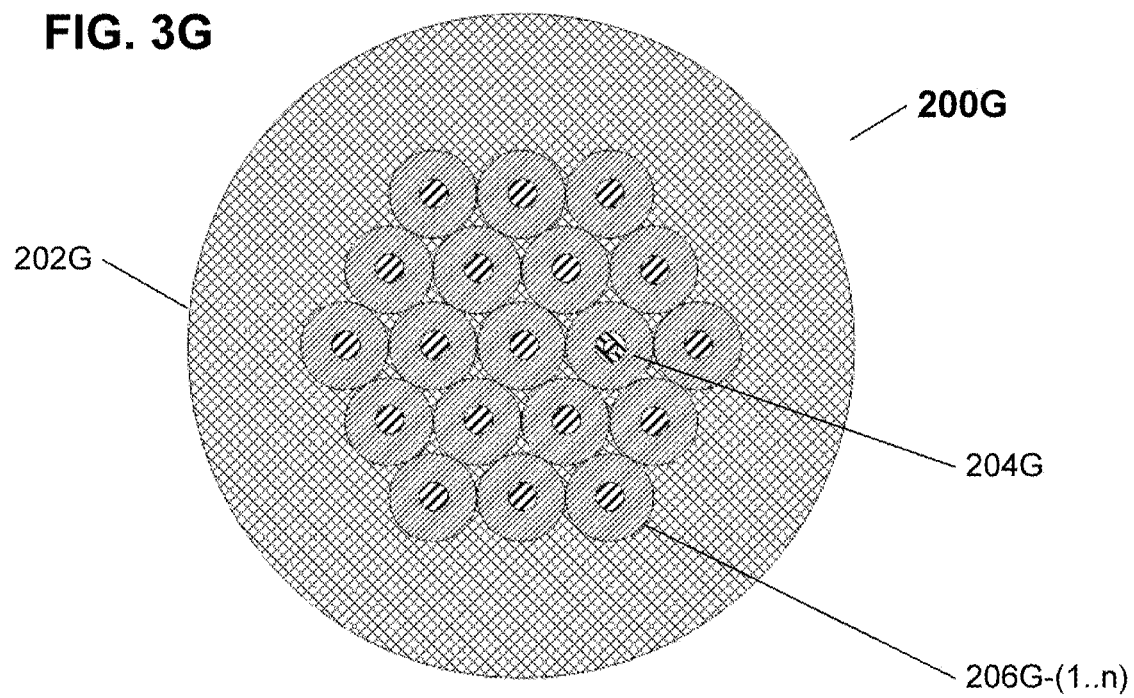
FIG. 3G is a schematic diagram of a cross-sectional view of a third alternative embodiment of the optical fiber coupler array of FIG. 3B above, in which at least one VC waveguide, illustrated therein by way of example as a single VC waveguide, is positioned as a side-channel, off-set from the central longitudinal axis of the single common housing structure, such that this embodiment of the optical fiber coupler array may be readily used as a fiber optical amplifier and or a laser, when spliced to a double-clad optical fiber having a non-concentric core for improved optical pumping efficiency.

Referring now to FIG. 3G, a third alternative embodiment of the optical fiber coupler array 200B of FIG. 3B, above, is shown as a coupler array 200G, that comprises a single housing structure 202G, and at least one VC waveguide, shown in FIG. 3G by way of example as a VC waveguide 204G, and a plurality of Non-VC waveguides 206G-(1 ... n), with n being equal to 18 by way of example only. The VC waveguide 204G is positioned as a side-channel, off-set from the central longitudinal axis of the single common housing structure 202G, such that optical fiber coupler array 200G may be readily used as a fiber optical amplifier and or a laser, when spliced to a double-clad optical fiber (not shown) having a non-concentric core for improved optical pumping efficiency. It should be noted that because a double-clad fiber is a fiber in which both the core and the inner cladding have light guiding properties, most optical fiber types, such as SM, MM, LMA, or MC (multi-core), whether polarization maintaining or not, and even standard (e.g., conventional) single mode optical fibers, can be converted into a double-clad fiber by coating (or recoating) the fiber with a low index medium (forming the outer cladding).

Optionally, when the second end of the coupler array 200G is spliced to a double-clad fiber (not shown), at least a portion of the common housing structure 202G proximal to the splice point with the double-clad fiber (not-shown), may be coated with a low index medium extending over the splice point and up to the double-clad fiber's outer cladding (and optionally extending over a portion of the outer cladding that is proximal to the splice point).

Referring now to FIGS. 3H to 3L, in various alternative example embodiments of the optical coupler, at least one of the VC waveguides utilized therein, and, in certain embodiments, optionally at least one of the Non-VC waveguides, may comprise a polarization maintaining (PM) property. By way of example, the PM property of a VC waveguide may result from a pair of longitudinal stress rods disposed within the VC waveguide outside of its inner core and either inside, or outside, of the outer core (or through other stress elements), or the PM property may result from a noncircular inner or outer core shape, or from other PM-inducing optical fiber configurations (such as in bow-tie or elliptically clad PM fibers). In various embodiments of the optical fiber in which at least one PM waveguide (VC and/or Non-VC) is utilized, an axial alignment of the PM waveguides (or waveguide), in accordance with a particular polarization axes alignment mode may be involved.

Figure 3H:
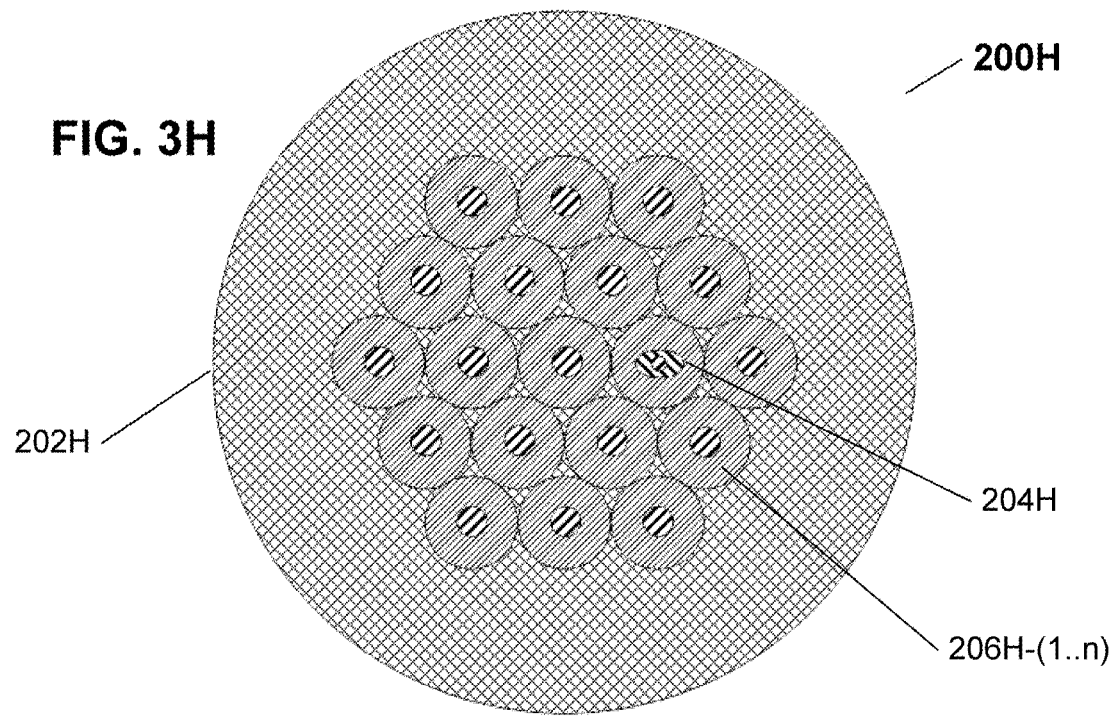
FIG. 3H is a schematic diagram of a cross-sectional view of a first alternative embodiment of the optical fiber coupler array of FIG. 3G, above, in which the at least one VC waveguide, illustrated therein by way of example as a side-channel off-center positioned single VC waveguide, comprises polarization maintaining properties and comprises a polarization axis that is aligned with respect to its transverse off-center location.
Figure 3I:
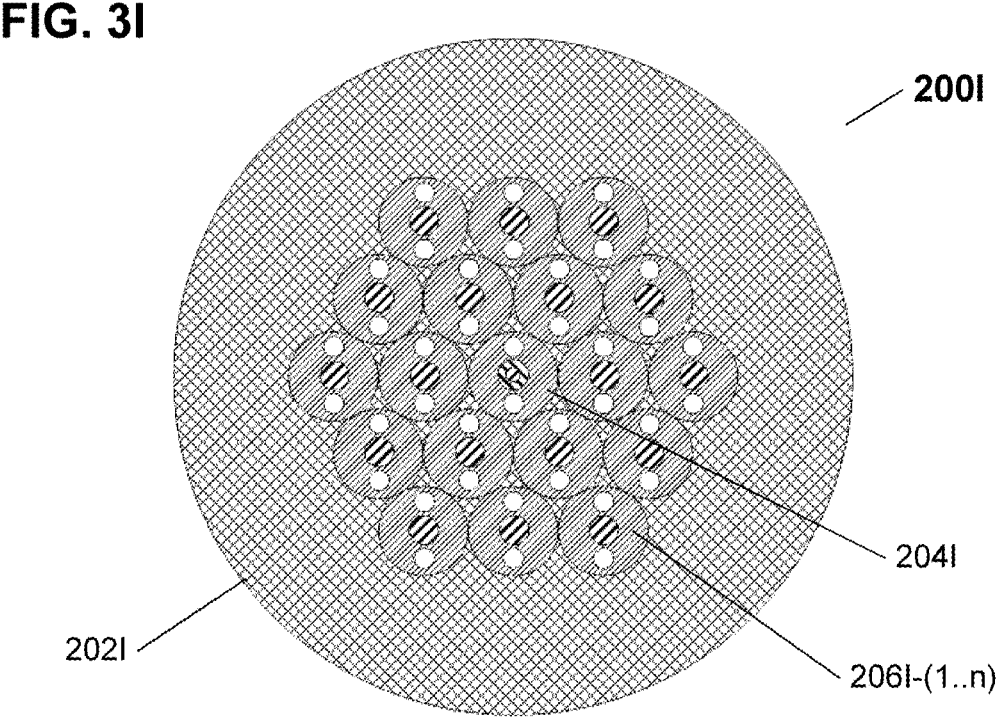
FIG. 3I is a schematic diagram of a cross-sectional view of a fourth alternative embodiment of the optical fiber coupler array of FIG. 3B, above, wherein each of the centrally positioned single VC waveguide, and the plural Non-VC waveguides, comprises polarization maintaining properties (shown by way of example only as being induced by rod stress members and which may readily and alternately be induced by various other stress or equivalent designs), and a corresponding polarization axis, where all of the polarization axes are aligned to one another.
Figure 3J:
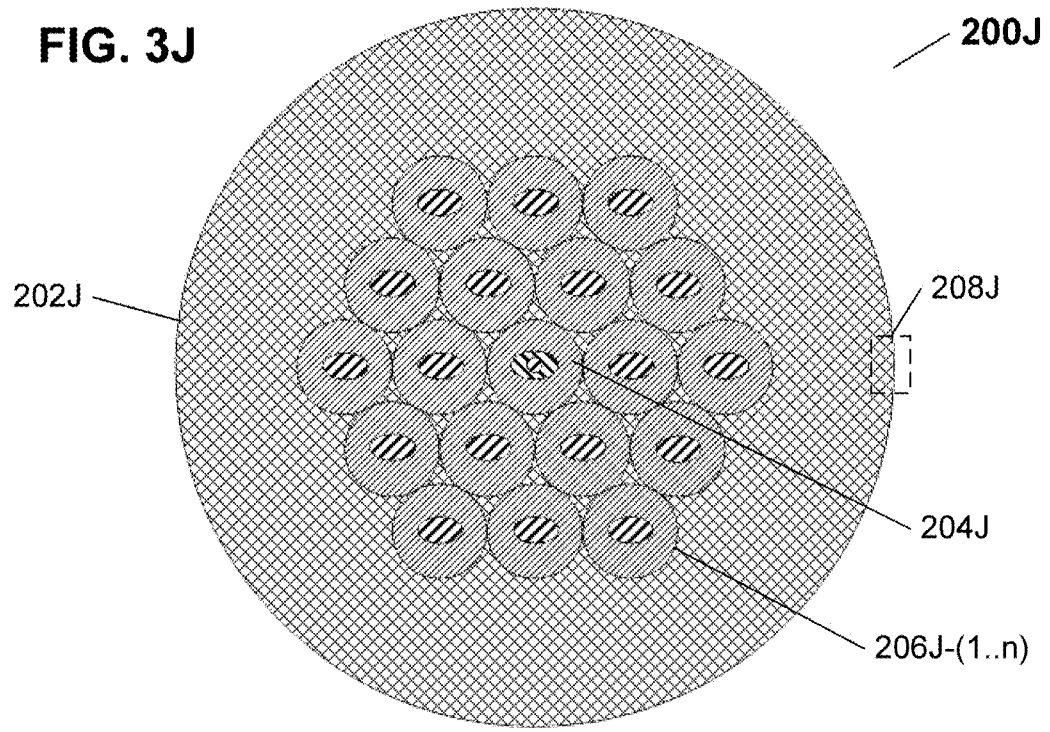
FIG. 3J is a schematic diagram of a cross-sectional view of a first alternative embodiment of the optical fiber coupler array of FIG. 3I, above, in which the polarization maintaining properties of all of the waveguides result only from a non-circular cross-sectional shape of each waveguide's core (or outer core in the case of the VC waveguide), shown by way of example only as being at least in part elliptical, and optionally comprising at least one waveguide arrangement indication element, positioned on an outer region of the single common housing structure, representative of the particular cross-sectional geometric arrangement of the optical coupler array's waveguides, such that a particular cross-sectional geometric waveguide arrangement may be readily identified from at least one of a visual and physical inspection of the single common coupler housing structure, the waveguide arrangement indication element being further operable to facilitate passive alignment of a second end of the optical coupler array to at least one optical device.
Figure 3K:
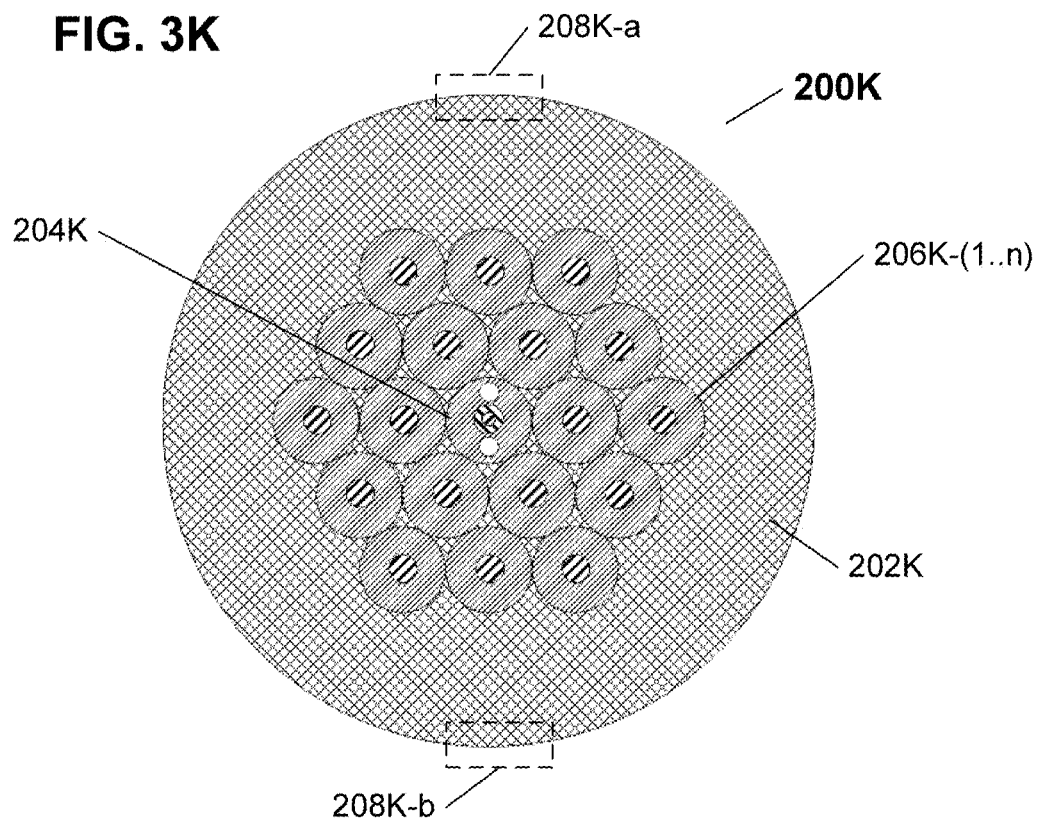
FIG. 3K is a schematic diagram of a cross-sectional view of a fifth alternative embodiment of the optical fiber coupler array of FIG. 3B, above, wherein the centrally positioned single VC waveguide, comprises polarization maintaining properties (shown by way of example only as being induced by rod stress members and which may readily and alternately be induced by various other stress or equivalent designs), and a corresponding polarization axis, and optionally comprising a plurality of optional waveguide arrangement indication elements of the same or of a different type, as described in connection with FIG. 3J.
Figure 3L:
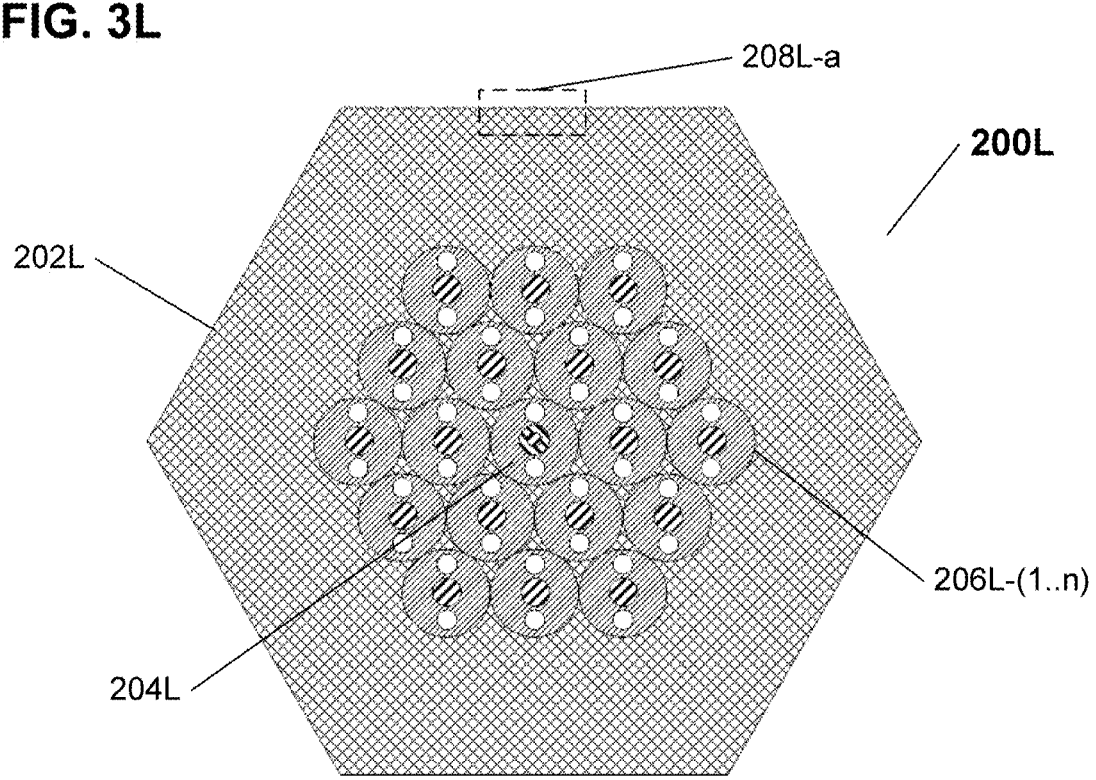
FIG. 3L is a schematic diagram of a cross-sectional view of a second alternative embodiment of the optical fiber coupler array of FIG. 3I, above, in which the single common housing structure comprises a cross section having a non-circular geometric shape (shown by way of example as a hexagon), and in which the polarization axes of the waveguides are aligned to one another and to the single common housing structure cross-section's geometric shape, and optionally further comprises a waveguide arrangement indication element, as described in connection with FIG. 3J.

In accordance with certain embodiments, a polarization axes alignment mode may comprise, but is not limited to, at least one of the following:
  axial alignment of a PM waveguide's polarization axis to the polarization axes of other PM waveguides in the optical coupler; when a PM waveguide is positioned off-center: axial alignment of a PM waveguide's polarization axis to its transverse cross-sectional (geometric) position within the optical coupler;
  when the single common housing structure of the optical coupler comprises a non-circular geometric shape (such as shown by way of example in FIG. 3L): axial alignment of a PM waveguide's polarization axis to a geometric feature of the common housing structure outer shape;
  in optical coupler embodiments comprising one or more waveguide arrangement indicators, described below, in connection with FIGS. 3J-3L: axial alignment of a PM waveguide's polarization axis to at least one geometric characteristic thereof;
  in optical coupler embodiments comprising at least one fiducial element 210A, as described above in connection with FIG. 3A: axial alignment of a PM waveguide's polarization axis to a geometric position of the at least one fiducial element 210A;

The selection of a specific type of polarization axes alignment mode for the various embodiments of the optical coupler is preferably governed by at least one axes alignment criterion, which may include, but which is not limited to: alignment of PM waveguides' polarization axes in a geometric arrangement that increases or maximizes PM properties thereof; and/or satisfying at least one requirement of one or more intended industrial application for the coupler array.

Referring now to FIG. 3H, a first alternative embodiment of the optical fiber coupler array 200G of FIG. 3G, above, is shown as a coupler array 200H, that comprises a single housing structure 202H, and at least one VC waveguide, shown in FIG. 3H by way of example as a PM VC waveguide 204H having polarization maintaining properties, and a plurality of Non-VC waveguides 206H-(1 . . . n), with n being equal to 18 by way of example only. The PM VC waveguide 204H is positioned as a side-channel, off-set from the central longitudinal axis of the single common housing structure 202H, and comprises a polarization axis that is aligned, by way of example, with respect to the transverse off-center location of the PM VC waveguide 204H.

Referring now to FIG. 3I, a fourth alternative embodiment of the optical fiber coupler array 200B of FIG. 3B, above, is shown as a coupler array 200I, that comprises a single housing structure 202I, and at least one VC waveguide, shown in FIG. 3I by way of example as a PM VC waveguide 204I having polarization maintaining properties, and a plurality of PM Non-VC waveguides 206I-(1 . . . n), with n being equal to 18 by way of example only, each also having polarization maintaining properties. The PM VC waveguide 204I is positioned along a central longitudinal axis of the common housing structure 202I, and circumferentially and symmetrically surrounded by proximal parallel plural PM Non-VC waveguides 206I-(1 . . . n). By way of example, the coupler array 200I comprises a polarization axes alignment mode in which the polarization axes of each of the PM VC waveguide 204I and of the plural PM Non-VC waveguides 206I-(1 . . . n) are aligned to one another. The PM properties of the PM VC waveguide 204I and of the plural PM Non-VC waveguides 206I-(1 . . . n) are shown, by way of example only, as being induced by rod stress members (and which may readily and alternately be induced by various other stress, or equivalent designs)).

Referring now to FIG. 3J, a first alternative embodiment of the optical fiber coupler array 200I of FIG. 3I, above, is shown as a coupler array 200J, that comprises a single housing structure 202J, and at least one VC waveguide, shown in FIG. 3J by way of example as a PM VC waveguide 204J having polarization maintaining properties, and a plurality of PM Non-VC waveguides 206J-(1 . . . n), with n being equal to 18 by way of example only, each also having polarization maintaining properties. The PM VC waveguide 204J is positioned along a central longitudinal axis of the common housing structure 202J, and circumferentially and symmetrically surrounded by proximal parallel plural PM Non-VC waveguides 206J-(1 . . . n). The PM properties of the PM VC waveguide 204J and of the plural PM Non-VC waveguides 206J-(1 . . . n) are shown, by way of example only, as resulting only from a non-circular cross-sectional shape (shown by way of example only as being at least in part elliptical), of each plural PM Non-VC waveguide 206J-(1 . . . n) core (and from a non-circular cross-sectional shape of the outer core of the PM VC waveguide 204J).

The coupler array 200J optionally comprises at least one waveguide arrangement indication element 208J, positioned on an outer region of the common housing structure 202J, that is representative of the particular cross-sectional geometric arrangement of the optical coupler array 200J waveguides (i.e., of the PM VC waveguide 204J and of the plural PM Non-VC waveguides 206J-(1 . . . n)), such that a particular cross-sectional geometric waveguide arrangement may be readily identified from at least one of a visual and physical inspection of the common coupler housing structure 202J that is sufficient to examine the waveguide arrangement indication element 208J. Preferably, the waveguide arrangement indication element 208J may be configured to be further operable to facilitate passive alignment of a second end of the optical coupler array 200J to at least one optical device (not shown).

The waveguide arrangement indication element 208J, may comprise, but is not limited to, one or more of the following, applied to the common housing structure 202J outer surface: a color marking, and/or a physical indicia (such as an groove or other modification of the common housing structure 202J outer surface, or an element or other member positioned thereon). Alternatively, the waveguide arrangement indication element 208J may actually comprise a specific modification to, or definition of, the cross-sectional geometric shape of the common housing structure 202J (for example, such as a hexagonal shape of a common housing structure 202L of FIG. 3L, below, or another geometric shape).

By way of example, the coupler array 200J may comprise a polarization axes alignment mode in which the polarization axes of each of the PM VC waveguide 204J and of the plural PM Non-VC waveguides 206J-(1 . . . n) are aligned to one another, or to the waveguide arrangement indication element 208J.

Referring now to FIG. 3K, a fifth alternative embodiment of the optical fiber coupler array 200B of FIG. 3B, above, is shown as a coupler array 200K, that comprises a single housing structure 202K, and at least one VC waveguide, shown in FIG. 3K by way of example as a PM VC waveguide 204K having polarization maintaining properties, and a plurality of Non-VC waveguides 206K-(1 . . . n), with n being equal to 18 by way of example only. The PM VC waveguide 204K is positioned along a central longitudinal axis of the common housing structure 202K, and circumferentially and symmetrically surrounded by proximal parallel plural PM Non-VC waveguides 206K-(1 . . . n). The PM properties of the PM VC waveguide 204K are shown, by way of example only, as being induced by rod stress members (and which may readily and alternately be induced by various other stress, or equivalent approaches)). The coupler array 200K, may optionally comprise a plurality of waveguide arrangement indication elements—shown by way of example only, as waveguide arrangement indication elements 208K-a and 208K-b, which may each be of the same, or of a different type, as described above, in connection with the waveguide arrangement indication element 208J of FIG. 3J.

Referring now to FIG. 3L, a second alternative embodiment of the optical fiber coupler array 200I of FIG. 3I, above, is shown as a coupler array 200L, that comprises a single housing structure 202L comprising a cross section having a non-circular geometric shape (shown by way of example as a hexagon), and at least one VC waveguide, shown in FIG. 3L by way of example as a PM VC waveguide 204L having polarization maintaining properties, and a plurality of PM Non-VC waveguides 206L-(1 . . . n), with n being equal to 18 by way of example only, each also having polarization maintaining properties. The PM VC waveguide 204L is positioned along a central longitudinal axis of the common housing structure 202L, and circumferentially and symmetrically surrounded by proximal parallel plural PM Non-VC waveguides 206L-(1 . . . n).

By way of example, the coupler array 200L comprises a polarization axes alignment mode in which the polarization axes of each of the PM VC waveguide 204L and of the plural PM Non-VC waveguides 206L-(1 . . . n) are aligned to one another, and to the common housing structure 202L cross-sectional geometric shape. The PM properties of the PM VC waveguide 204L and of the plural PM Non-VC waveguides 206L-(1 . . . n) are shown, by way of example only, as being induced by rod stress members (and which may readily and alternately be induced by various other stress, or equivalent designs)). The coupler array 200K, may optionally comprise a waveguide arrangement indication element 208L-a which may comprise any of the configurations described above, in connection with the waveguide arrangement indication element 208J of FIG. 3J.

Figure 4:
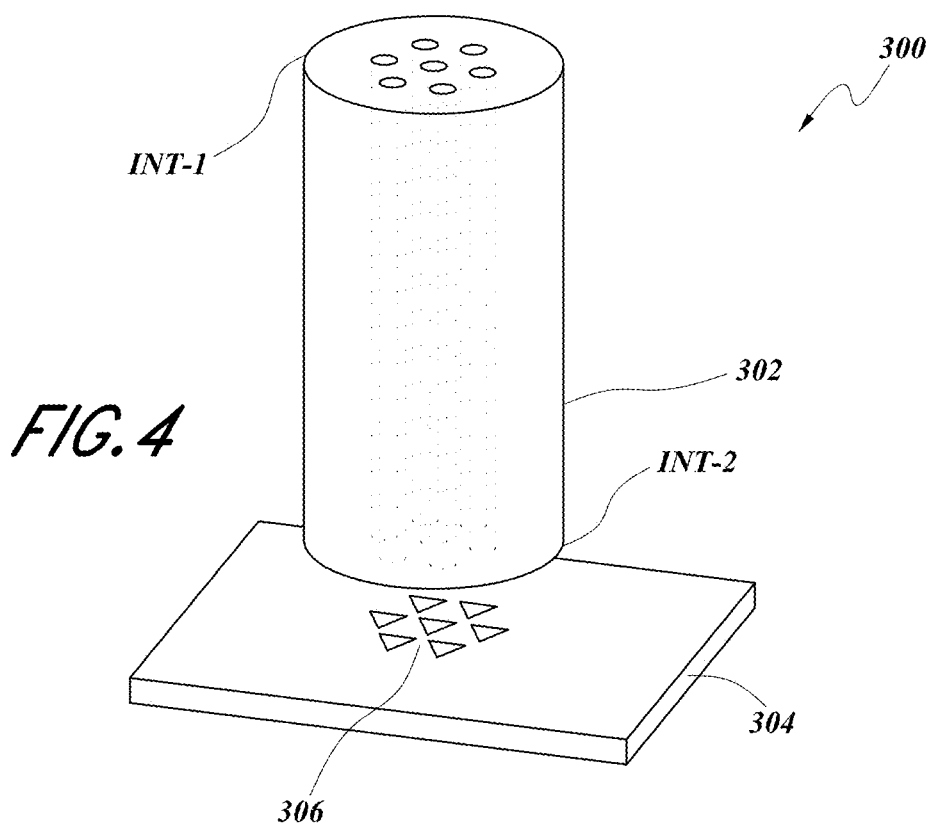
FIG. 4 is a schematic isometric view diagram illustrating an example connection of a second end (i.e. "tip") of the optical fiber coupler array, in the process of connecting to plural vertical coupling elements of an optical device in a proximal open air optical coupling alignment configuration, that may be readily shifted into a butt-coupled configuration through full physical contact of the optical fiber coupler array second end and the vertical coupling elements.

Referring now to FIG. 4, a second end 302 (i.e. "tip") of the optical fiber coupler array is shown, by way of example, as being in the process of connecting to plural vertical coupling elements 306 of an optical device 304 in a proximal open air optical coupling alignment configuration, that may be readily shifted into a butt-coupled configuration through full physical contact of the optical fiber coupler array second end 302 and the vertical coupling elements 306.

Figure 5:
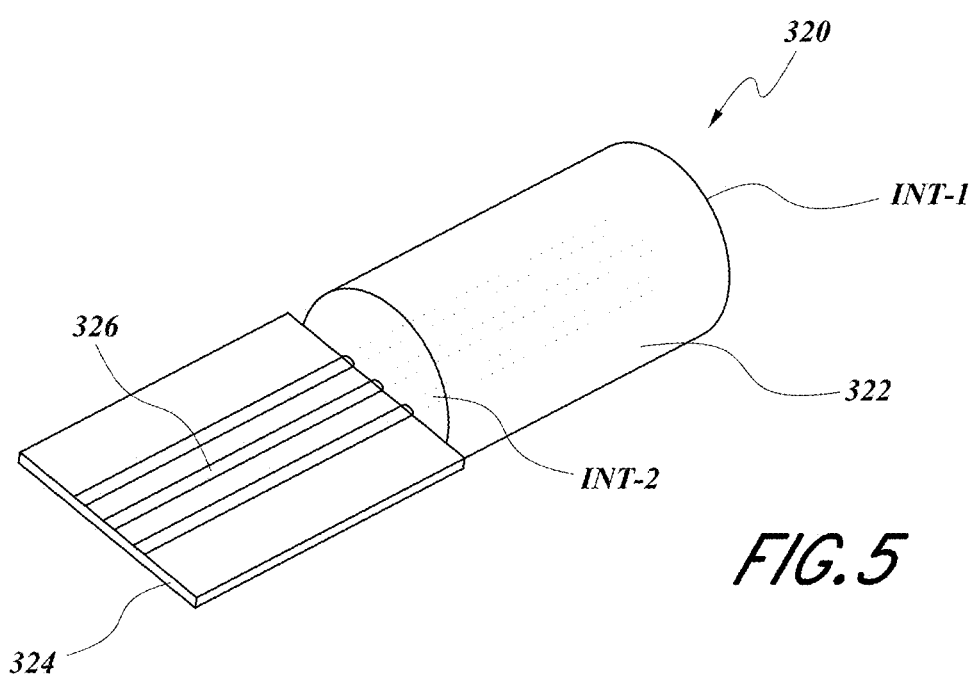
FIG. 5 is a schematic isometric view diagram illustrating an example connection of a second end (i.e. "tip") of the optical fiber coupler array connected to plural edge coupling elements of an optical device in a butt-coupled configuration, that may be readily shifted into one of several alternative coupling configurations, including a proximal open air optical coupling alignment configuration, and or an angled alignment coupling configuration.
Figure 6:
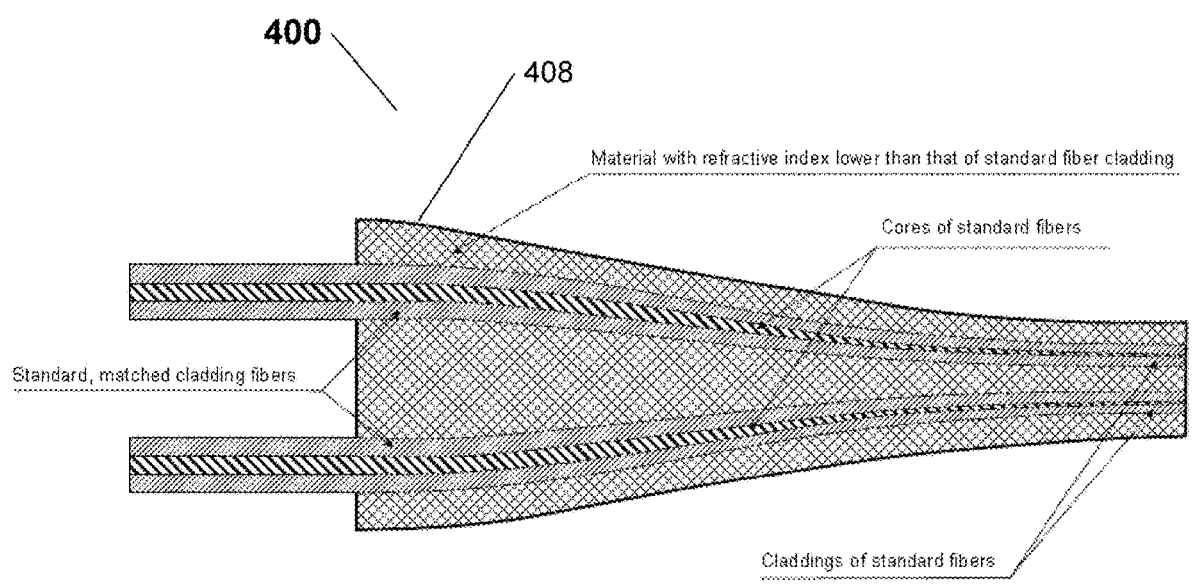
FIG. 6 is a schematic diagram of a cross-sectional view of a previously known optical fiber coupler having various drawbacks and disadvantages readily overcome by the various embodiments of the optical fiber coupler array of FIGS. 1A to 5.

Referring now to FIG. 5 a second end 322 (i.e. "tip") of the optical fiber coupler array is shown, by way of example, as being in the process of connecting to plural edge coupling elements 326 of an optical device 324 in a butt-coupled configuration, that may be readily shifted into one of several alternative coupling configuration, including a proximal open air optical coupling alignment configuration, and or an angled alignment coupling configuration.

In at least one alternative embodiment, the optical coupler array (i.e., such as optical coupler arrays 200D to 200L of FIGS. 3C to 3L) may be readily configured to pump optical fiber lasers, and/or optical fiber amplifiers (or equivalent devices). In a preferred embodiment thereof, a pumping-enabled coupler array comprises a central channel (i.e., waveguide), configured to transmit a signal (i.e., serving as a "signal channel") which will thereafter be amplified or utilized to generate lasing, and further comprises at least one additional channel (i.e., waveguide), configured to provide optical pumping functionality (i.e., each serving as a "pump channel"). In various example alternative embodiments thereof, the pumping-enabled coupler array may comprise the following in any desired combination thereof:

at least one of the following signal channels: a single mode signal channel configured for increased or optimum coupling to a single mode amplifying fiber at at least one predetermined signal or lasing wavelength, a multimode signal channel configured for increased or optimum coupling to a multimode amplifying fiber at at least one predetermined signal or lasing wavelength, and at least one of the following pumping channels: a single mode pumping channel configured for increased or optimum coupling to a single mode pump source at at least one predetermined pumping wavelength, a multimode pumping channel configured for increased or optimum coupling to a multimode pump source at at least one predetermined pumping wavelength.

Optionally, to increase or maximize pumping efficiency, the pumping-enabled coupler array may be configured to selectively utilize less than all the available pumping channels. It should also be noted that, as a matter of design choice, and without departing from the spirit of the invention, the pumping-enabled coupler array may be configured to comprise:

a. At least one signal channel, each disposed in a predetermined desired position in the coupler array structure;

b. At least one pumping channel, each disposed in a predetermined desired position in the coupler array structure; and c. Optionally—at least one additional waveguide for at least one additional purpose other than signal transmission or pumping (e.g., such as a fiducial marker for alignment, for fault detection, for data transmission, etc.)

Advantageously, the pump channels could be positioned in any transverse position within the coupler, including along the central longitudinal axis. The pump channels may also comprise, but are not limited to, at least one of any of the following optical fiber types: SM, MM, LMA, or VC waveguides. Optionally, any of the optical fiber(s) being utilized as an optical pump channel (regardless of the fiber type) in the coupler may comprise polarization maintaining properties.

In yet another example embodiment, the pumping-enabled coupler array may be configured to be optimized for coupling to a double-clad fiber—in this case, the signal channel of the coupler array would be configured or optimized for coupling to the signal channel of the double-clad fiber, while each of the at least one pumping channels would be configured or optimized to couple to the inner cladding of the double-clad fiber.

In essence, the optical coupler arrays, shown by way of example in various embodiments, may also be readily implemented as high density, multi-channel, optical input/output (I/O) for fiber-to-chip and fiber-to-optical waveguides. The optical fiber couplers may readily comprise at least the following features:

Dramatically reduced channel spacing and device footprint (as compared to previously known solutions)
Scalable channel count
All-glass optical path
Readily butt-coupled or spliced at their high density face without the need of a lens, air gap, or a beam spreading medium
May be fabricated through a semi-automated production process
Broad range of customizable parameters: wavelength, mode field size, channel spacing, array configuration, fiber type.

The optical fiber couplers may be advantageously utilized for at least the following applications, as a matter of design choice or convenience, without departing from the spirit of the invention:

Coupling to waveguides:
  PIC or PCB-based (single-mode or multimode)
  Multicore fibers
  Chip edge (1D) or chip face (2D) coupling
  NA optimized for the application, factoring in:
    Packaging alignment needs
    Chip processing needs/waveguide up-tapering
  Polarization maintaining properties may be readily configured
Coupling to chip-based devices: e.g. VCSELs, photodiodes, vertically coupled gratings
Laser diode coupling
High density equipment Input/Output (I/O)

Figure 7:
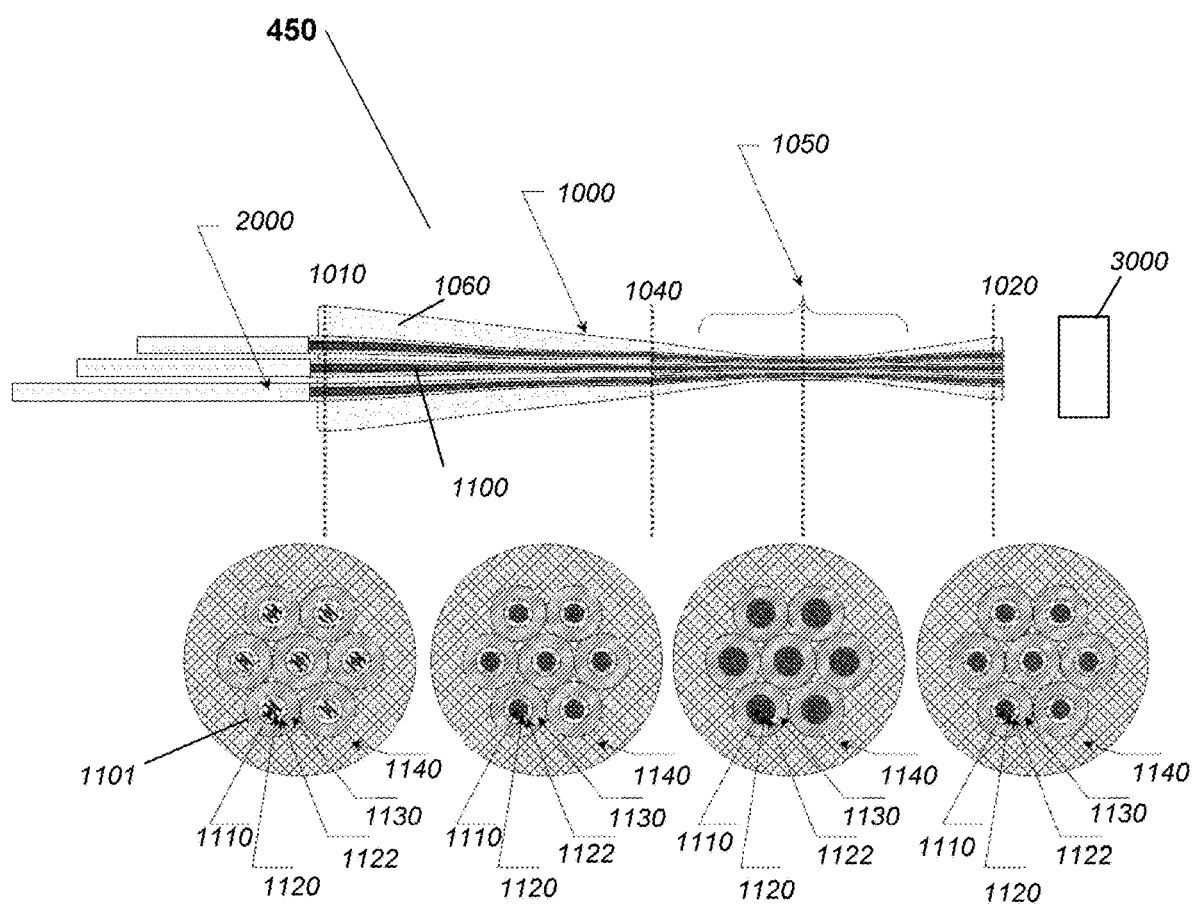
FIG. 7 is a schematic diagram, in various views, of a flexible pitch reducing optical fiber array (PROFA)

Accordingly, when implemented, the various example embodiments of the optical fiber couplers comprise at least the following advantages, as compared to currently available competitive solutions:

Unprecedented density
Low-loss coupling (<0.5 dB)
Operational stability
Form factor support
Broad spectral range
Matching NA
Scalable channel count
Polarization maintenance Referring now to FIG. 7, at least one example embodiment of a flexible optical coupler array is shown as a flexible pitch reducing optical fiber array (PROFA) coupler 450. Although various features of the example PROFA coupler may be described with respect to FIG. 7, any feature described above can be implemented in any combination with a flexible PROFA coupler. For example, any of the features described with respect to FIGS. 1A-5 may be utilized in a flexible PROFA coupler. Further, any feature described with respect to FIGS. 1A-5 may be combined with any feature described with respect to FIG. 7.

With continued reference to FIG. 7, the example flexible PROFA coupler 450 shown in FIG. 7 can be configured for use in applications where interconnections with low crosstalk and sufficient flexibility to accommodate low profile packaging are desired. The vanishing core approach, described herein and in U.S. Patent Application Publication No. 2013/0216184, entitled "CONFIGURABLE PITCH REDUCING OPTICAL FIBER ARRAY", which is hereby incorporated herein in its entirety, allows for the creation of a pitch reducing optical fiber array (PROFA) coupler/interconnect operable to optically couple, for example, a plurality of optical fibers to an optical device (e.g., a PIC), which can be butt-coupled to an array of vertical grating couplers (VGCs). If the cross sectional structure of the coupler 450 has an additional layer of refractive index, N-2A, even lower than N2, as described herein and in U.S. Patent Application Publication No. 2013/0216184, the vanishing core approach can be utilized once more to reduce the outside diameter further without substantially compromising the channel crosstalk. This further reduction can advantageously provide certain embodiments with a flexible region which has a reduced cross section between a first and second end.

In some preferred embodiments, the difference (N-2A minus N-3) is larger than the differences (N-2 minus N-2A) or (N-1 minus N-2), resulting in a high NA, bend insensitive waveguide, when the light is guided by the additional layer having refractive index N-2A. Also, in some preferred embodiments, after the outside diameter of the coupler 450 is reduced along a longitudinal length from one end to form the flexible region, the outer diameter can then be expanded along the longitudinal length toward the second end, resulting in a lower NA waveguide with larger coupling surface area at the second end.

For example, as illustrated in FIG. 7, certain embodiments of an optical coupler array 450 can comprise an elongated optical element 1000 having a first end 1010, a second end 1020, and a flexible portion 1050 therebetween. The optical element 1000 can include a coupler housing structure 1060 and a plurality of longitudinal waveguides 1100 embedded in the housing structure 1060. The waveguides 1100 can be arranged with respect to one another in a cross-sectional geometric waveguide arrangement. In FIG. 7, the example cross-sectional geometric waveguide arrangements of the waveguides 1100 for the first end 1010, the second end 1020, and at a location within the flexible portion 1050 are shown. The cross-sectional geometric waveguide arrangement of the waveguides 1100 for an intermediate location 1040 between the first end 1010 and the flexible portion 1050 is also shown. As illustrated by the shaded regions within the cross sections and as will be described herein, light can be guided through the optical element 1000 from the first end 1010 to the second end 1020 through the flexible portion 1050. As also shown in FIG. 7, this can result in a structure, which maintains all channels discretely with sufficiently low crosstalk, while providing enough flexibility (e.g., with the flexible portion 1050) to accommodate low profile packaging.

The level of crosstalk and/or flexibility can depend on the application of the array. For example, in some embodiments, a low crosstalk can be considered within a range from −45 dB to −35 dB, while in other embodiments, a low crosstalk can be considered within a range from −15 dB to −5 dB. Accordingly, the level of crosstalk is not particularly limited. In some embodiments, the crosstalk can be less than or equal to −55 dB, −50 dB, −45 dB, −40 dB, −35 dB, −30 dB, −25 dB, −20 dB, −15 dB, −10 dB, 0 dB, or any values therebetween (e.g., less than or equal to −37 dB, −27 dB, −17 dB, −5 dB, etc.) In some embodiments, the crosstalk can be within a range from −50 dB to −40 dB, from −40 dB to −30 dB, from −30 dB to −20 dB, from −20 dB to −10 dB, from −10 dB to 0 dB, from −45 dB to −35 dB, from −35 dB to −25 dB, from −25 dB to −15 dB, from −15 dB to −5 dB, from −10 dB to 0 dB, any combinations of these ranges, or any ranges formed from any values from −55 dB to 0 dB (e.g., from −52 dB to −37 dB, from −48 dB to −32 dB, etc.).

The flexibility can also depend on the application of the array. For example, in some embodiments, good flexibility of the flexible portion 1050 can comprise bending of at least 90 degrees, while in other embodiments, a bending of at least 50 degrees may be acceptable. Accordingly, the flexibility is not particularly limited. In some embodiments, the flexibility can be at least 45 degrees, 50 degrees, 55 degrees, 60 degrees, 65 degrees, 70 degrees, 75 degrees, 80 degrees, 90 degrees, 100 degrees, 110 degrees, 120 degrees, or at least any value therebetween. In some embodiments, the flexible portion 1050 can bend in a range formed by any of these values, e.g., from 45 to 55 degrees, from 50 to 60 degrees, from 60 to 70 degrees, from 70 to 80 degrees, from 80 to 90 degrees, from 90 to 100 degrees, from 100 to 110 degrees, from 110 to 120 degrees, or any combinations of these ranges, or any ranges formed by any values within these ranges (e.g., from 50 to 65 degrees, from 50 to 85 degrees, from 65 to 90 degrees, etc.) In other embodiments, the flexible portion 1050 can bend more or less than these values. Bending can typically be associated with light scattering. However, various embodiments can be configured to bend as described herein (e.g., in one of the ranges described above) and achieve relatively low crosstalk as described herein (e.g., in one of the ranges described above).

In various applications, the flexible portion 1050 might not bend in use, however the flexibility can be desired for decoupling the first 1010 or second 1020 end from other parts of the coupler array 450. For example, the flexible portion 1050 of the flexible PROFA coupler 450 can provide mechanical isolation of the first end 1010 (e.g., a PROFA-PIC interface) from the rest of the PROFA, which results in increased stability with respect to environmental fluctuations, including temperature variations and mechanical shock and vibration.

In the example shown in FIG. 7, the coupler array 450 can be operable to optically couple with a plurality of optical fibers 2000 and/or with an optical device 3000. The optical fibers 2000 and optical device 3000 can include any of those described herein. The coupler array 450 can couple with the optical fibers 2000 via the plurality of waveguides 1100 at the first end 1010. In addition, the coupler array 450 can couple with the optical device 3000 via the plurality of waveguides 1100 at the second end 1020. As described herein, the plurality of waveguides 1100 can include at least one VC waveguide 1101. FIG. 7 illustrates all of the waveguides 1100 as VC waveguides. However, one or more Non-VC waveguides may also be used. In addition, FIG. 7 illustrates 7 VC waveguides, yet any number of VC and/or Non-VC waveguides can be used.

As also shown in the cross sections, each of the waveguides 1100 can be disposed at an individual corresponding cross-sectional geometric position, relative to other waveguides of the plurality of waveguides 1100. Although FIG. 7 shows a waveguide surrounded by 6 other waveguides, the cross-sectional geometric waveguide arrangement is not limited and can include any arrangement known in the art or yet to be developed including any of those shown in FIGS. 3A-3L.

As described herein, the VC waveguide 1101 can include an inner core (e.g., an inner vanishing core) 1110, an outer core 1120, and an outer cladding 1130 with refractive indices N-1, N-2, and N-3 respectively. As shown in FIG. 7, the VC waveguide 1101 can also include a secondary outer core 1122 (e.g., between the outer core 1120 and the outer cladding 1130) having refractive index N-2A. As the outer core 1120 can longitudinally surround the inner core 1110, the secondary outer core 1122 can longitudinally surround the outer core 1120 with the outer cladding 1130 longitudinally surrounding the secondary outer core 1122. In various embodiments, the relationship between the refractive indices of the inner core 1110, outer core 1120, secondary outer core 1122, and outer cladding 1130 can advantageously be N-1>N-2>N2-A>N-3. With such a relationship, each surrounding layer can serve as an effective cladding to the layers within it (e.g., the outer core 1120 can serve as an effective cladding to the inner core 1110, and the secondary outer core 1122 can serve as an effective cladding to the outer core 1120). Hence, the use of the secondary outer core 1122 can provide an additional set of core and cladding.

By including the secondary outer core 1122 with a refractive index N-2A, certain embodiments can achieve a higher NA (e.g., compared to without the secondary outer core 1122). In various embodiments, the difference (N-2A minus N-3) can be larger than the differences (N-2 minus N-2A) or (N-1 minus N-2) to result in a relatively high NA. Increasing NA can reduce the MFD, allowing for the channels (e.g., waveguides 1100) to be closer to each other (e.g., closer spacing between the waveguides 1100) without compromising crosstalk. Accordingly, the coupler array 450 can be reduced further in cross section (e.g., compared to without the secondary outer core 1122) to provide a reduced region when light is guided by the secondary outer core 1122. By providing a reduced region between the first end 1010 and the second end 1020, certain embodiments can include a flexible portion 1050 which can be more flexible than the regions proximal to the first end 1010 and the second end 1020.

For example, the inner core 1110 size, the outer core 1120 size, and the spacing between the waveguides 1100 can reduce (e.g., simultaneously and gradually in some instances) along the optical element 1000 from the first end 1010 to the intermediate location 1040 such that at the intermediate location 1040, the inner core 1110 size is insufficient to guide light therethrough and the outer core 1120 size is sufficient to guide at least one optical mode. In certain embodiments, each waveguide 1100 can have a capacity for at least one optical mode (e.g., single mode or multi-mode). For example, at the first end 1010, the VC waveguide 1101 can support a number of spatial modes (M1) within the inner core 1110. At the intermediate location 1040, in various embodiments, the inner core 1110 may no longer be able to support all the M1 modes (e.g., cannot support light propagation). However, in some such embodiments, at the intermediate location 1040, the outer core 1120 can be able to support all the M1 modes (and in some cases, able to support additional modes). In this example, light traveling within the inner core 1110 from the first end 1010 to the intermediate location 1040 can escape from the inner core 1110 into the outer core 1120 such that light can propagate within both the inner core 1110 and outer core 1120.

In addition, the outer core 1120 size, the secondary outer core 1122 size, and the spacing between the waveguides 1100 can reduce (e.g., simultaneously and gradually in some instances) along said optical element 1000, for example, from the intermediate location 1040 to the flexible portion 1050 such that at the flexible portion 1050, the outer core 1120 size is insufficient to guide light therethrough and the secondary outer core 1122 size is sufficient to guide at least one optical mode therethrough. In certain embodiments, at the intermediate location 1040, the VC waveguide 1101 can support all the M1 modes within the outer core 1120. At the flexible portion 1050, in various embodiments, the outer core 1120 may be no longer able to support all the M1 modes (e.g., cannot support light propagation). However, in some such embodiments, at the flexible portion 1050, the secondary outer core 1122 can be able to support all the M1 modes (and in some cases, able to support additional modes). In this example, light traveling within the outer core 1120 from the intermediate location 1040 to the flexible portion 1050 can escape from the outer core 1120 into the secondary outer core 1122 such that light can propagate within the inner core 1110, the outer core 1120, and secondary outer core 1122.

Furthermore, the outer core 1120 size, the secondary outer core 1122 size, and the spacing between the waveguides 1100 can expand (e.g., simultaneously and gradually in some instances) along the optical element 1000 from the flexible portion 1050 to the second end 1020 such that at the second end 1020, the secondary outer core 1122 size is insufficient to guide light therethrough and the outer core 1120 size is sufficient to guide at least one optical mode therethrough. In certain embodiments, at the second end 1020, in various embodiments, the secondary outer core 1122 may no longer be able to support all the M1 modes (e.g., cannot support light propagation). However, in some such embodiments, at the second end 1020, the outer core 1120 can be able to support all the M1 modes (and in some cases, able to support additional modes). In this example, light traveling within the secondary outer core 1122 from the flexible portion 1050 to the second end 1020 can return and propagate only within the inner core 1110 and the outer core 1120.

It would be appreciated that light travelling from the second end 1020 to the first end 1010 can behave in the reverse manner. For example, the outer core 1120 size, the secondary outer core 1122 size, and spacing between the waveguides 1100 can reduce (e.g., simultaneously and gradually in some instances) along the optical element 1000 from the second end 1020 to the flexible portion 1050 such that at the flexible portion 1050, the outer core 1120 size is insufficient to guide light therethrough and the secondary outer core 1122 size is sufficient to guide at least one optical mode therethrough.

The reduction in cross-sectional core and cladding sizes can advantageously provide rigidity and flexibility in a coupler array 450. Since optical fibers 2000 and/or an optical device 3000 can be fused to the ends 1010, 1020 of the coupler array 450, rigidity at the first 1010 and second 1020 ends can be desirable. However, it can also be desirable for coupler arrays to be flexible so that they can bend to connect with low profile integrated circuits. In certain embodiments, the flexible portion 1050 between the first 1010 and second 1020 ends can allow the first 1010 and second 1020 ends to be relatively rigid, while providing the flexible portion 1050 therebetween. The flexible portion can extend over a length of the optical element 1000 and can mechanically isolate the first 1010 and second 1020 ends. For example, the flexible portion 1050 can mechanically isolate the first end 1010 from a region between the flexible portion 1050 and the second end 1020. As another example, the flexible portion 1050 can mechanically isolate the second end 1020 from a region between the first end 1010 and the flexible portion 1050. Such mechanical isolation can provide stability to the first 1010 and second 1020 ends, e.g., with respect to environmental fluctuations, including temperature variations and mechanical shock and vibration. The length of the flexible portion 1050 is not particularly limited and can depend on the application. In some examples, the length can be in a range from 2 to 7 mm, from 3 to 8 mm, from 5 to 10 mm, from 7 to 12 mm, from 8 to 15 mm, any combination of these ranges, or any range formed from any values from 2 to 20 mm (e.g., 3 to 13 mm, 4 to 14 mm, 5 to 17 mm, etc.). In other examples, the length of the flexible portion 1050 can be shorter or longer.

At the same time, the flexible portion 1050 can provide flexibility. In many instances, the flexible portion 1050 can have a substantially similar cross-sectional size (e.g., the cross-sectional size of the waveguides 1100) extending over the length of the flexible portion 1050. In certain embodiments, the cross-section size at the flexible portion 1050 can comprise a smaller cross-sectional size than the cross-sectional size at the first 1010 and second 1020 ends. Having a smaller cross-sectional size, this flexible portion 1050 can be more flexible than a region proximal to the first 1010 and second 1020 ends. The smaller cross-sectional size can result from the reduction in core and cladding sizes. An optional etching post-process may be desirable to further reduce the diameter of the flexible length of the flexible PROFA coupler 450.

In some embodiments, the flexible portion 1050 can be more flexible than a standard SMF 28 fiber. In some embodiments, the flexible portion 1050 can bend at least 45 degrees, 50 degrees, 55 degrees, 60 degrees, 65 degrees, 70 degrees, 75 degrees, 80 degrees, 90 degrees, 100 degrees, 110 degrees, 120 degrees, or at least any value therebetween. In some embodiments, the flexible portion 1050 can bend in a range formed by any of these values, e.g., from 45 to 55 degrees, from 50 to 60 degrees, from 60 to 70 degrees, from 70 to 80 degrees, from 80 to 90 degrees, from 90 to 100 degrees, from 100 to 110 degrees, from 110 to 120 degrees, or any combinations of these ranges, or any ranges formed by any values within these ranges (e.g., from 50 to 65 degrees, from 50 to 85 degrees, from 65 to 90 degrees, etc.) In other embodiments, the flexible portion 1050 can bend more or less than these values. As described herein, in various applications, the flexible portion 1050 might not bend in use, however the flexibility can be desired for decoupling the first 1010 or second 1020 end from other parts of the coupler array 450.

The coupler array 450 can include a coupler housing structure 1060. For example, the coupler housing structure 1060 can include a common single coupler housing structure. In certain embodiments, the coupler housing structure 1060 can include a medium 1140 (e.g., having a refractive index N-4) surrounding the waveguides 1100. In some instances, N-4 is greater than N-3. In other examples, N-4 is equal to N-3. The medium 1140 can include any medium as described herein (e.g., pure-silica). The medium can also include glass such that the coupler array 450 can be an all-glass coupler array. The waveguides 1100 can be embedded within the medium 1040 of the housing structure 1060. In some examples, a total volume of the medium 1140 of the coupler housing structure 1060 can be greater than a total volume of all the inner and outer cores 1110, 1120, 1122 of the VC waveguides confined within the coupler housing structure 1060.

In some embodiments, each waveguide can couple to the optical fibers 2000 and/or optical device 3000 at a location inside, outside, or at a boundary region of the coupler housing structure 1060, e.g., as shown in FIGS. 1A to 2D. Because the optical fibers 2000 and optical device 3000 can be different at each end, the first end 1010 and the second end 1020 can each be configured for the optical fibers 2000 or optical device 3000 with which it is coupled. For example, the MFD of the VC waveguide at the first 1010 and/or second 1020 ends can be configured (e.g., using the sizes of the cores) to match or substantially match the MFD of the optical fiber 2000 or optical device 3000 with which it is coupled. In addition, the NA of the VC waveguide at the first 1010 and/or second 1020 ends can be configured (e.g., using the refractive indices) to match or substantially match the NA of the optical fiber 2000 or optical device 3000 with which it is coupled. The refractive indices can be modified in any way known in the art (e.g., doping the waveguide glass) or yet to be developed. In various embodiments, as described herein, the difference (N-1 minus N-2) can be greater than the difference (N-2 minus N-2A) such that the NA at the first end 1010 is greater than the NA at the second end 1020. In other embodiments, the difference (N-1 minus N-2) can be less than the difference (N-2 minus N-2A) such that the NA at the first end 1010 is less than the NA at the second end 1020. In yet other embodiments, the difference (N-1 minus N-2) can be equal to (N-2 minus N-2A) such that the NA at the first end 1010 is equal to the NA at the second end 1020. The VC waveguide can include any of the fiber types described herein including but not limited to a single mode fiber, a multi-mode fiber, and/or a polarization maintaining fiber.

The core and cladding (1110, 1120, 1122, 1130) sizes (e.g., outer cross-sectional diameters if circular or outer cross-sectional dimensions if not circular) are not particularly limited. In some embodiments, the inner 1110 and/or outer 1120 core sizes can be in a range from 1 to 3 microns, from 2 to 5 microns, from 4 to 8 microns, from 5 to 10 microns, any combination of these ranges, or any range formed from any values from 1 to 10 microns (e.g., 2 to 8 microns, 3 to 9 microns, etc.). However, the sizes can be greater or less. For example, the inner 1110 and/or outer 1120 core sizes can range from submicrons to many microns, to tens of microns, to hundreds of microns depending, for example, on the wavelength and/or number of modes desired.

In addition, the difference in the refractive indices (e.g., between N-1 and N-2, between N-2 and N-2A, and/or between N-2A and N-3) is not particularly limited. In some examples, the index difference can be in a range from $1.5 \times 10^{-3}$ to $2.5 \times 10^{-3}$, from $1.7 \times 10^{-3}$ to $2.3 \times 10^{-3}$, from $1.8 \times 10^{-3}$ to $2.2 \times 10^{-3}$, from $1.9 \times 10^{-3}$ to $2.1 \times 10^{-3}$, from $1.5 \times 10^{-3}$ to $1.7 \times 10^{-3}$, from $1.7 \times 10^{-3}$ to $1.9 \times 10^{-3}$, from $1.9 \times 10^{-3}$ to $2.1 \times 10^{-3}$, from $2.1 \times 10^{-3}$ to $2.3 \times 10^{-3}$, from $2.3 \times 10^{-3}$ to $2.5 \times 10^{-3}$, any combination of these ranges, or any range formed from any values from $1.5 \times 10^{-3}$ to $2.5 \times 10^{-3}$. In other examples, the index difference can be greater or less.

As described herein, the optical device 3000 can include a PIC. The PIC can include an array of VGCs. Also, as described in U.S. Patent Application Publication 2012/0257857, entitled "HIGH DENSITY OPTICAL PACKAGING HEADER APPARATUS", which is hereby incorporated herein in its entirety, multiple flexible PROFA couplers (such as the coupler 450), each having multiple optical channels, can be combined together to advantageously form an optical multi-port input/output (IO) interface. As such, an optical multi-port IO interface can include a plurality of optical coupler arrays, at least one of the optical coupler arrays can include an optical coupler array 450 as described herein.

Figure 9:
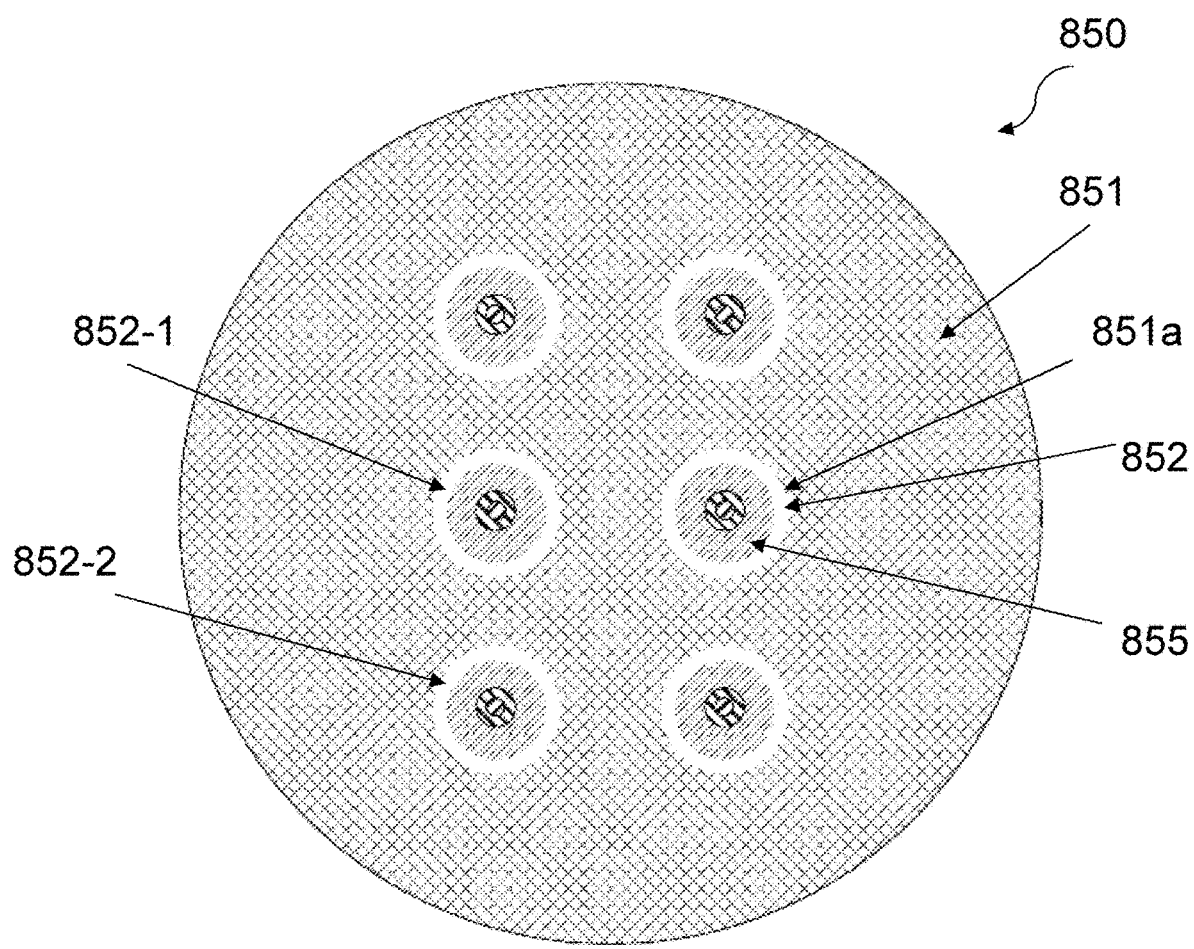
FIG. 9 is a schematic diagram of a cross-sectional view of another example configuration of the housing structure at a proximity to a first end of the optical coupler array.

With reference now to FIG. 8 and FIG. 9, example cross sectional views of the housing structure at a proximity to a first end of a multichannel optical coupler array are shown. The cross-sectional view is orthogonal to the longitudinal direction or length of the optical coupler array. Some such configurations may have improved cross sectional or transverse (or lateral) positioning of waveguides at the first end allowing for self-aligning waveguide arrangement at a close proximity to a first end (e.g., hexagonal close packed arrangement in a housing structure having circular (as shown in FIG. 8) or hexagonal inner cross section) and improved (precise or near precise in some cases) cross sectional positioning of the waveguides at a second end. Such configurations may also provide alignment during manufacturing such that the cross sectional positioning of the waveguides at a second end may be more precisely disposed as desired.

Although various features of the example optical coupler arrays may be described with respect to FIGS. 8 and 9, any feature described above (for example, in connection with any of the figures or embodiments describe above) can be implemented in any combination with a multichannel optical coupler array. For example, any of the features described with respect to FIGS. 1A-5 and 7 may be utilized in a multichannel optical coupler array and may be combined with any feature described with respect to FIGS. 8 and 9.

For example, referring to the example embodiments shown in FIGS. 1A-2D, there are two ends of the coupler array: a first (larger) end, and a second (smaller) end. The two ends are spaced apart in the longitudinal direction (along the z direction). For example, in FIG. 1A, the first end is proximate to position B and the second end is proximate to positions C and D.

In certain embodiments, one of the functions of the first end (proximate to position B) is to encapsulate the waveguides 30A, 32A-1, 32A-2 with increased or approximate positioning accuracy. For example, the coupler housing structure 14A at a proximity to the first end (proximate to position B) may encapsulate, e.g., circumferentially surround a portion of the length of the waveguides 30A, 32A-1, 32A-2, but not necessarily completely enclose the ends of the waveguides 30A, 32A-1, 32A-2. In some such instances, the waveguides 30A, 32A-1, 32A-2 may or may not extend (e.g., longitudinally) outside the coupler housing structure 14A. In FIG. 1A, proximate the first end, the end of waveguide 30A is disposed within the coupler housing structure 14A, but the ends of waveguides 32A-1 and 32A-2 extend, e.g., longitudinally (in a direction parallel to the z-direction) outside of the coupler housing structure 14A. In FIG. 2B, proximate the first end, the ends of waveguides 130B-1, 130B-2 are disposed at an outer cross sectional boundary region of the coupler housing structure 14A and do not extend, e.g., longitudinally (in a direction parallel to the z-direction) outside of the coupler housing structure 14A.

In various embodiments, one of the functions of the second end (proximate to positions C and D) is to have the waveguides 30A, 32A-1, 32A-2 embedded in a housing structure (e.g., a common housing structure in some instances) with improved (precise or near precise in some cases) cross sectional positioning. For example, the waveguides 30A, 32A-1, 32A-2 at a proximity to the second end (proximate to positions C and D) may be embedded, e.g., be circumferentially surrounded by the contiguous coupler housing structure 14A. In FIG. 1A, proximate the second end, the ends of waveguides 30A, 32A-1, 32A-2 are longitudinally disposed at an outer cross sectional boundary region of the coupler housing structure 14A. In some embodiments, proximate the second end, one or more ends of the waveguides may be disposed within or may longitudinally extend outside the coupler housing structure 14A.

To achieve improved positioning, some embodiments can include the example cross sectional configuration of the housing structure shown in FIG. 8 at a proximity to the first end. The cross section is orthogonal to the longitudinal direction or length of the optical coupler array. As shown in FIG. 8, the coupler array 800 can include a housing structure 801 having a transverse (or lateral) configuration of a ring surrounding the plurality of longitudinal waveguides 805 at a close longitudinal proximity to the first end. A gap, such as an air gap, may separate the plurality of longitudinal waveguides 805 from the surrounding ring. Some such configurations may allow for self-aligning waveguide arrangement at a close proximity to a first end (e.g., hexagonal close packed arrangement in a housing structure having circular (as shown in FIG. 8) or hexagonal inner cross section)

In an example configuration shown in FIG. 8, the waveguides 805 are in a hexagonal arrangement. Other arrangements are possible, e.g., square, rectangular, etc.

The ring may have an inner cross section 801a (in the transverse direction, i.e., orthogonal to the longitudinal direction or length of the optical coupler array) that is circular or non-circular. For example, the inner cross section 801a may be circular, elliptical, D-shaped, square, rectangular, hexagonal, pentagonal, octagonal, other polygonal shape, etc. The inner cross section 801a does not necessarily follow the arrangement of the waveguides 805. For example, four waveguides arranged in a square arrangement can be confined in an inner circular cross section. As another example, as shown in FIG. 8, the inner cross section 801a is circular, while the waveguides 805 are hexagonally arranged. In some embodiments, a circular inner cross section, as shown in FIG. 8, may be a preferred shape, which can allow for a close-pack hexagonal arrangement. Also, other inner cross sectional shapes may also be used, such as square or rectangular, which can allow for non-hexagonal waveguide arrangements. In some instances, the inner cross section 801a may be similar as the arrangement of the waveguides 805 to reduce empty space. For example, for waveguides 805 in a hexagonal arrangement, the inner cross section 801a of the ring may be hexagonal to reduce empty space between the inner cross section 801a and the waveguides 805.

The outer cross section 801b (in the transverse direction, e.g., orthogonal to the longitudinal direction or length of the optical coupler array) may be circular or non-circular. For example, the outer cross section 801b may be circular, elliptical, hexagonal, D-shaped (e.g., to provide for passive axial alignment of the coupler since the flat surface allow for an easy rotational alignment), square, rectangular, pentagonal, octagonal, other polygonal shape, etc. In FIG. 8, the outer cross section 801b (e.g., circular) follows the shape of the inner cross section 801a (e.g., circular). However, in some embodiments, the outer cross section 801b need not be similar as the inner cross section 801a. One of the functions of the inner cross sectional shape is to allow for an improvement in the transverse positional accuracy at the proximity to the second end, while one of the functions of the outer cross sectional shape is to allow for a passive axial alignment of the coupler (e.g., the alignment can be done without launching light into the coupler). In some configurations it may be preferred to substantially preserve the outer cross sectional shape from the first end to the second end to facilitate the passive alignment at one of the ends or at both ends of the coupler array.

FIG. 9 shows another example cross sectional configuration of the housing structure at a proximity to the first end. As shown in FIG. 9, the coupler array 850 can include a housing structure 851 having a configuration of a structure (e.g., a contiguous structure in some cases) with a plurality of holes 852. At least one of the holes 852 may contain at least one of the longitudinal waveguides 855. A gap, such as an air gap, may separate the plurality of longitudinal waveguides 855 from the surrounding housing structure 851. Similarly to the description related to the example shown in FIG. 8, the outer cross section may be circular, elliptical, hexagonal, D-shaped, square, rectangular, pentagonal, octagonal, other polygonal shape, etc. Some of such configurations may allow for passive alignment at one of the ends or at both ends of the coupler array. While the example configuration shown in FIG. 8 may allow for simpler fabrication in some cases, the example configuration shown in FIG. 9 may allow for arbitrary transverse waveguide positioning.

FIG. 9 shows an example configuration with six holes 852, yet other number of holes is possible. The holes 852 in this example configuration may be isolated or some or even all holes 852 may be connected. For example, as shown in FIG. 9, a first hole 852-1 is isolated from a second hole 852-2. However, in some configurations, the first hole 852-1 may be connected to at least one second hole 852-2. The arrangement of the holes 852 is shown as a 3×2 array, yet other arrangements are possible. For example, the hole arrangement pattern may be hexagonal, square, rectangular, or defined by an XY array defining positions of the holes in the transverse plane.

FIG. 9 shows all the holes 852 with a waveguide 855 illustrated as a vanishing core (VC) waveguide. However, while at least one of the waveguide in this example is a VC waveguide, one or more of the holes 852 may include a non-vanishing core (Non-VC) waveguide. The VC or Non-VC waveguide 855 can include any of the waveguides described herein, e.g., single mode fiber, multi-mode fiber, polarization maintaining fiber, etc. In some embodiments, one or more of the holes 852 may be empty, or populated with the other (e.g., non-waveguide) material, e.g., to serve as fiducial marks. One or more of the holes 852 may be populated with a single waveguide 855 (in some preferred configurations) as shown in FIG. 9 or with multiple waveguides 855. Depending on the design, one or more of the holes 852 may be identical or different than another hole 852 to accommodate, for example, waveguides 855 of different shapes and dimensions (e.g., cross sectional shapes, diameters, major/minor elliptical dimensions, etc.). The cross sections of the holes 852 may be circular or non-circular. For example, the cross section may be circular, elliptical, hexagonal or D-shaped (e.g., to provide for passive axial alignment of polarization maintaining (PM) channels), square, rectangular, pentagonal, octagonal, other polygonal shape, etc. As illustrated, in many cases, the cross section of the hole 852 at close proximity to the first end is larger than the cross section of the waveguides 855 such that a gap is disposed between an inner surface 851*a* of the coupler housing structure 851 and the waveguide 855.

The coupler housing structure (e.g., 801 in FIG. 8 or 851 in FIG. 9) can include a medium from a wide range of materials as described herein. As also described herein, the medium of the coupler housing structure 801, 851 can have refractive index (N-4). The medium can be a transversely contiguous medium. This can allow for a robust housing structure with improved transverse positioning accuracy in some embodiments. In some embodiments, the total volume of the medium of the coupler housing structure 801, 851 can be greater than a total volume of all the inner and outer cores of the VC waveguides confined within the coupler housing structure 801, 851 to provide that in some embodiments, all VC waveguides are reliably embedded in the housing structure allowing for stable performance).

In certain embodiments, the example configurations shown in FIG. 8 and FIG. 9 may allow for improved manufacturability of the devices with improved cross sectional (transverse) positioning of the waveguides e.g., at the second end. This transverse position, may for example, be defined in the x and/or y directions, while z is the direction along the length coupler array (e.g., from the first end to the second end). In various fabrication approaches, the assembly, comprising the waveguides (e.g., 805 in FIGS. 8 and 855 in FIG. 9) and coupler housing structure (e.g., 801 in FIG. 8 or 851 in FIG. 9), may be heated and drawn to form a second end as shown in the lateral cross sectional views shown in FIGS. 3A-3L. Referring to FIG. 8, the waveguides 805 can be inserted into the coupler housing structure 801 having a configuration of a ring (in the cross section orthogonal to the longitudinal direction or length of the optical coupler array, e.g., in the x-y plane shown). As described above, a gap such as an air gap can be disposed between the coupler housing structure 801 and the waveguide 805 to permit lateral movement (in x and/or y directions) of the waveguide with respect to the coupler housing structure 801. Referring to FIG. 9, one or more waveguides 855 can be inserted into the coupler housing structure 851 having a plurality of holes 852 (e.g., as seen in the cross section orthogonal to the longitudinal direction or length of the optical coupler array, e.g., in the x-y plane shown) where the waveguides 855 can be passively aligned within the housing structure 851. A gap such as an air gap can be disposed between the coupler housing structure 851 and the waveguide 855 to permit transverse movement (in x and/or y directions) of the waveguide with respect to the coupler housing structure 851. In the case of close packed waveguide arrangement (e.g., hexagonal), this ability to move can result in more precise cross sectional positioning at the second end after manufacturing.

Referring to FIG. 1A, the coupler array can include a plurality of longitudinal waveguides 30A, 32A-1, 32A-2 with at least one VC waveguide 30A having an inner core 20A and an outer core 22A. The inner core 20A, the outer core 22A, and the spacing between the plurality of waveguides 30A, 32A-1, 32A-2 can reduce (e.g., simultaneously and gradually in some cases) from the first end (proximate to position B) to the second end (proximate to positions C and D), e.g., from S-1 to S-2. In various embodiments, the cross sectional configuration at the first end (proximate position B) is shown as in FIG. 8 or FIG. 9, while the cross sectional configuration at the second end (proximate positions C and D) can be shown in FIGS. 3A-3L or FIG. 7. In some embodiments, proximate to the second end, there is substantially no gap between the coupler housing structure and the waveguides, some gaps being filled by housing material and some gaps being filled by waveguide cladding material. As a result of the described cross sectional configuration at the first end, the cross sectional or transverse positioning of the waveguides at the second end can be improved. The waveguides at the second end can thus be properly aligned in the transverse direction (e.g., x and/or y direction) with an optical device.

Figure 10:
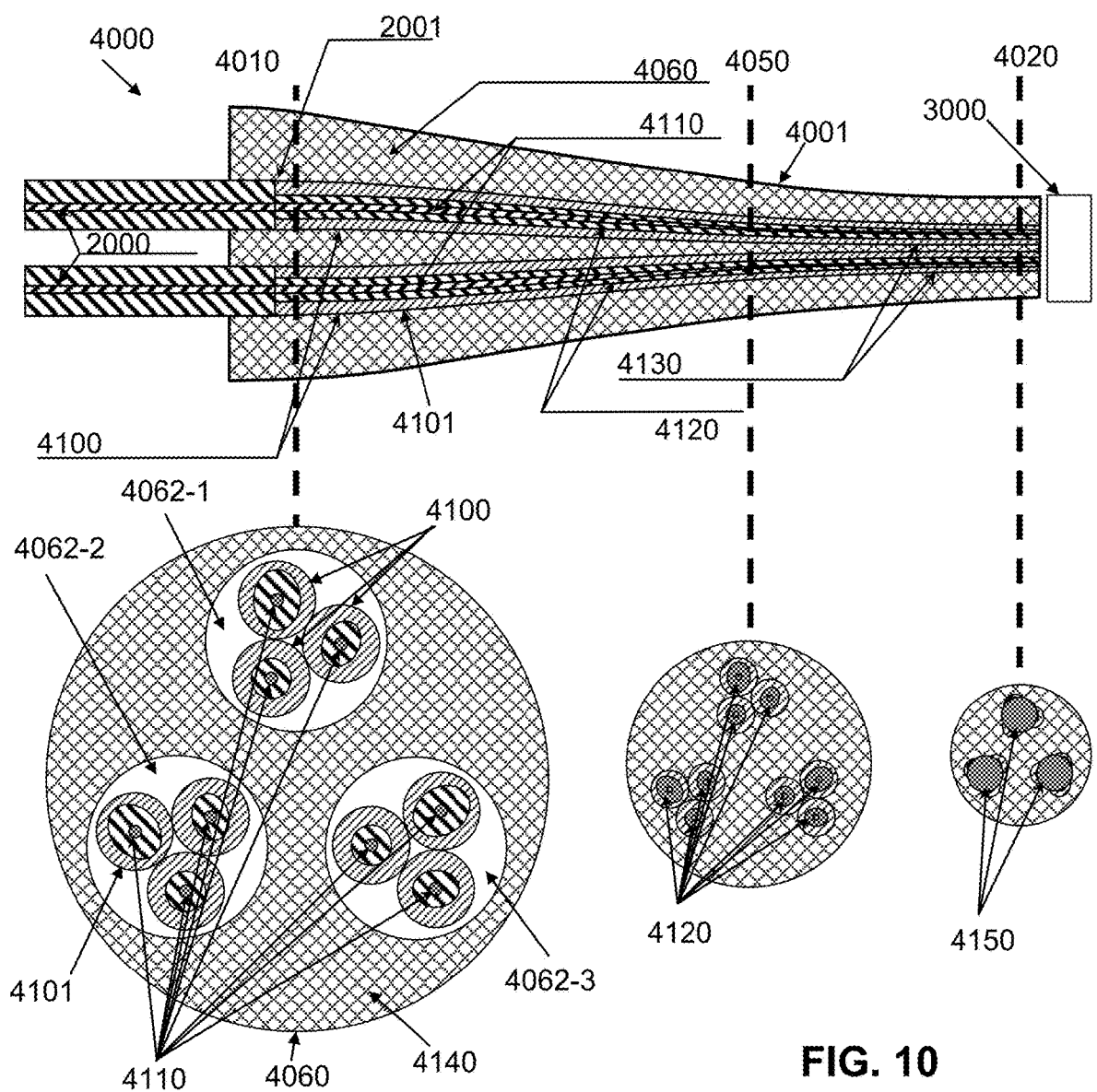
FIG. 10 and FIG. 11 are schematic diagrams, in various views, of additional example optical coupler arrays.
Figure 11:
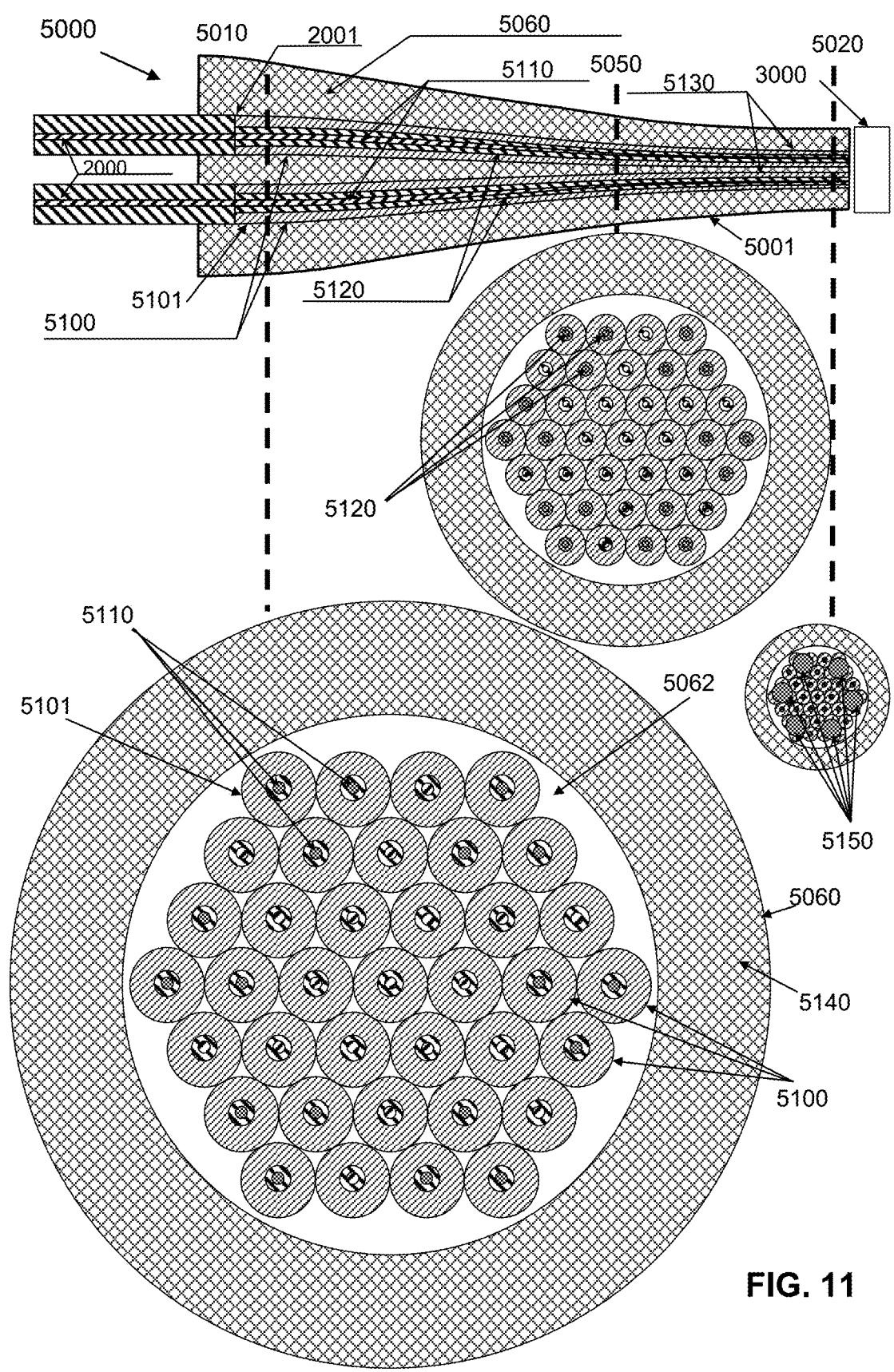

With reference now to FIG. 10 and FIG. 11, further example embodiments of optical coupler arrays 4000, 5000 are shown. The coupler arrays 4000, 5000 can be configured to couple to and from a plurality of optical fibers, such as to and from optical fibers with different mode fields and/or core sizes. In some instances, the coupler arrays 4000, 5000 can be configured to provide coupling between a set of individual isolated optical fibers 2000 and an optical device 3000 having at least one optical channel allowing for propagation of more than one optical mode. In some preferred embodiments, all isolated optical fibers 2000 can be identical (or some different in some instances) and the optical device 3000 can include at least one few-mode fiber, multimode fiber, multicore single mode fiber, multicore few-mode fiber, and/or multicore multimode fiber. Compared to certain embodiments described herein with respect to FIGS. 1A-5, various embodiments 4000, 5000 can include a further reduction of the taper diameter, which can allow light to escape the outer core 4120, 5120 and propagate in a combined waveguide 4150, 5150, formed by at least two neighboring cores. Accordingly, various embodiments described herein can be configured to optically couple between fibers with dissimilar mode fields and/or core shapes or sizes. Advantageously, some embodiments of the coupler arrays can improve and/or optimize optical coupling between one or more of single mode fibers, few-mode fibers, multimode fibers, multicore single mode fibers, multicore few-mode fibers, and/or multicore multimode fibers.

Although various features of the example coupler arrays will now be described with respect to FIGS. 10 and 11, any described feature can be implemented in any combination with the coupler arrays described with respect to FIGS. 1A-5 and 7. Further, any feature described with respect to FIGS. 1A-5 and 7 may be combined with any feature described with respect to FIGS. 10 and 11. For instance, the example coupler arrays 4000, 5000 are illustrated utilizing housing structures 4060, 5060 similar to the housing structures 801, 851 shown in FIGS. 8-9. In these examples, the cross sectional configuration of the housing structure 4060, 5060 may include a structure with a plurality of holes (e.g., multi-hole) as shown in FIG. 10, or may include one hole (e.g., single-hole surrounded by a ring), as shown in FIG. 11. However, other housing structures can also be used. For example, the housing structures described with respect to FIGS. 1A-5 and 7 may be used.

Referring to FIG. 10, certain embodiments of a multichannel optical coupler array 4000 can include an elongated optical element 4001 having a first end 4010, an intermediate location or cross section 4050, and a second end 4020. The optical element 4001 can include a coupler housing structure 4060 and a plurality of longitudinal waveguides 4100 disposed in the housing structure 4060. The waveguides 4100 can be arranged with respect to one another in a cross-sectional geometric waveguide arrangement. In FIG. 10, the example cross-sectional geometric waveguide arrangements of the waveguides 4100 for the first end 4010, the intermediate cross section 4050, and the second end 4020 are shown. As illustrated by the shaded regions within the cross sections and as will be described herein, light can be guided through the optical element 4001 from the first end 4010, through the intermediate cross section 4050, and to the second end 4020.

As shown in FIG. 10, proximally (e.g. proximately) to the first end 4010, the housing structure 4060 (e.g., a common single coupler housing structure in some cases) can have a cross sectional configuration of a structure (e.g., transversely contiguous structure in some cases) with a plurality of holes 4062. FIG. 10 shows an example configuration with three circular holes 4062-1, 4062-2, 4062-3. However, the shape of the holes, number of holes, and/or arrangement of the holes are not particularly limited and can include any other shape, number, and/or arrangement including those described with respect to FIG. 9. At least one of the holes 4062 may contain at least one of the longitudinal waveguides 4100. A gap, such as an air gap, may separate the plurality of longitudinal waveguides 4100 from the surrounding housing structure 4060 proximally to the first end 4010. In some embodiments, there may be substantially no gap between the coupler housing structure 4060 and the waveguides 4100 at the intermediate location 4050 and/or at the second end 4020. For example, one or more gaps may be filled by housing material and/or waveguide cladding material. As described herein, in some embodiments, proximate to the first end 4010, there may be a gap between the coupler housing structure 4060 and the waveguides 4100, but proximate to the second end 4020, there may be substantially no gap between the coupler housing structure 4060 and the waveguides 4100 (or vice versa). In some embodiments, there may be substantially no gap between the coupler housing structure 4060 and the waveguides 4100 proximate the first end 4010, the intermediate location 4050, and/or at the second end 4020.

As described herein, the coupler array 4000 can be operable to optically couple with a plurality of optical fibers 2000 and/or with an optical device 3000. The coupler array 4000 can couple with the optical fibers 2000 via the plurality of waveguides 4100 proximate the first end 4010 (e.g., via a fusion splice 2001), and/or with the optical device 3000 via the plurality of waveguides 4100 proximate the second end 4020 (e.g., via a fusion splice not shown). In FIG. 10, three waveguides 4100 are shown in each of the three holes 4062-1, 4062-2, 4062-3. However, any number of waveguides 4100 for each of the holes 4062 can be used. In some embodiments, the number of waveguides 4100 may equal the number of optical fibers 2000 (e.g., 9 waveguides to couple with 9 optical fibers). In some other embodiments, the number of waveguides 4100 in at least one hole may equal the number of optical modes supported by a corresponding few-mode or multi-mode waveguide of the device 3000 (e.g. 3 waveguides in each of 3 holes to couple with three 3-mode cores of a multicore fiber). In various embodiments, the waveguides 4100 can be positioned within each hole 4062 at a spacing (e.g., predetermined in some instances) from one another. In some preferred embodiments of the multi-hole configuration, the individual holes 4062-1, 4062-2, 4062-3 may contain all the waveguides (e.g., fibers) intended to couple to at least one particular core of a few-mode, multimode and/or multicore fiber of an optical device. In some other embodiments, one or more additional fibers and/or dummy fibers (e.g., which might not guide light) may be utilized to create a particular geometrical arrangement of the active, light-guiding fiber waveguides.

In various embodiments, the plurality of waveguides 4100 can have a capacity for at least one optical mode (e.g., a predetermined mode field profile in some cases). The plurality of waveguides 4100 can include at least one vanishing core (VC) waveguide 4101. FIG. 10 illustrates all of the waveguides 4100 as VC waveguides. However, one or more Non-VC waveguides may also be used. As described herein, the VC waveguide 4101 can include an inner core (e.g., an inner vanishing core) 4110, an outer core 4120, and an outer cladding 4130 with refractive indices N-1, N-2, and N-3 respectively. The outer core 4120 can longitudinally surround the inner core 4110, and the outer cladding 4130 can longitudinally surrounding the outer core 4120. As described herein, the relative magnitude relationship between the refractive indices of the inner core 4110, outer core 4120, and the outer cladding 4130 can advantageously be N-1>N-2>N-3.

In various embodiments, the housing structure 4060 can surround the waveguides 4100. The coupler housing structure 4060 can include a medium 4140 having an index of refraction N-4. The medium 4140 can include any of those described herein. In some instances, a total volume of the medium 4140 of the coupler housing structure 4060 can be greater than a total volume of all the inner and outer cores 4110, 4120 of the VC waveguides confined within the coupler housing structure 4060. In some examples, the waveguides 4100 may be embedded in the housing structure 4060 (e.g., proximate the second end 4020).

In certain embodiments, the inner core 4110 waveguide dimensions, the outer core 4120 waveguide dimensions, refractive indices, and/or numerical apertures (NAs) are selected to increase and/or optimize coupling to the individual fibers 2000. In various embodiments, the outer core 4120 waveguide dimensions, refractive indices, NAs, and/or the cladding 4130 dimensions are selected to increase and/or optimize coupling to the optical device 3000. Various embodiments described herein can also include reflection reduction features of the pitch-reducing optical fiber array described in U.S. application Ser. No. 14/677,810, entitled "OPTIMIZED CONFIGURABLE PITCH REDUCING OPTICAL FIBER COUPLER ARRAY", which is incorporated herein in its entirety. For polarization control, some of the outer cores 4120 can be made with a non-circular cross section (e.g., elliptical as shown in FIG. 10) and a particular orientation of the outer cores 4120 can be used to increase and/or optimize optical coupling. Various embodiments described herein can also include features of any of the optical polarization mode couplers described in U.S. application Ser. No. 15/617,684, entitled "CONFIGURABLE POLARIZATION MODE COUPLER", which is incorporated herein in its entirety.

In some embodiments, the inner core 4110 size, the outer core 4120 size, the cladding 4130 size, and/or the spacing between the waveguides 4100 can reduce (e.g., simultaneously and gradually in some instances) along the optical element 4001 from the first end 4010 to an intermediate location or cross section 4050. In some embodiments, a predetermined reduction profile may be used. In the example shown in FIG. 10, at the intermediate location 4050, the inner core 4110 may be insufficient to guide light therethrough and the outer core 4120 may be sufficient to guide at least one optical mode (e.g., spatial mode).

In some embodiments, each core of a waveguide 4100 can have a capacity for at least one optical mode (e.g., single mode, few-mode, or multi-mode). For example, at the first end 4010, the VC waveguide 4101 can support a number of spatial modes (M1) within the inner core 4110. At the intermediate location 4050, in various embodiments, the inner core 4110 may no longer be able to support all the M1 modes (e.g., cannot support light propagation). However, in some such embodiments, at the intermediate location 4050, the outer core 4120 can be able to support all the M1 modes (and in some cases, able to support additional modes). In this example, light traveling within the inner core 4110 from the first end 4010 to the intermediate location 4050 can escape from the inner core 4110 into the outer core 4120 such that light can propagate within the outer core 4120.

In some embodiments, the inner core 4110 size, the outer core 4120 size, the cladding 4130 size, and/or the spacing between the waveguides 4100 can be further reduced (e.g., simultaneously and gradually in some instances) along the optical element 4001 from the intermediate location 4050 to the second end 4020. In the example shown in FIG. 10, at the second end 4020, the outer core 4120 may be insufficient to guide light therethrough.

In certain embodiments, at the intermediate location 4050, the VC waveguide 4101 can support all the M1 modes within the outer core 4120. At the second end 4020, the outer core 4120 may be no longer able to support all the M1 modes (e.g., cannot support light propagation). However, in some such embodiments, at the second end 4020, a combined core 4150 of at least two cores may be able to support all the M1 modes of all waveguides 4101 combined (and in some cases, able to support additional modes). In this example, light traveling within the outer core 4120 from the intermediate location 4050 to the second end 4020 can escape from the outer core 4120 into a combined waveguide 4150 formed by at least two outer cores (e.g., two or more neighboring cores) such that light can propagate within the combined cores. In the example shown in FIG. 10, each of the combined waveguides 4150 is formed by three outer cores. However, in some embodiments, the combined waveguides 4150 may be formed with another number of outer cores.

It would be appreciated that light travelling from the second end 4020 to the first end 4010 can behave in the reverse manner. For example, in some embodiments, light can move from the combined waveguide 4150 formed by at least two neighboring outer cores into the at least one outer core 4120 proximally to the intermediate cross section 4050, and can move from the outer core 4120 into corresponding inner core 4110 proximally to the first end 4010. In the example shown in FIG. 10, each of the combined waveguides 4150 can support three propagation modes. Travelling from the second end 4020 to the first end 4010, each propagation mode can be coupled to a corresponding outer core 4120 proximally to the intermediate cross section 4050 and move from the outer core 4120 into a corresponding inner core 4110 proximally to the first end 4010.

Referring now to FIG. 11, the example embodiment 5000 includes similar features as the example embodiment 4000 shown in FIG. 10. One difference is that the cross sectional configuration of the housing structure 5060 includes a structure with a single hole 5062 instead of a plurality of holes 4062. Similar to the example embodiment 4000 shown in FIG. 10, the optical element 5001 can include a coupler housing structure 5060 (e.g., including a medium 5140) and a plurality of longitudinal waveguides 5100 disposed in the housing structure 5060. The waveguides 5100 can be arranged with respect to one another in a cross-sectional geometric waveguide arrangement within the hole 5062. As illustrated, light can be guided through the optical element 5001 from the first end 5010, through the intermediate cross section 5050, and to the second end 5020.

As described herein, a gap may separate the plurality of longitudinal waveguides 5100 from the surrounding housing structure 5060. In some embodiments, there may be substantially no gap between the coupler housing structure 5060 and the waveguides 5100 proximate the intermediate location 5050 and/or the second end 5020. For example, in FIG. 11, although a gap is shown proximate the second end 5020, in preferred embodiments, there may be substantially no gap between the coupler housing structure 5060 and the waveguides 5100. In some embodiments, there may be substantially no gap between the coupler housing structure 5060 and the waveguides 5100 proximate the first end 5010, the intermediate location 5050, and/or the second end 5020.

In various embodiments, the plurality of waveguides 5100 can include at least one VC waveguide 5101. FIG. 11 illustrates all thirty seven of the waveguides 5100 as VC waveguides 5101 in a hexagonal arrangement. However, any arrangement may be used. In addition, any number of VC waveguides, Non-VC waveguides, and/or dummy fibers may be used. As described herein, one or more dummy fibers may be utilized to create a particular geometrical arrangement of the active, light-guiding fiber waveguides. As described herein, the VC waveguide 5101 can include an inner vanishing core 5110, an outer core 5120, and an outer cladding 5130.

In certain embodiments, the inner core 5110 waveguide dimensions, the outer core 5120 waveguide dimensions, the cladding 5130 dimensions, refractive indices, and/or the numerical apertures (NAs) can be selected to increase and/or optimize coupling to the individual fibers 2000 and/or optical device 3000. In some embodiments, the inner core 5110 size, the outer core 5120 size, the cladding 5130 size, and/or the spacing between the waveguides 5100 can reduce along the optical element 5001 from the first end 5010 to the second end 5020. In the example shown in FIG. 11, at the intermediate location 5050, the inner core 5110 of certain waveguides 5100 may be insufficient to guide light therethrough and the outer core 5120 of certain waveguides 5100 may be sufficient to guide at least one optical mode (e.g., spatial mode). In this example, proximate the second end 5020, the outer core 5120 may be insufficient to guide light therethrough. Accordingly, in some embodiments, light traveling within the outer core 5120 from the intermediate location 5050 to the second end 5020 can escape from the outer core 5120 into a combined waveguide 5150 formed by at least two outer cores (e.g., two or more neighboring cores) such that light can propagate within the combined cores. In the example shown in FIG. 11, although each of the combined waveguides 5150 is formed by three outer cores, the combined waveguides 5150 may be formed by another number of outer cores. The remaining cores (e.g., cores of waveguides or dummy fibers) may or may not guide light. Light travelling from the second end 5020 to the first end 5010 can behave in the reverse manner.

As described herein, various embodiments relate to optical coupler arrays configured to couple light from one or more optical fibers to an optical device, e.g., a photonic integrated circuit (PIC), or vice versa from an optical device to one or more optical fibers. In various instances, one or more optical coupler arrays can include one or more features configured to passively align (e.g., laterally and/or axially) with one or more features of the optical device. Some such embodiments can advantageously provide passive alignment without time-consuming and costly active alignment, which may entail for example, transmitting light through the waveguide structures, detecting coupling efficiency, and optimizing the alignment between waveguides of the coupler array and the optical device to optimize light coupling. Axial alignment can also be desirable for polarization handling and multichannel coupling.

Figure 12A:
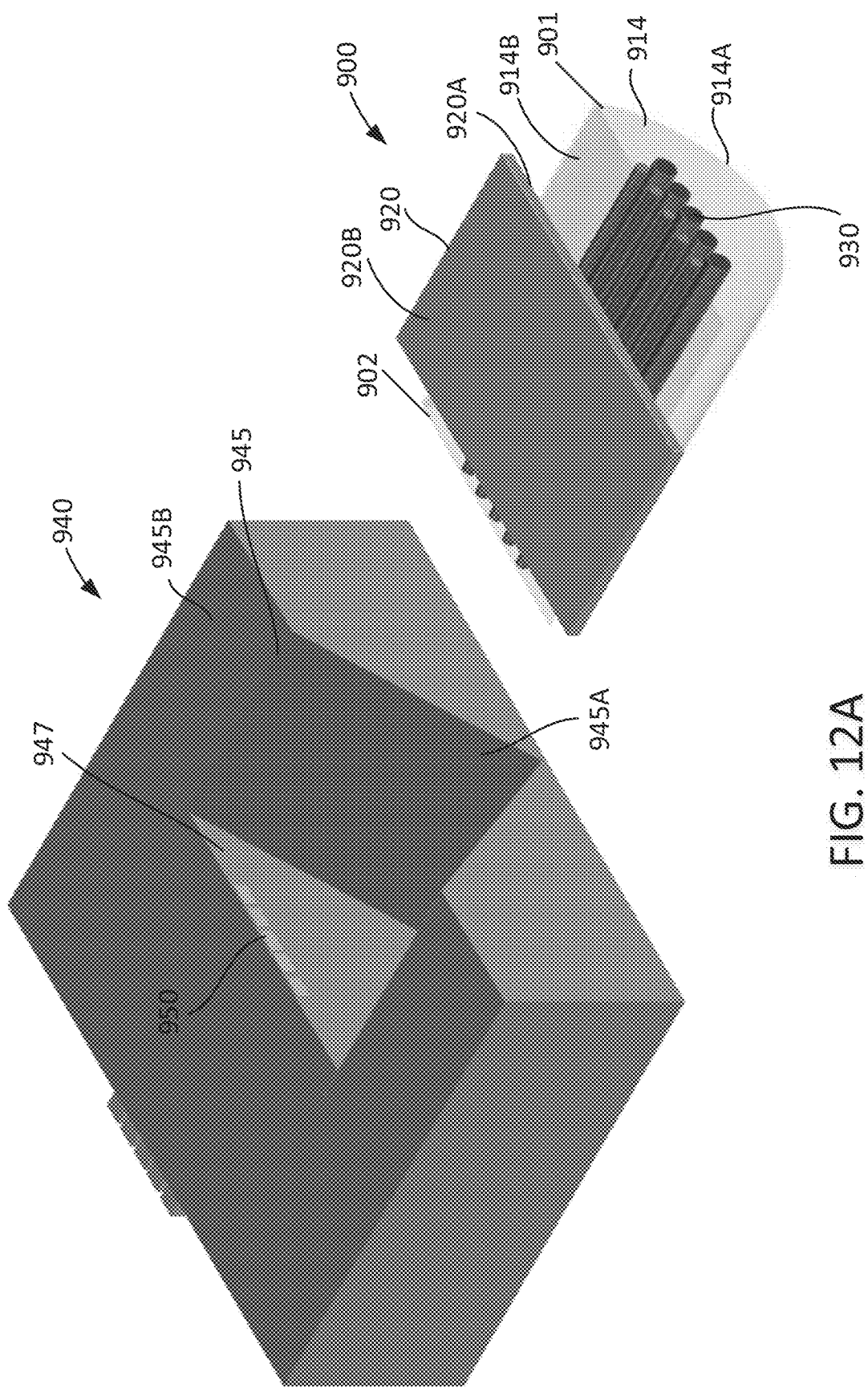
FIG. 12A is a schematic diagram of an example optical coupler array and optical device. The example coupler array can be configured to provide passive alignment with the optical device.
Figure 12B:
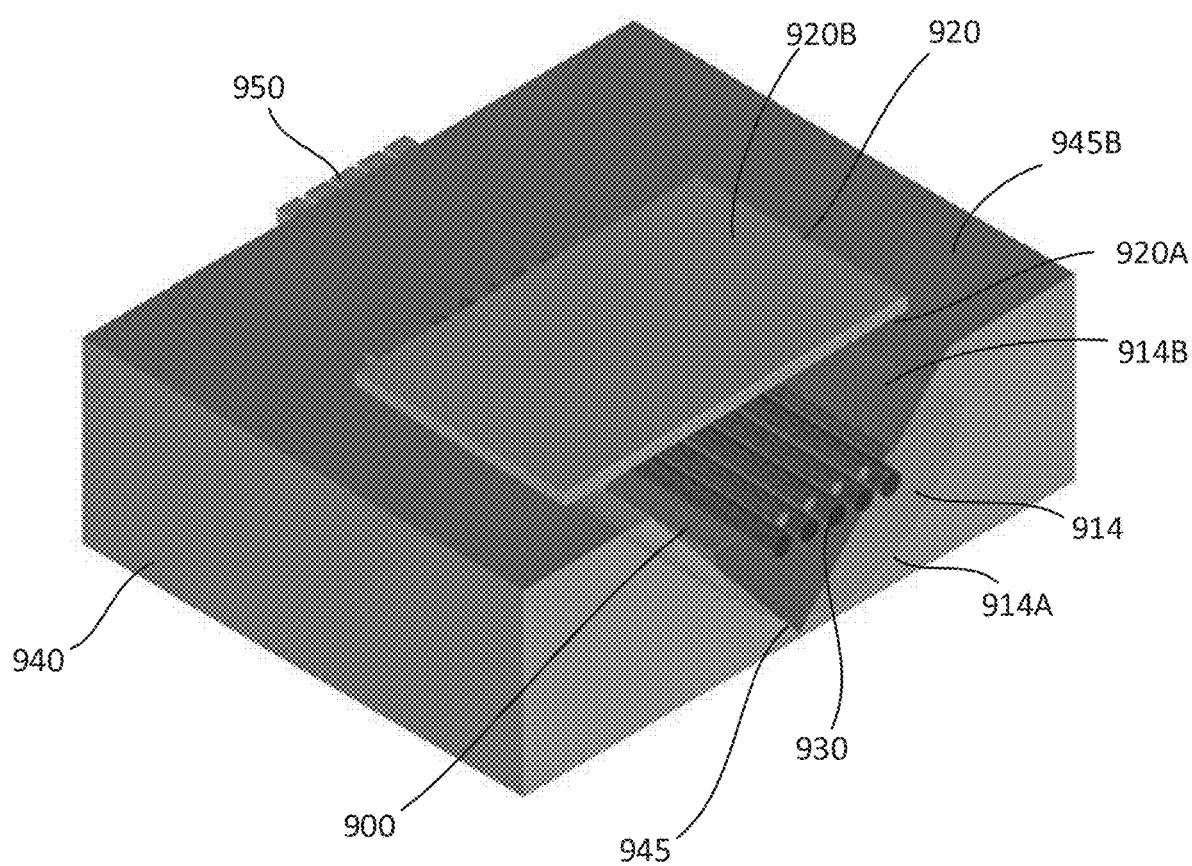
FIG. 12B is a schematic diagram of the coupling between the example optical coupler array and optical device illustrated in FIG. 12A.

FIG. 12A schematically illustrates an example optical coupler array configured to provide passive alignment with an optical device such as a PIC. The example optical coupler array 900 can include one or more longitudinal waveguides 930 within a housing structure 914. The housing structure 914 can have an outer cross sectional shape comprising a first side 914A and a second side 914B. The first side 914A can be configured to align with a feature 945 of the optical device 940. The second side 914B can, in some implementations, be configured to align with the top surface 945B of the optical device's feature 945 and/or optical device 940. For example, the second side 914B can be substantially parallel and in a substantially straight line with the top surface 945B of the optical device's feature 945. As another example, the second side 914B can be higher or lower (e.g., in a vertical direction) than the top surface 945B of the optical device's feature 945, but still substantially parallel with the top surface 945B. In the example in FIG. 12A, the housing structure 914 has a D-shaped outer cross sectional shape with a first side 914A comprising a curved portion and a second side 914B comprising a flat portion. The curved side 914A can align with a feature 945 (e.g., a v-groove) of the optical device 940, and the flat side 914B can align (e.g., be substantially parallel) with the top surface 945B of the optical device's feature 945 and/or optical device 940. In some instances, an alignment carrier 920 (e.g., a plate, a block, wedge, etc.), having a first side 920A and a second side 920B, can be disposed on the second side 914B of the housing structure 914 of the optical coupler array 900 to provide alignment with the top surface 945B of the optical device's feature 945 and/or optical device 940. FIG. 12B schematically illustrates the example optical coupler array 900 aligned and coupled with the optical device 940 shown in FIG. 12A.

The optical coupler array 900 can be any optical coupler array known in the art or yet to be developed. The optical coupler array 900 can include any optical coupler array described herein, e.g., any optical coupler array in FIGS. 1A-11. As an example, in some instances, the optical coupler array 900 can include a pitch reducing optical fiber array (PROFA) as described herein. A PROFA may advantageously be used to provide access to individual channels. In various implementations, the optical coupler array 900 can have a first end 901 and a second end 902. The optical coupler array 900 can be configured to optically couple at the first end 901 with a plurality of optical fibers (not shown), and can be configured to optically couple at the second end 902 with the optical device 940.

The optical coupler array 900 can include one or more optical waveguides 930. The number of waveguides is not particularly limited (e.g., 2, 3, 4, 5, 6, 7, 8, 9, 10, 12, 15, 20, 25, 30, 40, 50, 75, 80, 90, 100, etc., or any range formed by such values). The optical waveguide 930 can be any optical waveguide known in the art or yet to be developed. For example, the optical waveguides 930 can include any waveguide described herein, e.g., a vanishing core waveguide or a non-vanishing core waveguide. The waveguides 930 can include optical fibers and are not limited as to the type of optical fibers but may include any optical fibers, e.g., single mode fibers, few-mode fibers, multimode fibers, polarization maintaining fibers, and/or any combination thereof. The one or more optical waveguides 930 can be disposed in a housing structure 914, e.g., a common single coupler housing structure. In some instances, one or more optical waveguides 930 can be embedded in the housing structure 914. In some implementations, the waveguides 930 can comprise cores of a fiber, and the housing 914 can comprise a fiber cladding. With reference to FIG. 12A, a multi-core fiber (MCF), e.g., for multichannel coupling, can be used. In this case, the waveguides 930 are cores of the MCF, and the housing 914 is the cladding. In some implementations, the MCF fiber may be fabricated separately and fusion-spliced to an end of a PROFA coupler or a PROFA coupler may be fabricated with an MCF as an integral part of the PROFA coupler. For example, in some instances, an MCF can be formed as a relatively long and flexible end section of a PROFA coupler. In some implementations, a PROFA coupler may or may not be used. For example, the optical coupler array 900 may be optically coupled at the first end 901 with a MCF (not shown). The MCF may be operable to optically couple with at least one optical fiber waveguide (e.g., a plurality of optical fibers or another optical device). In some instances, the MCF can be optically coupled (at the end opposite the optical coupler array 900) with a second optical coupler array operable to optically couple with at least one optical fiber waveguide (e.g., a plurality of optical fibers or another optical device). The second optical coupler array can be any optical coupler array disclosed herein, including any optical coupler array in FIGS. 1A-11 or optical coupler array 900 shown in FIG. 12A. Other examples are possible.

The optical coupler array 900 can have one or more features configured to passively align with one or more features of the optical device 940 (or with one or more features of a carrier or substrate of the coupler array 900 and/or the optical device 940). In some examples, the optical coupler array 900 can have one or more features that can passively align with one or more features of a common carrier/substrate of the coupler array 900 and optical device 940. The feature of the optical coupler array 900 can be positionally registered with one or more waveguides 930 of the optical coupler array 900 (e.g., a position of the first side 914A can be registered relative to a position of a waveguide 930 of the optical coupler array 900), and the feature of the optical device 940 can be positionally registered with one or more of the waveguides 950 of the optical device 940 (e.g., a position of a v-groove 945 can be registered relative to a position of a waveguide 950 of the optical device 940). When the feature of the optical coupler array 900 couples or mates with the feature of the optical device 940, the waveguides 930 of the optical coupler array 900 are aligned (e.g., laterally and/or axially at the second end 902) with the waveguides 950 of the optical device 940. In some instances, the feature of the optical device 940 can accept a reciprocally or complementary designed feature in the optical coupler array 900. In some instances, the feature of the optical coupler array 900 can accept a reciprocally or complementary designed feature in the optical device 940.

In some implementations, the feature of the optical coupler array 900 can include a particular shape of the housing structure 914, such as a shape complementary with a feature 945 of the optical device 940 (or with a feature of a carrier or substrate of the coupler array 900 and/or the optical device 940). For example, the housing structure 914 can have an outer cross sectional shape with a first side 914A comprising one or more curved portions (e.g., a portion or portions of a circular shape or ellipse). In some instances, the outer cross sectional shape can include a second side 914B comprising one or more flat portions (e.g., a portion or portions of a flat or planar shape). With reference to FIG. 12A, the housing structure 914 can have a D-shaped outer cross sectional shape. For example, the housing structure 914 can have a curved side 914A and a flat side 914B. Other shapes including any shape with planar and/or curved portions can also be used (e.g., square, rectangular, pentagonal, hexagonal, octagonal, any other polygonal shape, circular with a flat section, etc.). In various implementations, the second side 914B can be disposed at a distance from the waveguides 930 such that the waveguiding properties are preserved and not disturbed. For example, the second side 914B can be disposed 1, 2, 3, 4, 5, 6, 7, 8, 9, 10 wavelengths distance (or any range formed by such values) from the waveguides 930. In some instances, the second side 914B can be disposed such that the insertion loss is low (e.g., minimized in some cases). In some instances, the second side 914B can be disposed such that the polarization extinction ratio is high (e.g., maximized in some cases). The second side 914B can also be registered with the optical device 940 (e.g., in height).

Figure 12C:
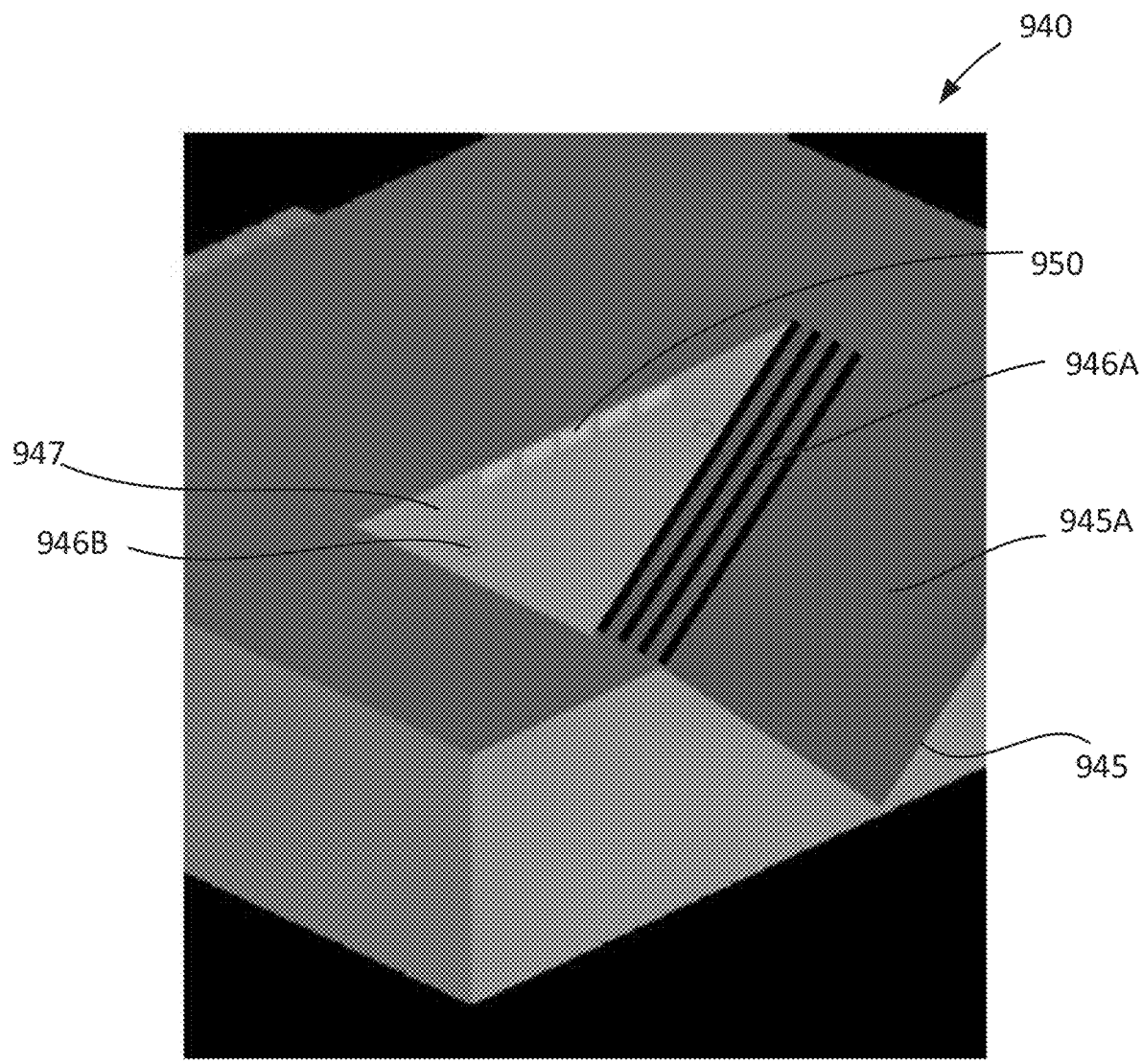
FIG. 12C is a schematic diagram of example mechanical features in a v-groove of the optical device illustrated in FIG. 12A.

With reference to FIG. 12A, the optical device 940 (e.g., a PIC) can include one or more waveguides 950 configured to couple with one or more waveguides 930 of the optical coupler array 900. FIG. 12A illustrates a PIC 940 having a single layer of waveguides 950. In some instances, the optical device 940 can include multiple layers of waveguides 950. The optical coupler array 900 (e.g., comprising a MCF) can also include a corresponding two-dimensional array of waveguides 930. The feature of the optical device 940 can include a shape in the device 940 (and/or in a common substrate with the optical coupler array 900). As an example, as shown in FIG. 12A, the chip/die edge 947 can be faceted to integrate a registered v-groove 945 feature. The v-groove 945 can include angled walls 945A forming a v-shape. The v-groove 945 (or the optical device 940) can also include a top surface 945B, e.g., configured to align (e.g., be substantially parallel) with the second side 914B of the housing structure 914 of the optical coupler array 900. In some instances, the top surface 945B of the v-groove 945 and/or the optical device 940 can be substantially parallel and in a substantially straight line with the second side 914B of the housing structure 914 of the optical coupler array 900. In some instances, the top surface 945B of the v-groove 945 and/or the optical device 940 can be substantially parallel, but lower or higher (e.g., in a vertical direction) than the second side 914B of the housing structure 914 of the optical coupler array 900. Other configurations are possible. The v-groove 945 feature with a chip/die edge 947 can include one or more features for coupling and/or index matching/filling. For example, as shown in FIG. 12C, the features can include grooves 946A within the v-groove 945 (e.g., on a wall 945A of the v-groove 945) that can allow an epoxy to flow and better adhere to the optical device 940. As another example, the features can include features 946B (e.g., protrusions, holes, pits, grooves, etc.) that can enable the index matching adhesive to have better mechanical adhesion to the chip/die edge 947. Other example features of the optical device 940 can include other shapes with planar surfaces (e.g., a square- or rectangularly-trenched structure or a hexagonally- or octogonally-trenched structure) and/or with curved surfaces. Some such examples can help facilitate preferential or multiple orientations of, e.g., a MCF.

As illustrated in FIG. 12B, the v-groove 945 of the optical device 940 can accept the shaped housing structure 914 (e.g., D-shaped) of the optical coupler array 900. For example, the first side 914A of the housing structure 914 can be configured to be positioned in the v-groove 945 such that the shaped (e.g., curved in this example) portion of the first side 914A can contact and/or align with the shape (e.g., walls 945A of the v-groove 945) of the optical device 940. In some embodiments, the second side 914B can be configured to align with the top surface 945B (e.g., substantially parallel) of the v-groove 945 and/or the optical device 940. For example, the second side 914B can be substantially parallel and in a substantially straight line with the top surface 945B of the v-groove 945 and/or the optical device 940. As another example, the second side 914B can higher or lower (e.g., in a vertical direction) than the top surface 945B of the v-groove 945 and/or the optical device 940, but still substantially parallel with the top surface 945B. By simply seating into the v-groove 945 and being placed up against the facet edge 947 (e.g., edge coupling), the optical coupler array 900 can advantageously self-align (e.g., automatically align) with the optical device 940 such that the waveguides 930 of the optical coupler array 900 can be aligned with the waveguides 950 of the optical device 940 laterally and axially. In various implementations, the waveguides 930 of the optical coupler array 900 can be aligned with the waveguides 950 of the optical device 940 with an optical coupling efficiency between 50% and 100% (e.g., between 60% and 100%, between 70% and 100%, between 80% and 100%, between 90% and 100%). In some instances, one or more of the waveguides 930, 950 or surface thereof can be angled at the interface to reduce back reflections.

Additional alignment and/or coupling features are possible. For instance, the optical coupler array 900, the optical device 940, and/or a carrier/substrate (not shown) can include alignment fiducials. As an example, the optical coupler array 900 can include a polarization maintaining (PM) MCF configured to couple with polarization sensitive waveguides of a PIC. Alignment fiducials can be incorporated on the MCF, PIC, a carrier/substrate, and/or any combination thereof. Alignment fiducials can be used by machine vision for rough alignment and the self-aligning features accomplish the fine alignment. The fiducials can be, for example, any kind of visually discernible features such as lithographically formed possibly metallic geometric shapes (e.g. lines, corners, crosses, etc.). As another example, mechanical coupling features can be used to facilitate, for example, compression bonding, solder bonding, laser welding, and/or flow and retention of optical or mechanical adhesives. These can, for example, be copper bond pads, metallization for acceptance of solder bumps, metal pads or lines for laser welding, grooves that increase surface or roughness for enhanced mechanical adhesion, etc. Mechanical coupling features (e.g., reciprocal features in the optical coupler array 900 and optical device 940) can also be used for non-optical coupling, for example, for electrical or fluid transmission. For example, fibers can transmit light but also can have electrical (e.g. metallic) and/or fluid (e.g. holes) waveguides that also transmit electricity or fluids. These can be useful for, for example, PICs that are used in microfluidics or biological analysis or gas sensing; and/or for PICs that may have varied input/output needs—e.g., for electricity, fluids/gases and/or light. An array of waveguides in the optical coupler array 900 and/or optical device 940 could be heterogeneous to include other mechanical or transmission coupling modes.

In some implementations, the optical coupler array 900 can include an alignment carrier 920 (e.g., a plate, a block, wedge, etc.) disposed and/or coupled with the second side 914B of the housing structure 914. The alignment carrier 920 can have a first side 920A and a second side 920B. In some instances, the alignment carrier 920 can include one or more features configured to align with one or more features of the second side 914B of the housing structure 914, such as one or more features complementary with one or more features of the second side 914B of the housing structure 914. For example, the first side 920A of the alignment carrier 920 can include one or more flat portions (e.g., a portion or portions of a flat or planar shape) configured to align with one or more flat portions of the second side 914B of the housing structure 914. In some implementations, the flat portions of the first side 920A (e.g., bottom side) of an alignment carrier 920 can be disposed on the flat portions of the second side 914B (e.g., top side) of a housing structure 914. The shape of the second side 920B of the alignment carrier 920 is not particularly limited. For example, the second side 920B can include one or more flat and/or curved portions. The second side 920B can include a regular or irregular shape. The alignment carrier 920 can be configured to advantageously provide an axial alignment tool and allow a pick-and-place machine to appropriately position the optical coupler array 900, e.g., to provide alignment with the top surface of the v-groove 945 and/or optical device 940. As shown in FIGS. 12A-12B, the housing structure 914 can be designed such that the waveguides 930 are axially aligned with the PIC's waveguides 950 when the top surface 945B of the PIC and top surface 914B of the housing structure 914 of the optical coupler array 900 are substantially parallel. A pick-and-place tool can, for example, pick up the alignment carrier 920 by applying a vacuum to the top side 920B and then place it on the housing structure 914. The top surface 914B of the housing structure 914 of the optical coupler array 900 and/or the bottom surface 920A of the alignment carrier 920 can include an adhesive (e.g., a pre-applied adhesive). Pressing the alignment carrier 920 onto the housing structure 914, possibly also residing in an appropriate carrier, can adhere the alignment carrier 920 and housing structure 914 and can align the housing structure 914 axially such that it can be lifted and placed into the v-groove 945, adhered within that v-groove 945, and waveguides 930 and 950 can be thereby aligned. In some instances, the alignment carrier 920 can extend beyond the second side 914B of the housing structure 914 in the transverse direction on at least one side or on both sides. The alignment carrier 920 can be configured to sit over (e.g., disposed above and/or on) the top surface 945B of the v-groove 945 or optical device 940. In some instances, the alignment carrier 920 might not sit on and/or contact the top surface 945B of the v-groove 945 and/or optical device 940.

Other examples are possible. For example, the housing structure 914 of the optical coupler array 900 can have a second side 914B having a curved portion, and the alignment carrier 920 can have a first side 920A having a V-shape or curved portion. As described herein, the optical coupler array 900 can have a housing structure 914 with a first side 914A (e.g., bottom side) with a shape complementary with a feature 945 of the optical device 940 to provide passive alignment. For further alignment, in some instances, the optical coupler array 900 can include an alignment carrier 920 with a first side 920A (e.g., bottom side) having a shape complementary with the second side 914B (e.g., top side) of the housing structure 914 of the optical coupler array 900.

Figure 13:
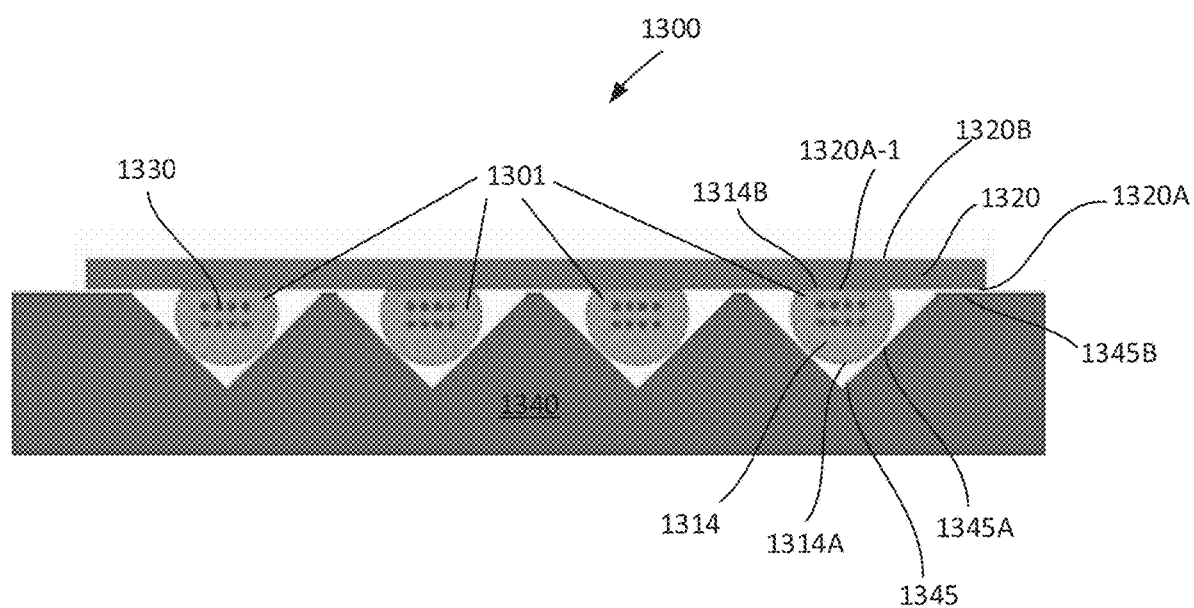
FIGS. 13, 14 and 15 schematically illustrate examples of a multifiber array positioned over an optical device.

Some implementations can include a plurality of optical coupler arrays, for example, coupled by an alignment carrier forming a multifiber array. FIG. 13 schematically illustrates an example multifiber array 1300 positioned over an optical device 1340. The example multifiber array 1300 includes a plurality of optical couplers 1301. The multifiber array 1300 can include 2, 3, 4, 5, 6, 7, 8, 9, 10, etc. optical couplers 1301. The number of optical couplers 1301 is not particularly limited. FIG. 13 shows four optical couplers 1301 for illustration purposes only. The optical couplers 1301 can include any of the optical coupler arrays described herein (including for example, optical coupler array 900). The optical coupler 1301 can include one or more longitudinal waveguides 1330. The waveguides 1330 can include any of the waveguides described herein (including for example, waveguide 930) including any vanishing core and/or non-vanishing core waveguides. In some instances, the waveguides 1330 can include cores of multicore fiber. Some fibers can be flexible.

With reference to FIG. 13, the waveguides 1330 of the optical coupler 1301 can be embedded in a common single housing structure 1314. The housing structure 1314 can include any of the housing structures described herein (including for example, housing structure 914). In some instances, the housing structure 1314 can include cladding. As shown in FIG. 13, the housing structure 1314 has a first side 1314A, which can comprise one or more curved portions. The housing structure 1314 has a second side 1314B, which can comprise one or more flat portions. In various instances, the flat portion(s) of the second side 1314B can be disposed at a distance from the waveguide 1330 such that insertion loss is low from one end to the other end of the waveguide 1330. In various instances, the flat portion(s) of the second side 1314B can be disposed at a distance from the waveguide 1330 such that waveguiding properties are preserved from one end to the other end of the waveguide 1330.

With continued reference to FIG. 13, the optical couplers 1301 can be coupled together with an alignment carrier 1320. The alignment carrier 1320 can include any of the alignment carriers described herein (including for example, alignment carrier 920). The alignment carrier 1320 can include, for example, a plate, a block, a wedge, etc. The alignment carrier 1320 can have a first side 1320A and a second side 1320B, and can be disposed over the second side 1314B of the housing structure 1314 of the optical coupler 1301. With reference to FIG. 13, the first side 1320A of the alignment carrier 1320 can comprise one or more flat portions 1320A-1 coupled with one or more flat portions of the second side 1314B of the housing structure 1314 of the optical coupler 1301. In some instances, the flat portions 1320A-1 of the alignment carrier 1320 may be adhered (e.g., with adhesive) with the flat portions of the second side 1314B of the housing structure 1314 of the optical coupler 1301. As described herein, the alignment carrier 1320 can extend beyond the second side 1314B of the housing structure 1314 of the optical coupler 1301 in the transverse direction on at least one side (e.g., extend on both sides as shown in FIG. 13).

In FIG. 13, the multifiber array 1300 is positioned over an example optical device 1340. The optical device 1340 can include any of the optical devices described herein (including for example, optical device 940). With reference to FIG. 13, the optical device 1340 or a carrier of the optical device 1340 can include walls 1345A and a top surface 1345B of a v-groove 1345 and/or the optical device 1340. The first side 1314A of the housing structure 1314 of the optical coupler 1301 can be positioned in the v-groove 1345. For example, the first side 1314A of the housing structure 1314 can contact the walls 1345A of the v-groove 1345. As described herein, other reciprocally or complementary designed shapes of the optical coupler 1301 and optical device 1340 are possible.

When the multifiber array 1300 is positioned in the optical device 1340, the alignment carrier 1320 can be configured to align (e.g., be substantially parallel) with the top surface 1345B of the optical device 1340 (e.g., the v-groove 1345). For example, the first side 1320A of the alignment carrier 1320 can be configured to sit over the top surface 1345B of the optical device 1340. In some instances, the alignment carrier 1320 can be configured to sit on the top surface 1345B of the optical device 1340. In some instances, the alignment carrier 1320 can be configured to not sit on the top surface 1345B of the optical device 1340. For example, in some instances, the alignment carrier 1320 may be shaped such that it does not contact the top surface 1345B of the optical device 1340. As another example, the second side 1314B of the housing structure 1314 of the optical coupler 1301 may be higher (e.g., in a vertical direction) than the top surface 1345B of the optical device 1340 such that the alignment carrier 1320 may also be higher than the top surface 1345B of the optical device 1340. In various implementations, the alignment carrier 1320 can be aligned (e.g., be substantially parallel) with the top surface 1345B of the optical device 1340 even though it might not contact the top surface 1345B of the optical device 1340.

As described herein, the optical coupler 1301 can be configured to optically couple with at least one waveguide of the optical device 1340. In some implementations, a position of the optical device 1340 (e.g., the v-groove 1345) can be registered relative to a position of the waveguide of the optical device 1340. When the multifiber array 1300 is positioned in the optical device 1340, a waveguide 1330 of the optical coupler 1301 can be aligned with a waveguide of the optical device 1340. In some instances, the waveguide 1330 of the optical coupler 1301 can be aligned with the waveguide of the optical device 1340 with an optical coupling efficiency from 50% to 100% (e.g., from 60% to 100%, from 70% to 100%, from 80% to 100%, from 90% to 100%, etc. or any range between any of these values).

When the multifiber array 1300 is positioned in the optical device 1340, individual ones of the optical couplers 1301 can be configured to optically couple one end of at least one optical fiber waveguide (e.g., one or more single mode fibers, few-mode fibers, multimode fibers, multicore single mode fibers, multicore few-mode fibers, and/or multicore multimode fibers) to a waveguide or waveguides of the optical device 1340.

Figure 14:
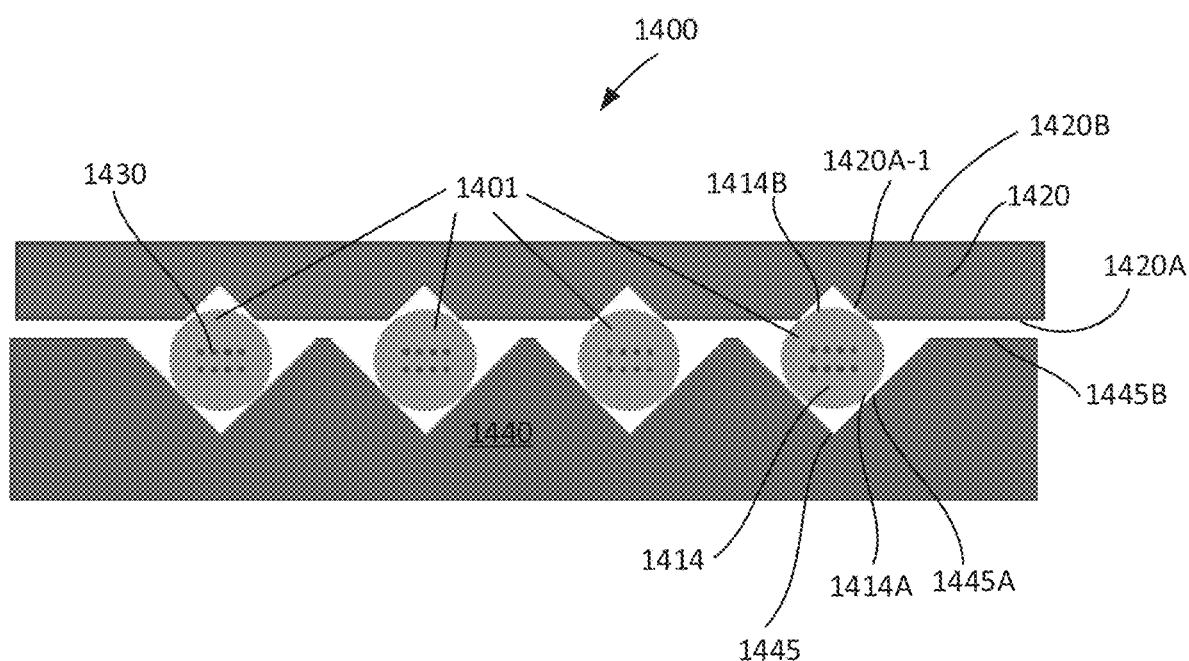

As described herein, other reciprocally or complementary designed shapes of the alignment carrier and the housing structure of the optical coupler array are possible. For example, FIG. 14 schematically illustrates another example multifiber array 1400 positioned over an optical device 1440. The multifiber array 1400 has a plurality of optical couplers 1401 and an alignment carrier 1420. One or more of the optical couplers 1401 can include one or more longitudinal waveguides 1430 in a housing structure 1414. The alignment carrier 1420 has a first side 1420A and a second side 1420B. The optical couplers 1401 and alignment carrier 1420 can include any of the features and/or combination of features described herein, and are not all repeated herein.

As shown in FIG. 14, the first side 1414A of the housing structure 1414 of the optical coupler 1401 can be positioned in the optical device 1440. For example, the first side 1414A of the housing structure 1414 can comprise one or more curved portions configured to be positioned within walls 1445A of a v-groove 1445 in the optical device 1440. As also shown in FIG. 14, the first side 1420A of the alignment carrier 1420 can comprise one or more v-grooves 1420A-1, and the second side 1414B of the housing structure 1414 of the optical coupler 1401 can comprise one or more curved portions. In various implementations, a curved portion of the housing structure 1414 can be disposed within a v-groove 1420A-1 of the alignment carrier 1420. In FIG. 14, although there are four v-grooves 1420A-1 shown, the number of v-grooves 1420A-1 is not particularly limited. For example, the number of v-grooves 1420A-1 in the alignment carrier 1420 can be at least 1, 2, 3, 4, 5, 6, 7, 8, 9, 10, etc. (or any range formed by such values). In various implementations, the number of v-grooves 1420A-1 in the alignment carrier 1420 may correspond with the number of optical couplers 1401. In some implementations, there may be more v-grooves 1420A-1 in the alignment carrier 1420 than the number of optical couplers 1401. In some implementations, there may be less v-grooves 1420A-1 in the alignment carrier 1420 than the number of optical couplers 1401. The v-grooves 1420A-1 in the alignment carrier 1420 can be the same or different in shape (e.g., slope of walls) and/or size with the other v-grooves 1420A-1 in the alignment carrier. The v-grooves 1420A-1 in the alignment carrier 1420 can also be the same or different in shape (e.g., slope of walls) and/or size with the v-grooves 1445 in the optical device 1440. For example, in FIG. 14, the v-grooves 1420A-1 in the alignment carrier 1420 are not the same in size as the v-grooves 1445 in the optical device 1440. In other examples, the v-grooves 1420A-1 in the alignment carrier 1420 may be the same size as the v-grooves 1445 in the optical device 1440.

When the multifiber array 1400 is positioned in the optical device 1440, individual ones of the optical couplers 1401 can be configured to optically couple one end of at least one optical fiber waveguide to a waveguide or waveguides of the optical device 1440. In various implementations, the first side 1420A of the alignment carrier 1420 may sit over the top surface 1445B (e.g., top surface of v-groove 1445) of the optical device 1440. The alignment carrier 1420 may or may not contact the top surface 1445B of the optical device 1440.

Figure 15:
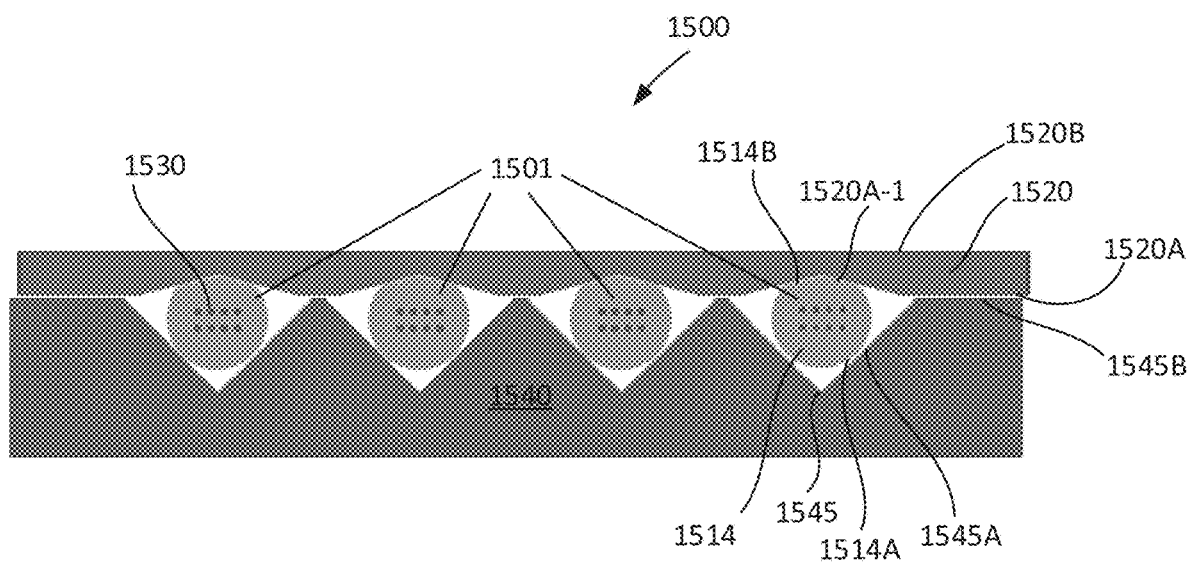

FIG. 15 schematically illustrates another example multifiber array 1500 positioned over an optical device 1540. The multifiber array 1500 has a plurality of optical couplers 1501 and an alignment carrier 1520. One or more of the optical couplers 1501 can include one or more longitudinal waveguides 1530 in a housing structure 1514. The alignment carrier 1520 has a first side 1520A and a second side 1520B. The optical couplers 1501 and alignment carrier 1520 can include any of the features and/or combination of features described herein, and are not all repeated herein.

As shown in FIG. 15, the first side 1514A of the housing structure 1514 of the optical coupler 1501 can be positioned in the optical device 1540. For example, the first side 1514A of the housing structure 1514 can comprise one or more curved portions configured to be positioned within walls 1545A of a v-groove 1545 in the optical device 1540. As also shown in FIG. 15, the first side 1520A of the alignment carrier 1520 can comprise multiple flat portions 1520A-1, and the second side 1514B of the housing structure 1514 of the optical coupler 1501 can comprise multiple flat portions configured to couple with the multiple flat portions of the alignment carrier 1520.

In some implementations, the number of flat portions in an optical coupler 1501 may be same as the number of corresponding flat portions 1520A-1 in the alignment carrier 1520. For example, in FIG. 15, for a given optical coupler 1501, there are two flat portions (e.g., forming an inverted v-shape, a ridge, a roof, etc.) on the second side 1514B of the housing structure 1514 and a corresponding two flat portions 1520A-1 (e.g., forming a v-groove) on the first side 1520A of the alignment carrier 1520. The number of flat portions in a given optical coupler 1501 and/or the number of corresponding flat portions 1520A-1 in the alignment carrier 1520 is not particularly limited. For example, the number of flat portions can be 2, 3, 4, 5, 6, 7, 8, 9, 10, etc. (or any range formed by such values).

In some implementations, the number of flat portions in an optical coupler 1501 may be different than the number of corresponding flat portions 1520A-1 in the alignment carrier 1520. As an example (not shown), an optical coupler 1501 with a second side 1514B having two flat portions may be positioned within three flat portions in the alignment carrier 1520. In some instances, the number, shape, and/or size of flat portions for one optical coupler 1501 (and/or the number, shape, and/or size of corresponding flat portions 1520A-1 in the alignment carrier 1520) may be the same or different than the number, shape, and/or size of flat portions for another optical coupler 1501 (and/or the number, shape, and/or size of corresponding flat portions 1520A-1 in the alignment carrier 1520).

When the multifiber array 1500 is positioned in the optical device 1540, individual ones of the optical couplers 1501 can be configured to optically couple one end of at least one optical fiber waveguide to a waveguide or waveguides of the optical device 1540. In various implementations, the first side 1520A of the alignment carrier 1520 may sit over the top surface 1545B (e.g., top surface of v-groove 1545) of the optical device 1540. The alignment carrier 1520 may or may not contact the top surface 1545B of the optical device 1540.

In FIGS. 13, 14, and 15, the reciprocally or complementary designed shapes of the alignment carrier and the housing structures of the optical couplers are similar for different optical couplers in the multifiber array. In some instances, reciprocally or complementary designed shapes can be combined with other reciprocally or complementary designed shapes. For example, any of the designed shapes shown in FIGS. 13, 14, and/or 15 can be combined with any of the other designed shapes shown in FIGS. 13, 14, and/or 15. Other reciprocally or complementary designed shapes can also be used.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A multifiber array comprising:
a plurality of optical couplers, individual ones of the plurality of optical couplers configured to optically couple at least one optical fiber waveguide to at least one waveguide of an optical device and comprising:
an elongated optical element having a first end operable to optically couple with said at least one optical fiber waveguide and a second end operable to optically couple with said optical device, and comprising:
a common single coupler housing structure; and
at least one longitudinal waveguide having a capacity for at least one optical mode embedded in said common single housing structure,
wherein said common single coupler housing structure has an outer cross sectional shape having a first side and a second side; and
an alignment carrier comprising a leading edge, a back edge, and one or more flat portions mechanically coupled with said second side of said housing structure of individual ones of the plurality of optical couplers such that (1) said alignment carrier is attached to the plurality of optical couplers, (2) said second end of the optical couplers extends beyond said leading edge of said alignment carrier, and (3) said first side of said housing structure of individual ones of the plurality of optical couplers is operable to mechanically couple with alignment features of said optical device,
wherein at least one of the optical couplers is configured to optically couple a plurality of optical fibers to the optical device,
the elongated optical element of the at least one of the optical couplers having the first end operable to optically couple with said plurality of optical fibers, an intermediate cross section, and the second end operable to optically couple with said optical device, and comprising:
a plurality of longitudinal waveguides each positioned at a spacing from one another, each having a capacity for at least one optical mode, each embedded in said common single housing structure of the at least one of the optical couplers proximally to said second end, wherein at least one of said plurality of longitudinal waveguides is a vanishing core waveguide, each said at least one vanishing core waveguide comprising:
an inner vanishing core, having a first refractive index (N-1), and having a first inner core size (ICS-1) at said first end, an intermediate inner core size (ICS-IN) at said intermediate cross section, and a second inner core size (ICS-2) at said second end; and
an outer core, longitudinally surrounding said inner core, having a second refractive index (N-2), and having a first outer core size (OCS-1) at said first end, an intermediate outer core size (OCS-IN) at said intermediate cross section, and a second outer core size (OCS-2) at said second end; and
an outer cladding, longitudinally surrounding said outer core, having a third refractive index (N-3), a first cladding size at said first end, and a second cladding size at said second end,
wherein said common single coupler housing structure of the at least one of the optical couplers comprises a transversely contiguous medium having a fourth refractive index (N-4) surrounding said plurality of longitudinal waveguides, wherein a relative magnitude relationship between said first, second, third and fourth refractive indices (N-1, N-2, N-3, and N-4, respectively), comprises the following magnitude relationship: (N-1>N-2>N-3), wherein a total volume of said medium of said common single coupler housing structure of the at least one of the optical couplers is greater than a total volume of all said vanishing core waveguides inner cores and said outer cores confined within said common single coupler housing structure of the at least one of the optical couplers, and wherein said first inner vanishing core size (ICS-1), said first outer core size (OCS-1), and said spacing between said plurality of longitudinal waveguides, are simultaneously and gradually reduced, in accordance with a reduction profile, between said first end and said second end along said optical element of the at least one of the optical couplers, until said second inner vanishing core size (ICS-2) and said second outer core size (OCS-2) are reached, wherein said intermediate inner vanishing core size (ICS-IN) is selected to be insufficient to guide light therethrough, and said intermediate outer core size (OCS-IN) is selected to be sufficient to guide at least one optical mode, and said second outer core size (OCS-2) is selected to be insufficient to guide light therethrough such that:

light traveling from said first end to said second end escapes from said inner vanishing core into said corresponding outer core proximally to said intermediate cross section, and escapes from said outer core into a combined waveguide formed by at least two outer cores proximally to said second end, and at least one waveguide mode of light traveling from said second end to said first end moves from the combined waveguide formed by at least two outer cores into said outer core proximally to said intermediate cross section, and moves from said outer core into said corresponding inner vanishing core proximally to said first end, and wherein said common single coupler housing structure of the at least one of the optical couplers has the outer cross sectional shape comprising the first side comprising one or more curved portions, wherein said second side is disposed at a distance from said plurality of longitudinal waveguides such that waveguiding properties are preserved and not disturbed.

2. The multifiber array of claim 1, wherein said second side of said housing structure comprises one or more flat portions configured to couple with said one or more flat portions of said alignment carrier.

3. The multifiber array of claim 1, wherein said alignment carrier comprises at least two flat portions oriented in different directions configured to be coupled with at least two flat portions of one of said second sides of one of said housing structures.

4. The multifiber array of claim 1, wherein said alignment carrier extends beyond said second side of one of said housing structures in the transverse direction on at least one side.

5. The multifiber array of claim 1, wherein said alignment carrier extends beyond said second side of one of said housing structures in the transverse direction on both sides.

6. The multifiber array of claim 1, wherein said alignment carrier comprises a carrier plate.

7. The multifiber array of claim 1, wherein said first side of said common single coupler housing structure is configured to be positioned in a v-groove of said optical device or a carrier of said optical device such that said first side contacts with walls of the v-groove.

8. The multifiber array of claim 7, wherein said alignment carrier is configured to be disposed over a top surface of the v-groove.

9. The multifiber array of claim 8, wherein said alignment carrier is configured not to sit on the top surface of the v-groove.

10. The multifiber array of claim 7, wherein a position of said v-groove is registered relative to a position of said at least one waveguide of said optical device.

11. The multifiber array of claim 10, wherein the position of said v-groove is registered relative to the position of said at least one waveguide of said optical device such that said at least one waveguide of said optical device is aligned with said at least one longitudinal waveguide of one of said optical couplers with an optical coupling efficiency between 50% and 100%.

12. The multifiber array of claim 11, wherein the optical coupling efficiency is between 80% and 100%.

13. The multifiber array of claim 1, wherein at least one optical coupler is configured to optically couple one end of at least one multicore optical fiber waveguide to at least one waveguide of an optical device.

14. The multifiber array of claim 1, wherein said second side of said housing structure is disposed at a distance from the least one longitudinal waveguide of one of said optical couplers such that insertion loss is low from the first end to the second end.

15. The multifiber array of claim 1, wherein said second side of said housing structure is disposed at a distance from the least one longitudinal waveguide of one of said optical couplers such that waveguiding properties are preserved from the first end to the second end.

16. The multifiber array of claim 1, wherein said at least one longitudinal waveguide of one of said optical couplers comprises a core of a multicore fiber and the common single coupler housing structure comprises cladding.

17. The multifiber array of claim 16, wherein said multicore fiber is flexible.

18. The multifiber array of claim 1, wherein said alignment carrier is a flat plate.

19. A multifiber array, comprising:
a plurality of optical couplers, individual ones of the plurality of optical couplers configured to optically couple at least one optical fiber waveguide to at least one waveguide of an optical device and comprising:
an elongated optical element having a first end operable to optically couple with said at least one optical fiber waveguide and a second end operable to optically couple with said optical device, and comprising:
a common single coupler housing structure; and
at least one longitudinal waveguide having a capacity for at least one optical mode embedded in said common single housing structure,
wherein said common single coupler housing structure has an outer cross sectional shape having a first side and a second side; and
an alignment carrier comprising a leading edge, a back edge, and one or more flat portions mechanically coupled with said second side of said housing structure of individual ones of the plurality of optical couplers such that (1) said alignment carrier is attached to the plurality of optical couplers, (2) said second end of the optical couplers extends beyond said leading edge of said alignment carrier, and (3) said first side of said housing structure of individual ones of the plurality of optical couplers is operable to mechanically couple with alignment features of said optical device,
wherein said at least one longitudinal waveguide of one of said optical couplers comprises a core of a multicore fiber and the common single coupler housing structure comprises cladding,
wherein said first end of said at least one multicore fiber is optically coupled to a second end of a multichannel optical coupler array comprising:
an elongated optical element having a first end operable to optically couple with a plurality optical fibers and said second end operable to optically couple with said at least one multicore fiber, and comprising:
a common single coupler housing structure;
a plurality of longitudinal waveguides each positioned at a predetermined spacing from one another, each having a capacity for at least one optical mode of a predetermined mode field profile, each embedded in said common single housing structure proximally to said second end, wherein at least one of said plural longitudinal waveguides is a vanishing core waveguide, each said at least one vanishing core waveguide comprising:

an inner vanishing core, having a first refractive index (N-1), and having a first inner core size (ICS-1) at said first end, and a second inner core size (ICS-2) at said second end;

an outer core, longitudinally surrounding said inner core, having a second refractive index (N-2), and having a first outer core size (OCS-1) at said first end, and a second outer core size (OCS-2) at said second end, and an outer cladding, longitudinally surrounding said outer core, having a third refractive index (N-3), a first cladding size at said first end, and a second cladding size at said second end;

and wherein said common single coupler housing structure comprises a transversely contiguous medium having a fourth refractive index (N-4) surrounding said plural longitudinal waveguides, wherein a predetermined relative magnitude relationship between said first, second, third and fourth refractive indices (N-1, N-2, N-3, and N-4, respectively), comprises the following magnitude relationship: (N-1>N-2>N-3), wherein a total volume of said medium of said common single coupler housing structure is greater than a total volume of all said vanishing core waveguides inner cores and said outer cores confined within said common single coupler housing structure, and wherein said first inner vanishing core size (ICS-1), said first outer core size (OCS-I), and said predetermined spacing between said plural longitudinal waveguides are simultaneously and gradually reduced, in accordance with a predetermined reduction profile, between said first end and said second end along said optical element, until said second inner vanishing core size (ICS-2) and said second outer core size (OCS-2) are reached, wherein said second inner vanishing core size (ICS-2) is selected to be insufficient to guide light therethrough, and said second outer core size (OCS-2) is selected to be sufficient to guide at least one optical mode, such that:

light traveling from said first end to said second end escapes from said inner vanishing core into said corresponding outer core proximally to said second end, and light traveling from said second end to said first end moves from said outer core into said corresponding inner vanishing core proximally to said first end, and wherein said common single coupler housing structure of said multichannel optical coupler array proximally to said first end has a cross sectional configuration comprising a transversely contiguous structure with at least one hole, wherein the at least one hole contains at least one of said plurality of longitudinal waveguides creating a gap between the coupler housing structure and the at least one of said plurality of longitudinal waveguides.

20. The multifiber array of claim 19, wherein said first side of said housing structure comprises one or more curved portions.

21. The multifiber array of claim 19, wherein said one or more flat portions of said alignment carrier comprises a v-groove and said second side of said housing structure comprises one or more curved portions.

* * * * *